US006206525B1

(12) United States Patent
Rowland et al.

(10) Patent No.: US 6,206,525 B1
(45) Date of Patent: *Mar. 27, 2001

(54) MINIATURE MICRO PRISM RETROREFLECTOR

(75) Inventors: William P. Rowland, Southington; Robert B. Nilsen, Weatogue, both of CT (US)

(73) Assignee: Reflexite Corporation, Avon, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/980,885

(22) Filed: Dec. 1, 1997

Related U.S. Application Data

(63) Continuation-in-part of application No. 07/717,597, filed on Sep. 23, 1996, now Pat. No. 5,780,140, and a continuation of application No. 08/702,245, filed on Aug. 28, 1996, now Pat. No. 5,840,406, which is a division of application No. 08/314,487, filed on Sep. 28, 1994, now Pat. No. 5,565,151.

(51) Int. Cl.[7] .................................................. G02B 5/124
(52) U.S. Cl. .......................................... 359/530; 359/529
(58) Field of Search .................................... 359/529, 530, 359/831, 833, 834, 837

(56) References Cited

U.S. PATENT DOCUMENTS

| 3,712,706 | * | 1/1973 | Stamm | 359/530 |
|---|---|---|---|---|
| 3,810,804 | | 5/1974 | Rowland | 156/245 |
| 4,202,600 | | 5/1980 | Burke et al. | 428/172 |
| 4,243,618 | | 1/1981 | Van Arnam | 264/1 |
| 5,171,624 | | 12/1992 | Walter | 428/156 |
| 5,491,586 | | 2/1996 | Phillips | 359/530 |
| 5,508,084 | | 4/1996 | Reeves et al. | 428/172 |
| 5,558,740 | | 9/1996 | Bernard et al. | 156/231 |
| 5,565,151 | | 10/1996 | Nilsen | 264/1.1 |
| 5,780,140 | * | 7/1998 | Nilsen | 428/172 |

FOREIGN PATENT DOCUMENTS

| 0 588 504 A1 | 3/1994 | (EP) . |
|---|---|---|
| WO 94/09974 | 5/1994 | (WO) . |
| WO 95/11466 | 4/1995 | (WO) . |
| WO96/10148 | 4/1996 | (WO) . |
| WO 97/21121 | 6/1997 | (WO) . |
| WO 98/12581 | 3/1998 | (WO) . |

OTHER PUBLICATIONS

Park, B.C., et al., "Polarization Properties of Cube–Corner Retroreflectors and Their Effects on Signal Strength and Nonlinearity in Heterodyne Interferometers," *Applied Optics*, 35 (22): 4372–4380 (Aug. 1, 1996).

* cited by examiner

*Primary Examiner*—James Phan
(74) *Attorney, Agent, or Firm*—Hamilton, Brook, Smith & Reynolds, P.C.

(57) ABSTRACT

Retroreflective sheeting for forming orientation free cones of reflected light encompassing a 0.5 degree angle of observation is formed of small metal backed cube corner prisms in an array in which the size of the prisms are in a range between 0.0005 inch to 0.003 inches on center. The array is formed by casting transparent plastic prisms in a mold formed by ruling three sets of grooves which intersect at an angle. The grooves are spaced apart in the range of 0.0005 inch to 0.003 inches on center. Before or after formation, the prisms are coated with a reflective material such as a metal.

14 Claims, 45 Drawing Sheets

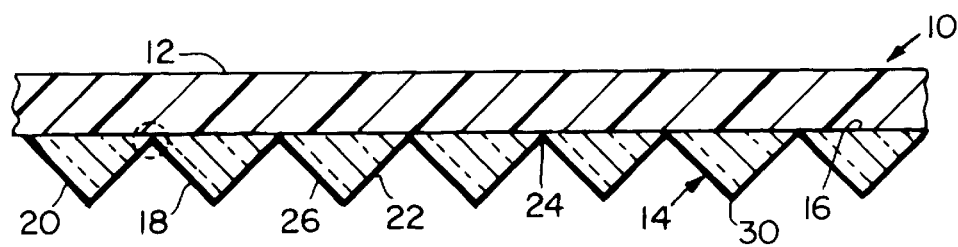
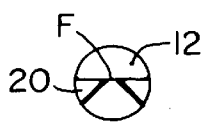
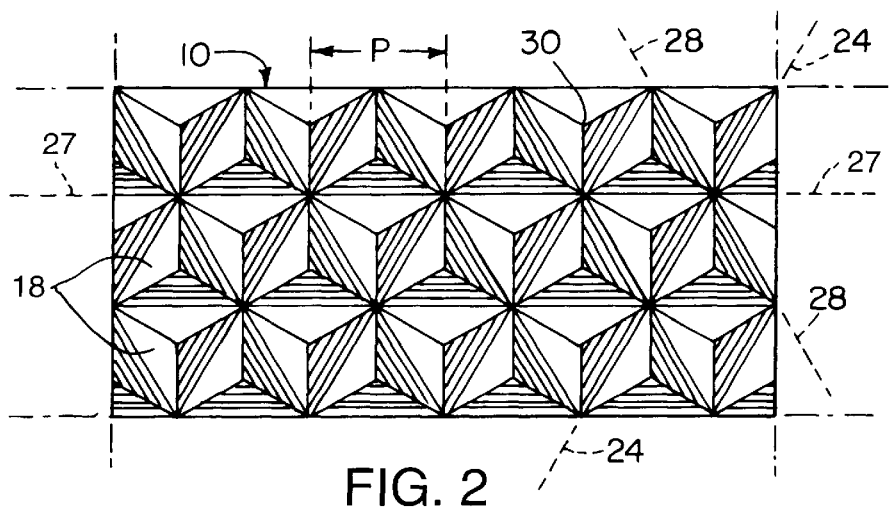
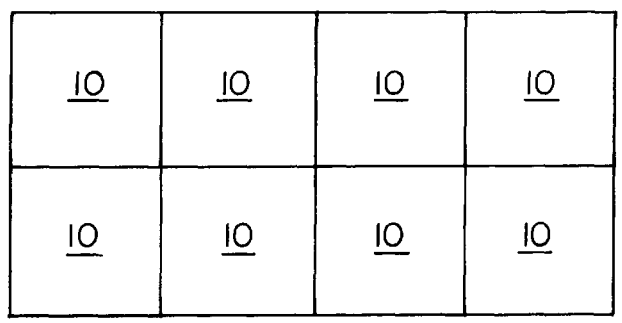
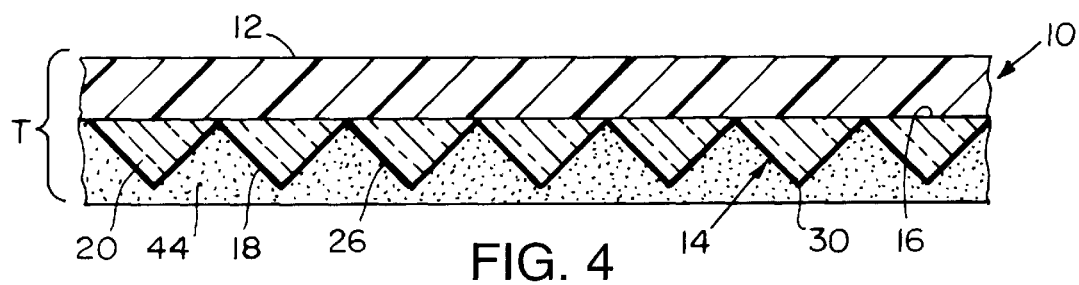

Diffraction Pattern
p = 2/1000"
Angles: 5, 0

Diffraction Pattern
p = 6/1000"
Angles: 5, 0

MINIATURE MICRO PRISM RETROREFLECTOR

RELATED APPLICATIONS

This application is a continuation-in-part of U.S. application Ser. No. 07/717,597, filed Sep. 23, 1996, now U.S. Pat. No. 5,780,140. This application is also a continuation of U.S. application Ser. No. 08/702,245, filed Aug. 28, 1996, now U.S. Pat. No. 5,840,406, which is a division of U.S. application Ser. No. 08/314,487, filed Sep. 28, 1994, now U.S. Pat. No. 5,565,151.

BACKGROUND OF THE INVENTION

This invention pertains to retroreflective materials and most particularly retroreflective material using micro cube corner prisms as the retroreflective elements.

Retroreflective materials are employed for various safety and decorative purposes. Particularly, these materials are useful at night time when visibility is important under low light conditions. With perfect retroreflective materials, light rays are reflected towards a light source in a substantially parallel path along an axis of retroreflectively. For many applications, perfect retroreflectivity is not required. Rather, a compromise is required in which a cone of divergent light is retroreflected which permits enough light to strike the viewer's eye, yet not so much that the intensity of the reflective light at the viewer's eye is unduly diminished. Under circumstances where the only source of illumination is the headlights of an automobile on an unlit road, the ability to retroreflect such a cone of divergence to the eye of the driver is important for safety reasons.

Many types of retroreflective material exist for various purposes. These retroreflective materials can be used as reflective tapes and patches for clothing, such as vests and belts. Also, retroreflective bands can be used on posts, barrels, traffic cone collars, highway signs, warning reflectors, etc. Retroreflective material may be comprised of arrays of randomly oriented micron diameter spheres or close packed cube-corner (prismatic) arrays.

Cube-corner or prismatic retroreflectors are described in U.S. Pat. No. 3,712,706, issued to Stamm (Jan. 23, 1973). Generally, the prisms are made by forming a master negative die on a flat surface of a metal plate or other suitable material. To form the cube-corners, three series of parallel equidistance intersecting V-shaped grooves 60 degrees apart are inscribed in the flat plate. The die is then used as a mold to form a transparent cube-corner array which is then processed into sheets of retroreflective material.

When the groove angle is 70 degrees, 31 minutes, 43.6 seconds, the angle formed by the intersection of two cube faces (the dihedral angle) is 90 degrees and the incident light is reflected back to the source. For automobile headlight reflectors, the dihedral angle is changed slightly so that the incidental light is reflected non-orthogonally towards the driver instead of the source.

Preferably, the retroreflected light from the vehicle headlights should be returned in a cone wide enough to encompass the eye of the vehicle's driver (this angle is referred to as the angle of observation).

At long distances the cone of light need only encompass two-tenths of a degree, but as the distance is decreased and/or as the distance from the head lamps to the eyes of the driver increase (as in the case of the driver of a large truck verses that of a sports car) then the cone of light should be increased to five-tenths or even one degree.

Many attempts have been made to keep the intensity of the retroreflected light uniform over this larger cone. Changing the dihedral angle of the cube corner prism will spread this cone of light, but in a star shaped pattern that is not uniform.

Diffraction of the light (see Stamm U.S. Pat. No. 3,712,706) by the small effective aperture of the cube corner prisms spreads the light, but again in a non-uniform manner with hot spots and nulls in decreasing intensity as the angle of the cone increases.

Mild diffusers have been tried such as texturing the front surface of the material or incorporating light scattering pigments or light refracting particles in a top coating on the front surface or in a top film. This technique scatters or redirects the light over much larger angles beyond the viewing cone so that much of the light is lost.

SUMMARY OF THE INVENTION

Diffraction scattering is most useful but has several drawbacks. Relatively small prisms in the size of 0.006" to 0.12" on centers which are air backed will diffract the light out into a cone of 0.5°, but the light pattern is not uniform. Furthermore, air backed prisms are troublesome and expensive. The reflecting faces of the prisms must be protected from contact with all other materials by constructing air cells in the backing materials. However, when the same size prisms are metalized, the diffraction is much reduced and will not sufficiently encompass the 0.5° angle.

We have found that if the cube corner prism pattern is ruled with prisms spaced in the range of 0.001" to 0.003" on center, and most preferably 0.002" on center, and the resulting prisms are metalized, the retroreflected cone of light is spread out to include a 0.5° observation angle, and the intensity throughout the area is very uniform despite substantial change of the dihedral angle. This result is believed to occur because for very small prisms (0.001" to 0.003"), diffraction effects spread or diverge the light over wide observation angles, and therefore a change in the dihedral angles of the prisms, such as may occur during master generation or product manufacturing, will have less impact on the change in the light distribution. The six overlapping return beams caused by diffraction (see FIG. 4 of U.S. Pat. No. 5,171,624 issued Dec. 15, 1992, and incorporated in its entirety herein by reference) are diverging much more in the very small metallized prisms, so that as the dihedral angles change and the six beams move apart the central portion of the entire light distribution will retain light longer (at a greater dihedral angle) than with larger prisms, i.e., in excess of 0.003".

The extreme cases are very large prisms that return six well collimated beams that do not overlap each other versus metalized very small prisms that return very divergent beams that overlap each other. A substantial dihedral angle change will cause the beams retroreflected from the large prism to completely separate from each other leaving a dark area in the center of the return beam. The same dihedral angle change in the small prisms will cause the beam spread to be the same, but because of the divergence caused by diffraction, the edges of the beams will still be overlapping, and a dark area will not occur.

The result will be a much safer product, because a dihedral angle change will not leave dark areas in the retroreflected light distribution.

BRIEF DESCRIPTION OF THE DRAWINGS

FIG. 1 is a cross-sectional view of a retroreflective structure in accordance with the invention.

FIG. 2 is a plan view of the structure of FIG. 1 as viewed from the prism side.

FIG. 3 is a plan view of several sheets of prism array tiles of the invention parqueted together.

FIG. 4 is a sectional view as in FIG. 1 showing the array of FIG. 1 embedded in an adhesive.

FIG. 5 is an enlarged view of a portion of the section of FIG. 1 showing the optional creation of flats at the prism intersections.

Figure 6:
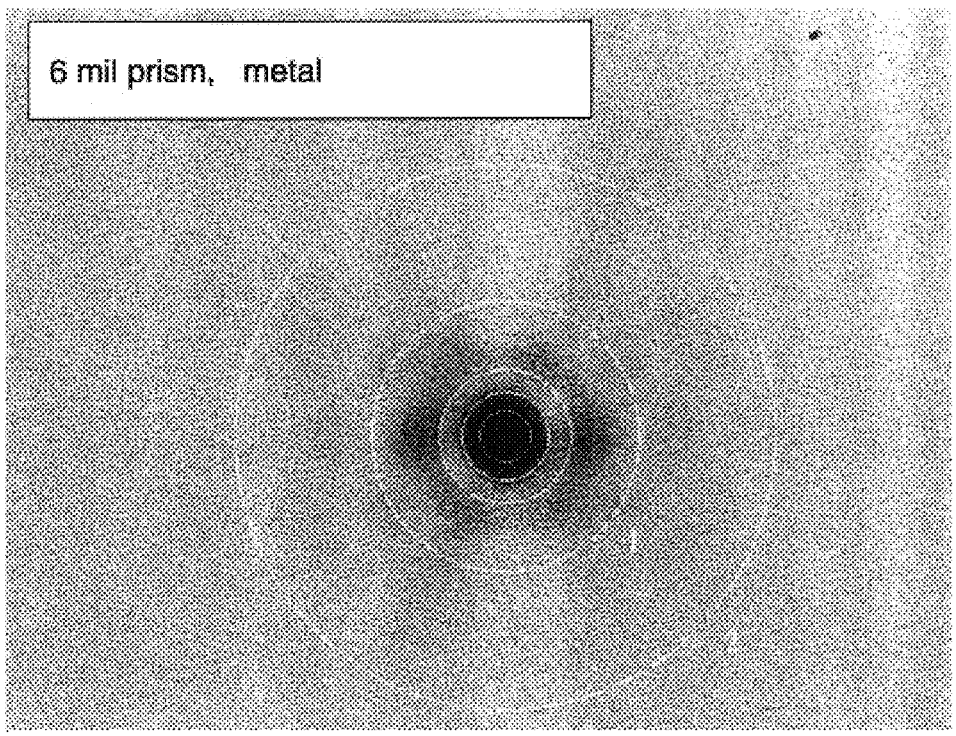
FIG. 6 is a photo of the retroreflected light intensity pattern for a 6 mil. pitch prism array with metal backing.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The features and other details of the method and apparatus of the invention will now be more particularly described with reference to the accompanying drawings and pointed out in the claims. The same numeral present in different figures represents the same item. It will be understood that the particular embodiments of the invention are shown by way of illustration and not as limitations of the invention. The principal features of this invention can be employed in various embodiments without departing from the scope of the invention.

One embodiment of the invention, as shown in the cross-sectional view of FIG. 1 is retroreflective structure 10. Retroreflective structure 10 may be generally formed of a base film or substrate 12 and a retroreflective cube-corner prism array 14.

Film 12 may typically comprise a plastic material such as a polymer, and preferably an elastomeric polymer, which can recover substantially its original shape after a deforming force has been removed. Preferably, the elastomeric polymer is transparent to visible light and is composed of a polymer, such as polyurethane, polyisobutylene, polyester, polybutadiene, polyvinyl chloride or polyvinylidene chloride. Alternatively, the polymer can be a copolymer or terpolymer, such as poly(ethylene-propylene), poly(styrene-butadiene), poly(vinyl acetate-vinyl chloride) and poly (ethylene-vinyl acetate).

The array 14 consists of retroreflective cube-corner prism elements 20. The prism array 14 has a window or aperture side 16 and three-sided facet side 18. The prisms 20 of the prism array 14 are also formed of a transparent plastic, such as a polymer that has a high modulus of elasticity. The polymer may be selected from a wide variety of polymers, including urethane, acrylic acid esters, cellulose esters, ethylenically unsaturated nitriles, hard epoxy acrylates, etc. Other polymers may include polycarbonates, polyesters and polyolefins, acrylated silanes, hard polyester urethane acrylates. Preferably, the array elements 20 are cast in a prismatic mold with a monomer or oligomer. Polymerization is typically initiated by ultraviolet radiation.

The array 14 is preferably formed by casting or molding the plastic material of the array in a metal or plastic mold (not shown) which is ruled with a diamond tool. The rulings extend in three intersecting planes 24, 27 and 28 (FIG. 2), spaced 60° apart and (as previously mentioned) to the extent the groove angle is 70 degrees, 31 minutes and 43.6 seconds, the angle formed by the intersection of the two groove faces (the dihedral angle) will be 90 degrees. Note, however, since a single mold is reused to cast many generations of arrays, it is likely that this dihedral angle will vary slightly from array to array.

Next, facets 18 of the prisms 20 are provided with a reflective coating 26, preferably by depositing a metal film on the surface (during or after the array is removed from the mold). Typically the coating is formed by sputtering or vacuum depositing aluminum, silver or gold.

In accordance with the invention, the center-to-center spacing (or pitch=p) between the apices of adjacent prisms is in the range of 0.0005" to 0.003", with a preferred range between 0.001" and 0.003", and most preferably about 0.002".

The array 10 shown in FIGS. 1 and 2 may be replicated several times and seamed together to form tiles of arrays 10 as in FIG. 3. Before or after tiling, the facet side of the arrays may be coated with an adhesive 44 as in FIG. 4, and bonded to a metal panel (not shown).

Such very small prisms have some disadvantages and many advantages. The main negative is that it is very difficult to rule an array of 0.002" on center prisms over a large area, as the ruling cutting diamond wears out. Also, due to the many strokes required, the time on the ruling machine is excessive. Also, vibration, temperature and humidity variation come into play to a greater extent because of the time required to cut the master. So one must be content to use small ruled areas and parquet or tile replicas to make a large area mold. Alternatively, using the process described in U.S. Pat. No. 5,558,740 issued Sep. 24, 1996 (incorporated in its entirety herein by reference), the several prism arrays may be formed on several drums and seamed together.

We have found, however, that the advantages of very small prisms are many and important. The smaller the prism the less it is stressed. Stress caused during prism formation by the polymerization of the oligomer is reduced as each 0.002" prism contains 27 times less oligomer than the prior art 0.006" pitch size prisms. Stress caused by distortion of the substrate 12 is now divided into nine times as many segments, and the adhesive 44 used to bond the metalized prism surface to a backing panel can be made three times as thin. Also, a very desirable feature is that the total thickness T (FIG. 4) which includes the adhesive 44, top film 12 and any coating (not shown) can be reduced by about 0.002". Such a very thin product with the increased number of prisms and resulting prism intersections increases the flexibility of the product. The optional addition of micro textured flats F of about 40 to 60 millionths in width (FIG. 5) at the increased number of prism intersections (there are approximately 500,000 prisms per square inch) or the optional addition of textured windows as in U.S. Pat. No. 5,565,151, issued Oct. 15, 1996 (incorporated herein by reference in its entirety) can be used to create a very uniform high Cap Y (whiteness) product. The thin finished product is less susceptible to removal from various substrates by power washing or abrasion because of the very thin edge produced. The product can be made to be frangible, so that as the product breaks apart prism by prism, less retroreflective area will be lost. Printing of patterns on the prism front faces or the top film or coating surface will result in less retroreflected light loss because the edges of the pattern will effect more prisms but overall less active retroreflecting area.

An important feature of the invention is the use of metalized prisms in combination with the less than 0.006" on centers prism size. Conventional prior art air backed prisms reflect at the prism facets by internal reflection. This is, when light goes from a high index material, plastic or glass to an air interface and the angle of incidence is greater than the so-called critical angle, the light is internally reflected. Also, the polarization of the light is rotated 90° at each of the three internally reflecting faces.

This phase change, created by the polarization rotation, has the effect of breaking up the single aperture (the base of the prism receiving the exiting light) into six smaller apertures. Reference: *Applied Optics*, 35(22), Aug. 1, 1996. B. C. Park, T. B. Eom and M. S. Chung. The smaller the aperture the greater divergence of the light that is diffracted. The result is that 0.006" pitch air backed prisms spread the light by diffraction over a fairly wide cone angle.

Metalized prisms reflect at each of the prism reflecting faces by specular reflection, and the polarization of the light is rotated 180°. With a retroreflective cube corner prism, the light is reflected sequentially off the three faces. The full 180° rotation of all of the light causes the light to have a phase change which causes less interference than the phase changes that occur in the air backed cube corner prisms.

When the prism is metalized, no effective polarization rotation occurs and the base of the prism acts as a single aperture which is six times as large as that of the equivalent pitch air backed prism. The result is that in the metalized prisms the diffraction phenomenon is greatly reduced and, as a result the light intensity is concentrated in the center or first maxima.

In order to create the same diffraction scattering phenomenon of an air backed prism, the metalized prism must therefore be six times smaller than the air backed prism. A metalized prism of 0.00256" on centers will diffraction scatter the light to the same extent as an air backed prism 0.006" on centers.

The smaller the prism pitch, the greater is the diffraction spreading of the returned retroreflected light. Therefore, air backed prisms in the size range of 0.006" to 0.012" will diffract enough to scatter the retroreflected cone of light wide enough to satisfy the 0.5° angle of observation performance required for highway use.

However, the same size prisms with metal backing will perform only marginally at the 0.5° angle of observation. Conversely, we have found that microprisms in the order of 0.002" on center when air backed diffract the light so widely that they will not meet the 0.5° requirement. However, when they are metalized, as disclosed herein, they return the ideal pattern of light for highway use.

Also, by using metalized very small or "micro-micro" size prisms, the disadvantages of air backed large prisms are avoided, i.e., extra layers and thickness and sealing to provide the air cells, the thickness caused by the height of the prisms and the stiffer substrates required to support the larger prisms.

EXPERIMENTAL DATA OBTAINED USING STANDARD TEST METHODS FOR RETROREFLECTIVE SHEETING

The following terms have the following meanings as used herein:

"entrance angle β" is the angle between the illumination axis and the retroreflector axis;

"observation angle α" is the angle between the axes of the incident beam and the observed (reflected) beam (in retroreflection, between the illumination axis and the observation axis);

"orientation angle" or the "rotation angle ε" is in retroreflection, the angle indicating the orientation of the specimen when it is rotated about the retroreflector axis; and "orientation free," means that the intensity of the retroreflected light is substantially constant over a range of orientation angles.

Figure 7:
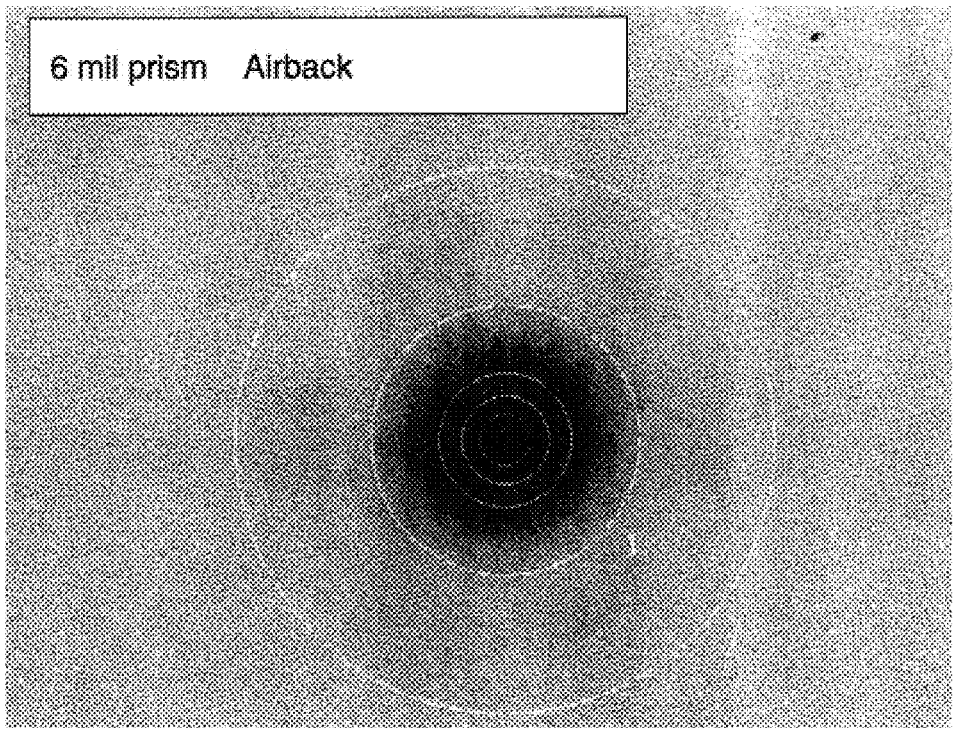
FIG. 7 is a photo of the retroreflected light intensity pattern for a 6 mil. pitch prism array with air backing.
Figure 8:
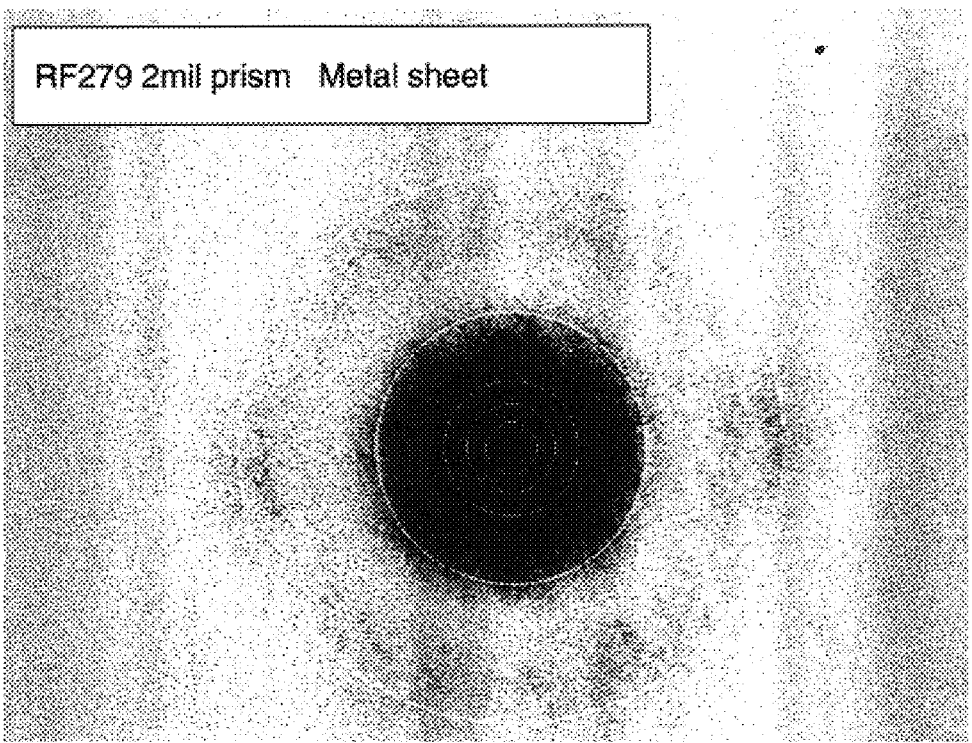
FIG. 8 is a photo of the retroreflected light intensity pattern for a 2 mil. (0.002") pitch prism array with metal backing.
Figure 9:
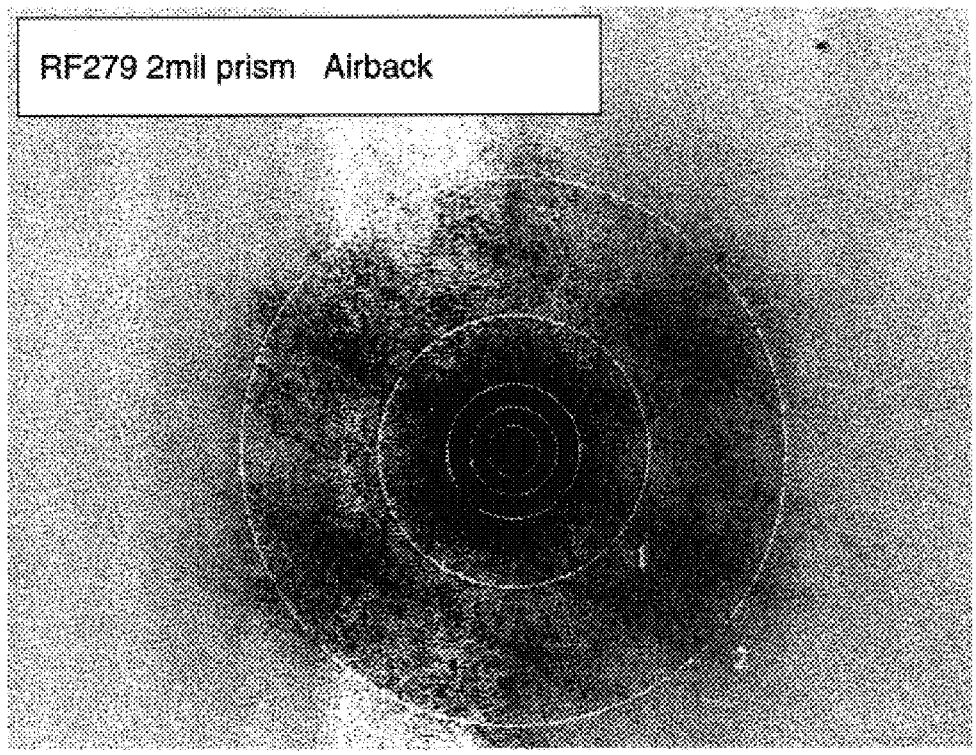
FIG. 9 is a photo of the retroreflected light intensity pattern for a 2 mil. (0.002") pitch prism array with air backing.

FIGS. 6–9 are photographs which show the retroreflected light intensity pattern for various pitch size prism arrays. FIG. 6 shows the pattern for a 6 mil. (0.0055") pitch prism array with metal backing, and FIG. 7 is a comparable pattern for the same pitch size prism with air backing. FIGS. 8 and 9 show the metal (FIG. 8) and air backed (FIG. 9) intensity patterns for a 2 mil. (0.002") pitch size prism array, respectively. Note that the metalized 0.002" pitch prism array intensity pattern is slightly larger than the air backed 0.0055" pitch prism array intensity pattern and much larger than the metalized 0.0055" pitch prism array intensity pattern. The metalized 0.002" pitch array gives excellent retroreflective performance at all important observation, orientation and entrance angles.

Figure 10:
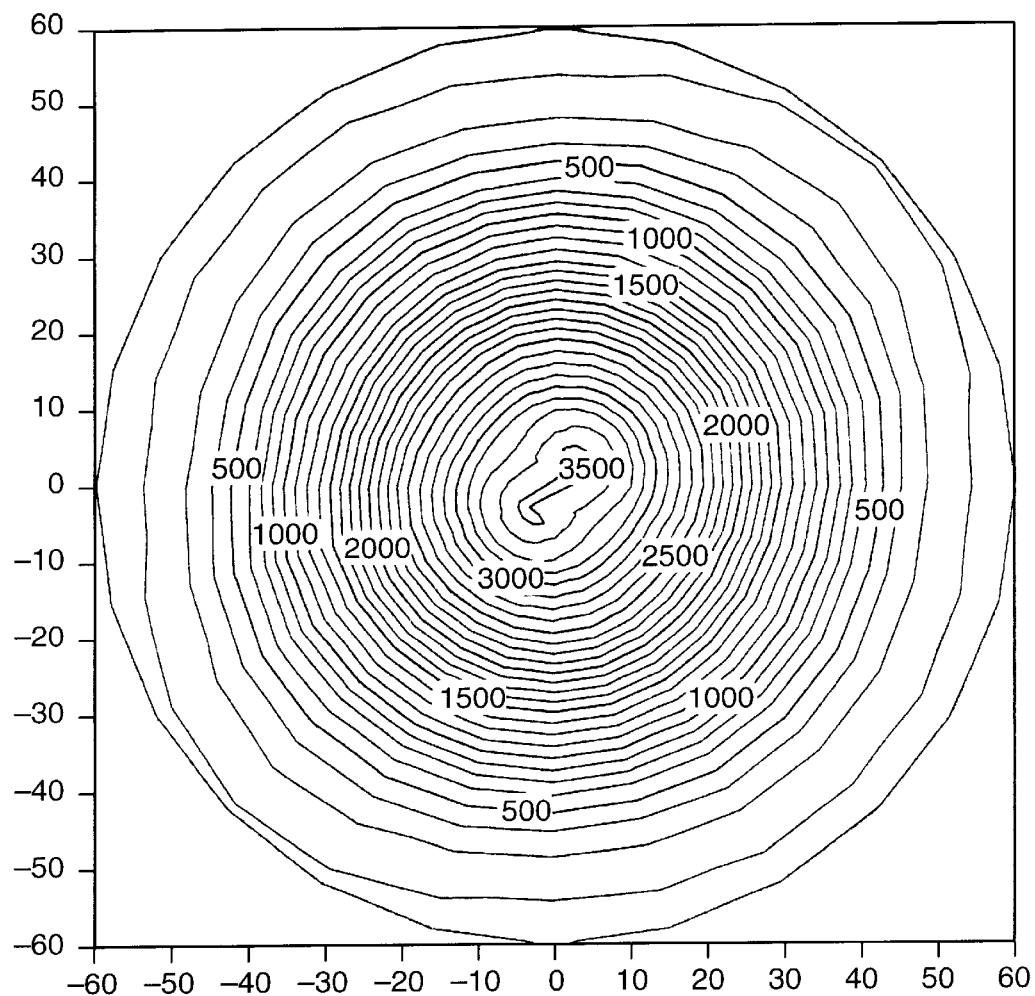
FIGS. 10–12 are brightness polar plots at a 0.10 observation angle of a metal backed 0.0055" prism array as the dihedral angle is changed in 1.5 minute increments.
Figure 11:
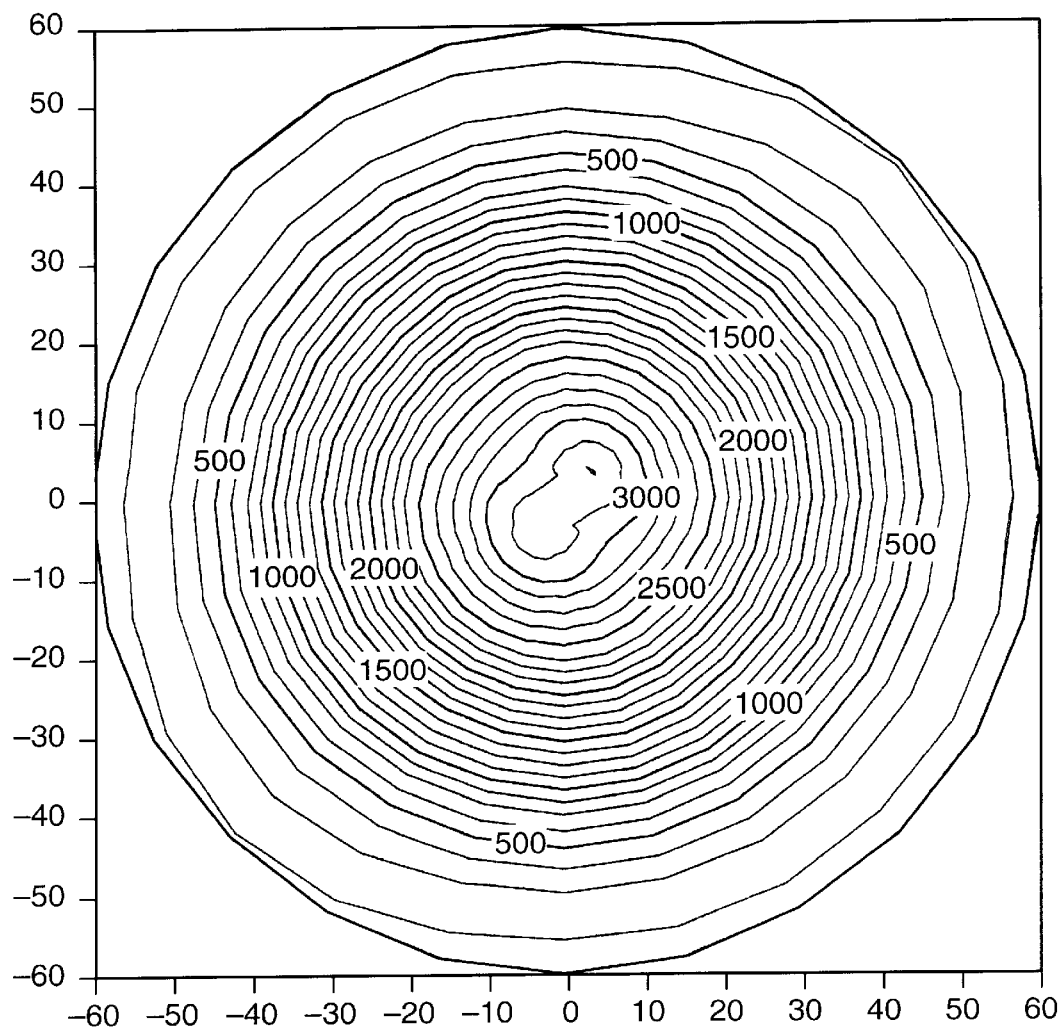
Figure 12:
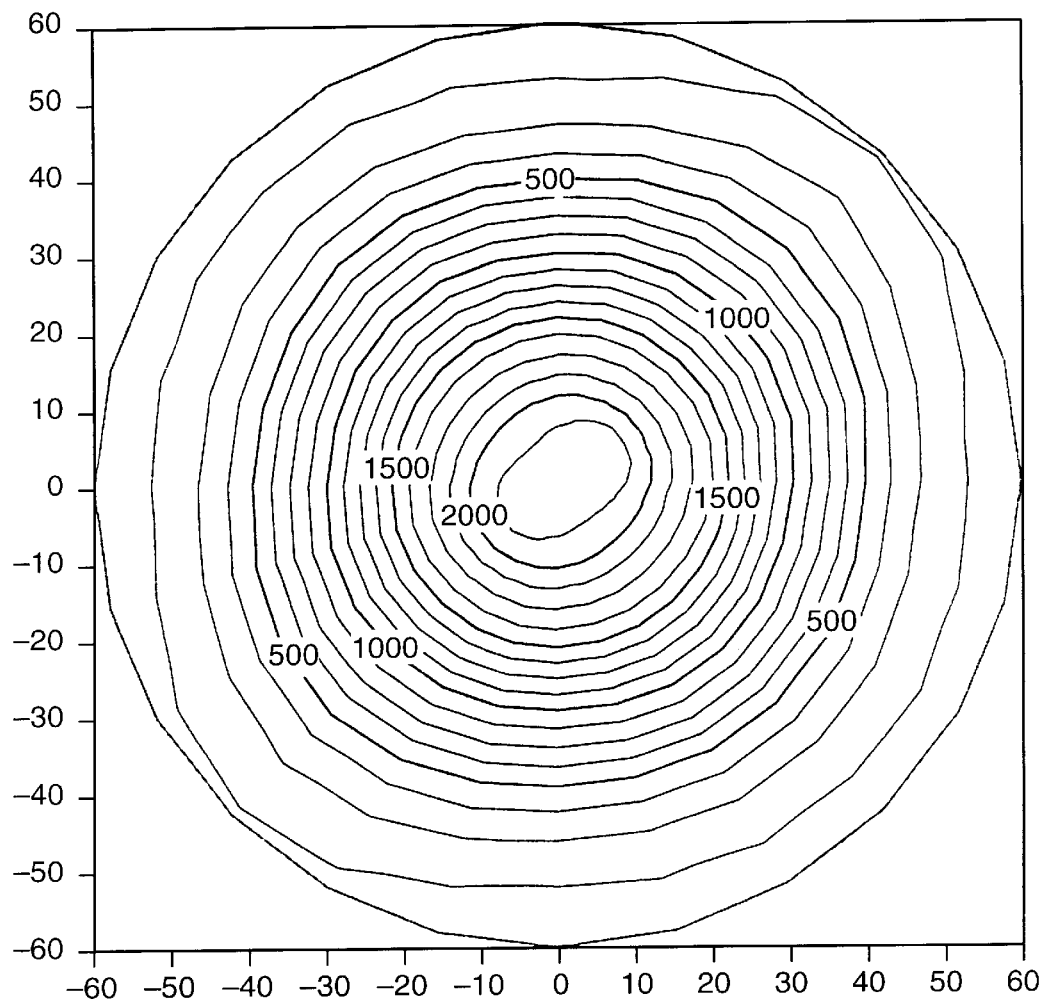
Figure 13:
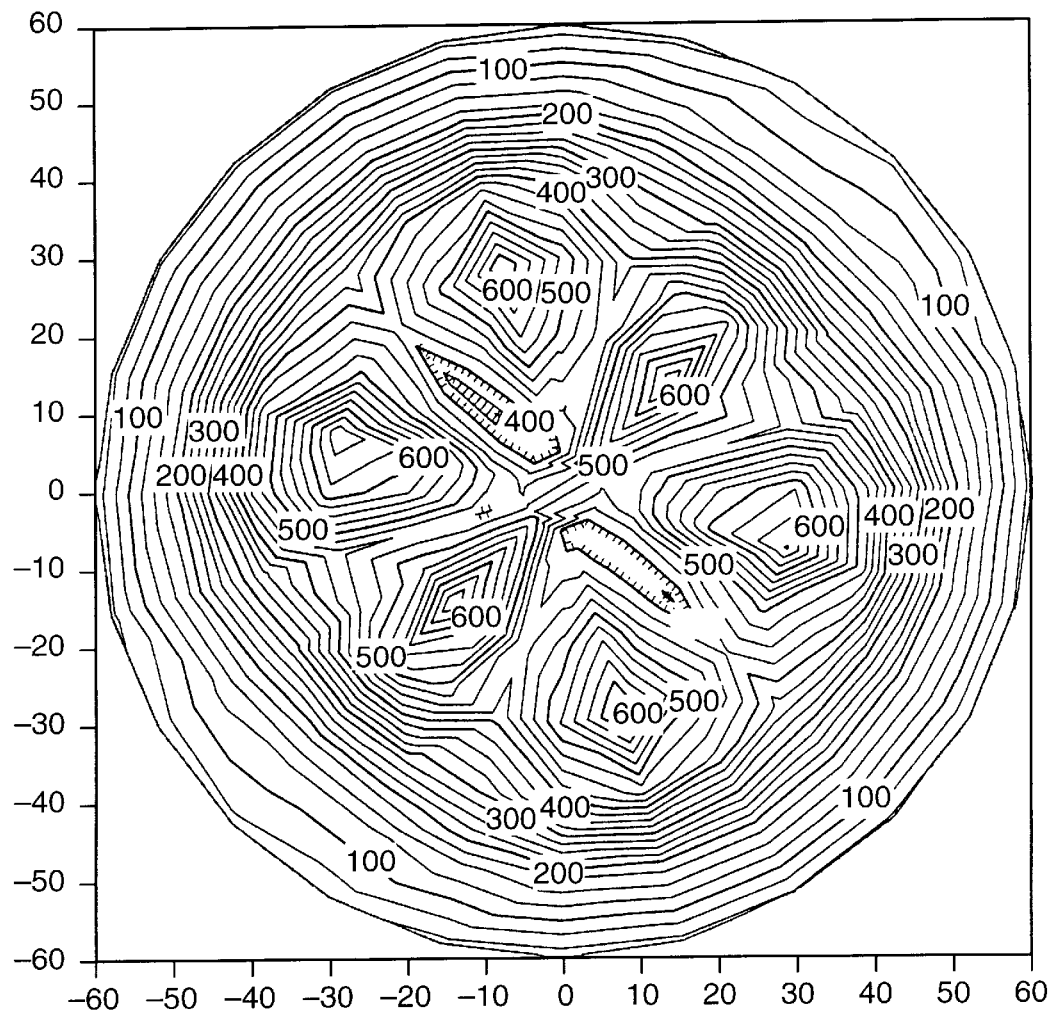
FIGS. 13–15 are brightness polar plots at a 0.33 observation angle of a metal backed 0.0055" prism array as the dihedral angle is changed in 1.5 minute increments.
Figure 14:
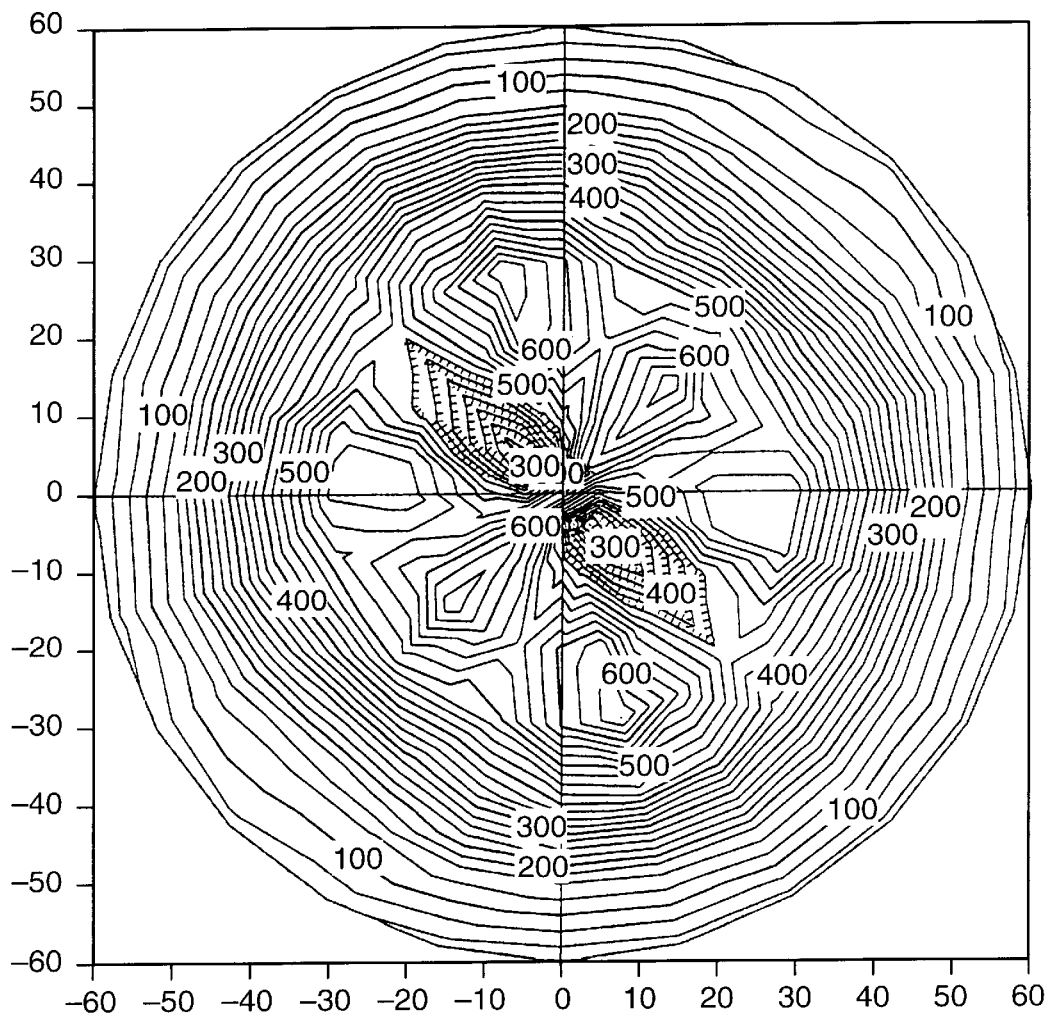
Figure 15:
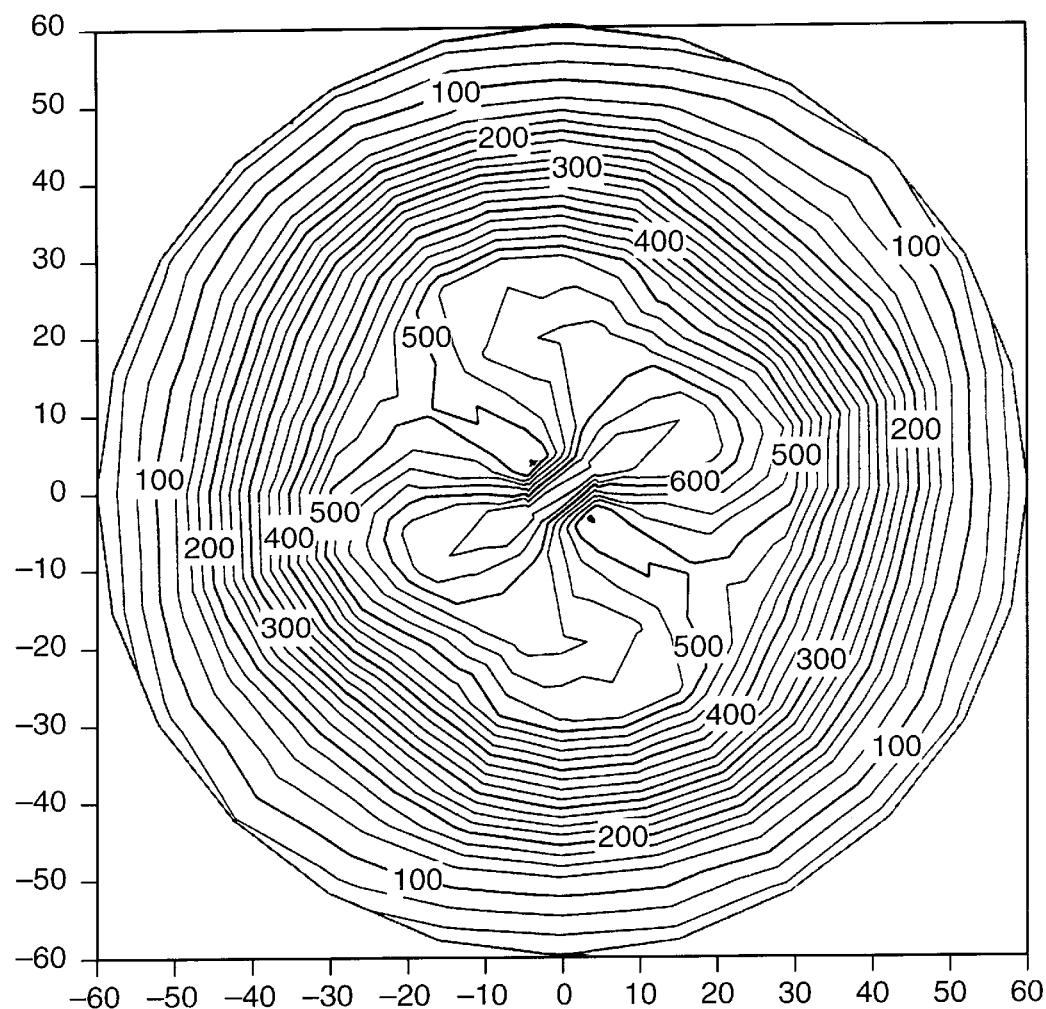
Figure 16:
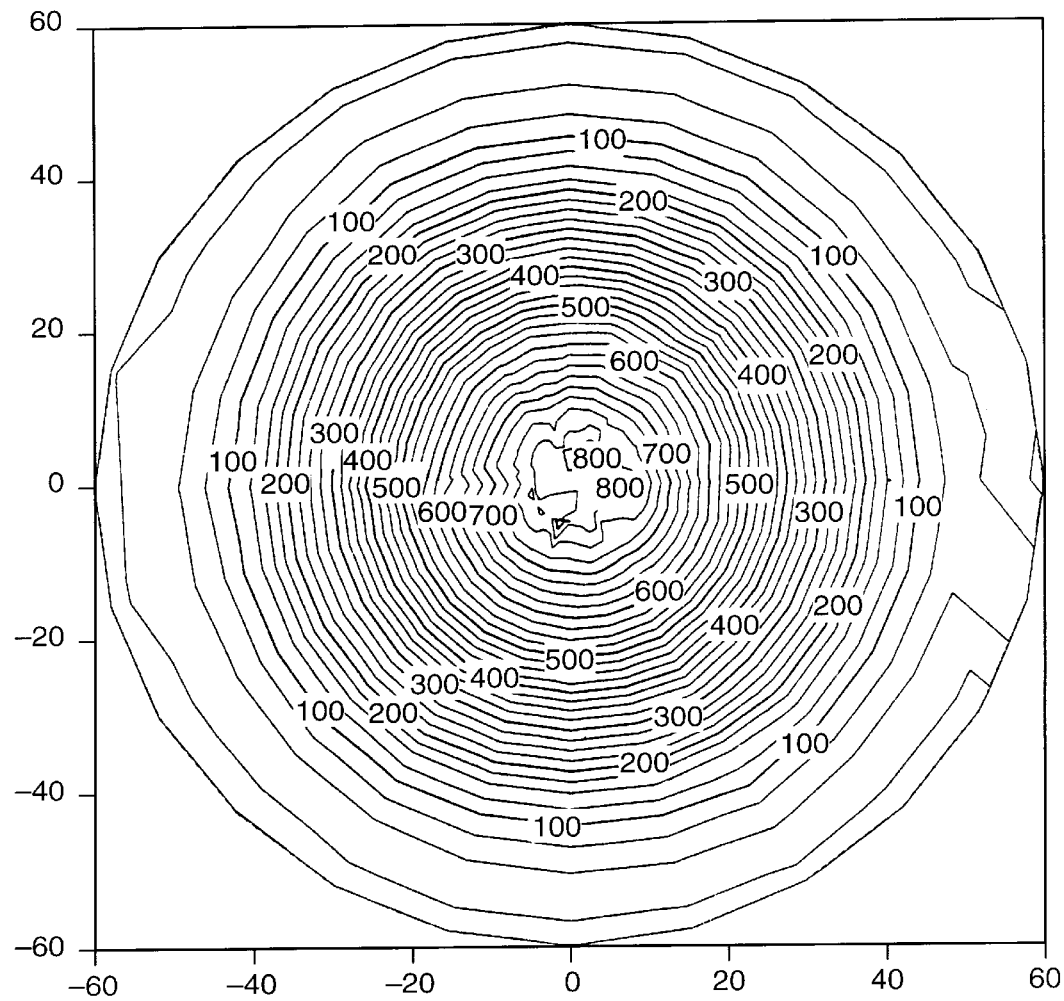
FIGS. 16–18 are brightness polar plots at a 0.10 observation angle of a metal backed 0.002" prism array as the dihedral angle is changed in 1.5 minute increments.
Figure 17:
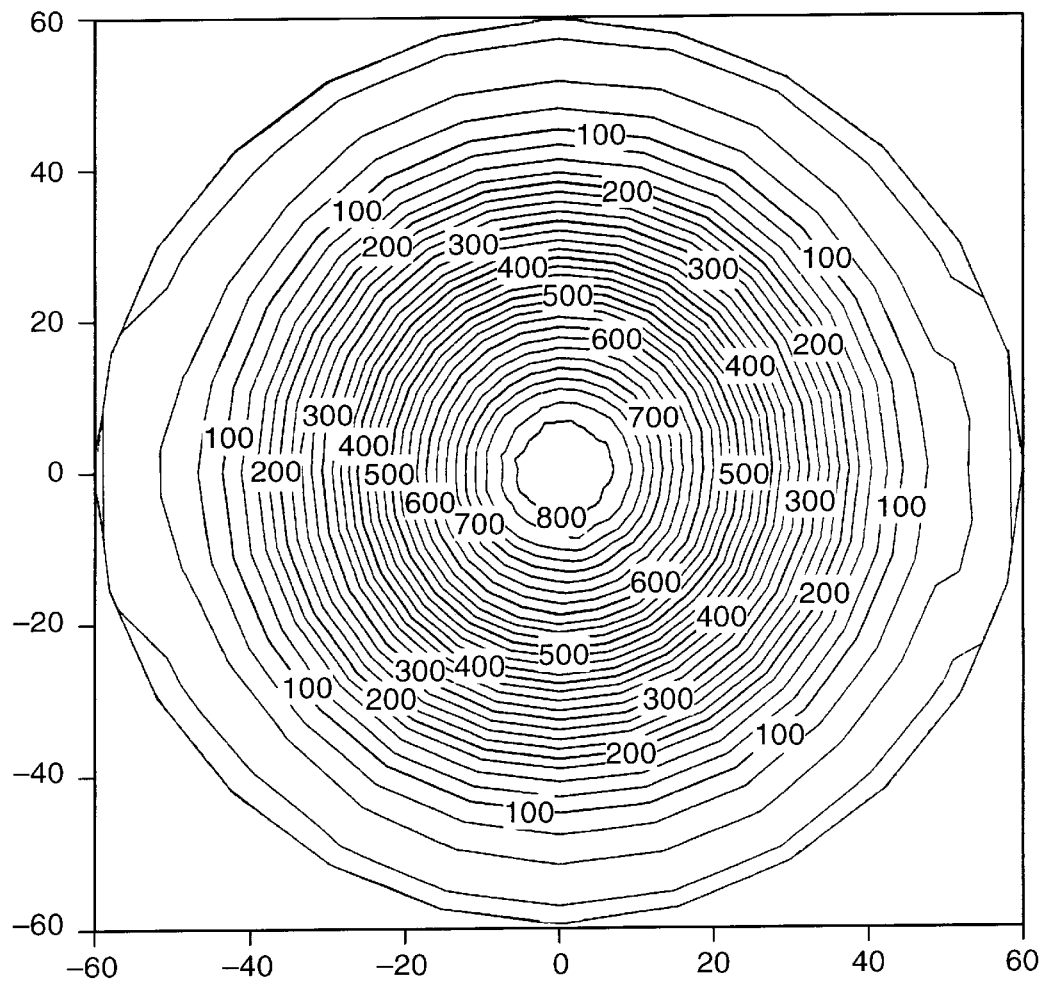
Figure 18:
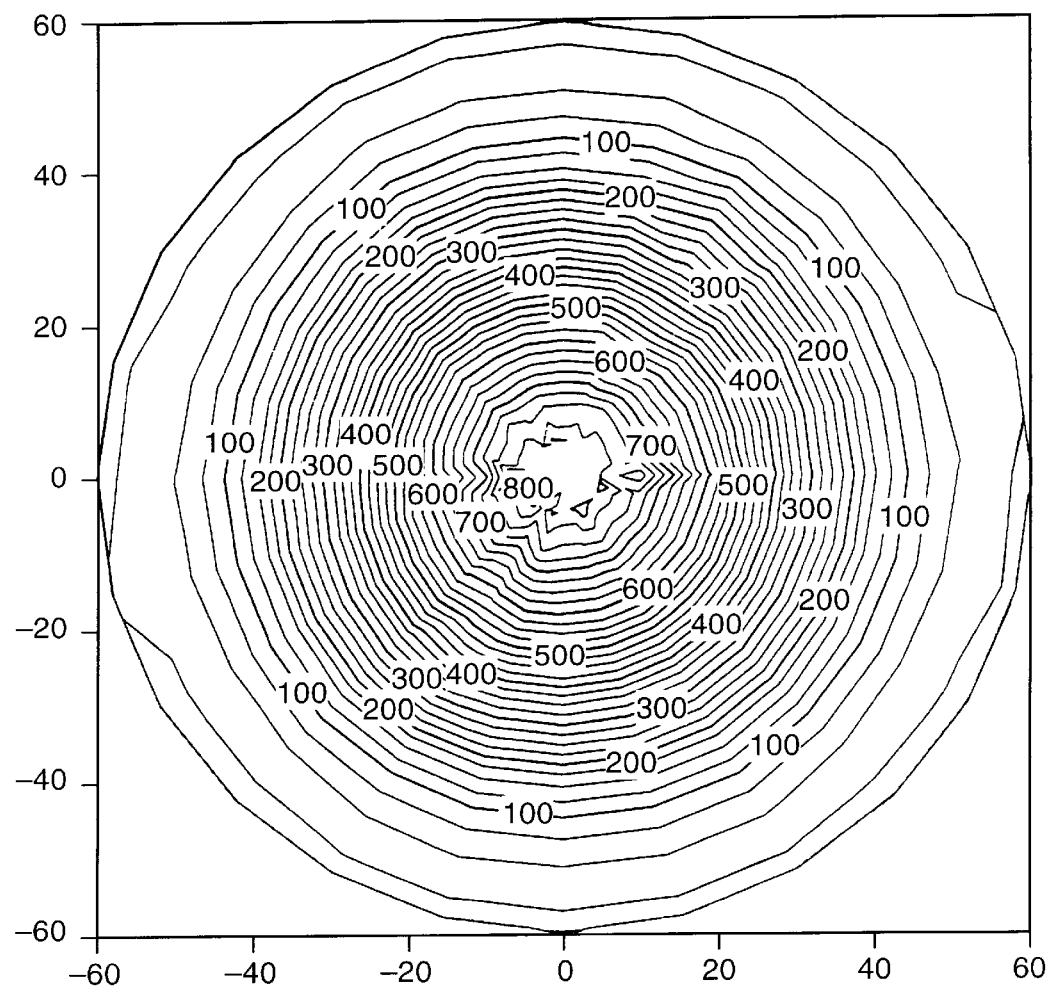

The polar plots of FIGS. 10–18 illustrate the change in brightness of various metal backed prism array pitch sizes at a 0.10 observation angle as the dihedral angle is changed in increments of 1.5 minutes. Note that the entrance angles are as indicated at the X and Y axis, and the orientation angles are plotted clockwise above the perimeter with 90° located at 12 o'clock. FIGS. 10, 11 and 12 are polar plots of a 0.0055" pitch prism array; FIGS. 13–15 are plots of a 0.55" pitch size array, and FIGS. 16–18 are plots for a 0.002" pitch size array.

Figure 19:
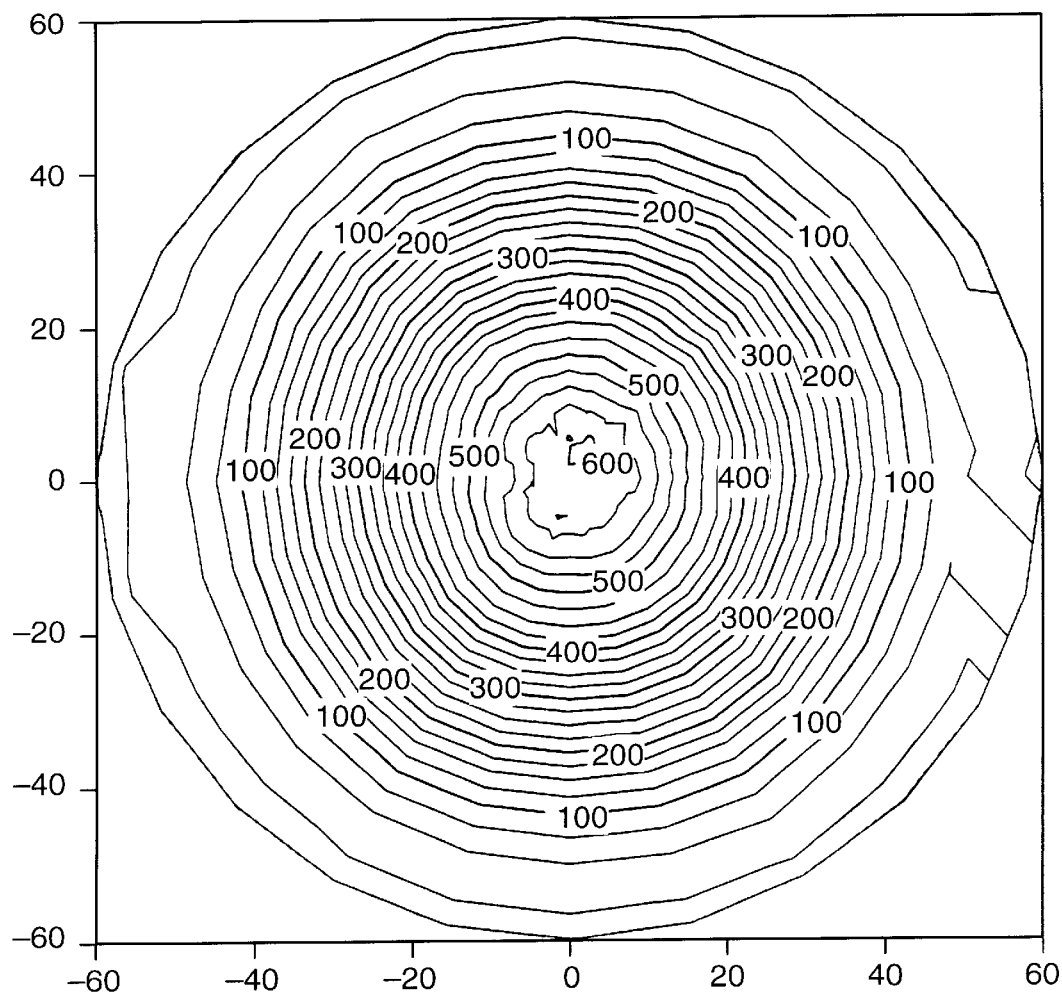
FIGS. 19–21 are brightness polar plots at a 33° observation angle of a metal backed 0.002" prism array as the dihedral angle is changed in 1.5 minute increments.
Figure 20:
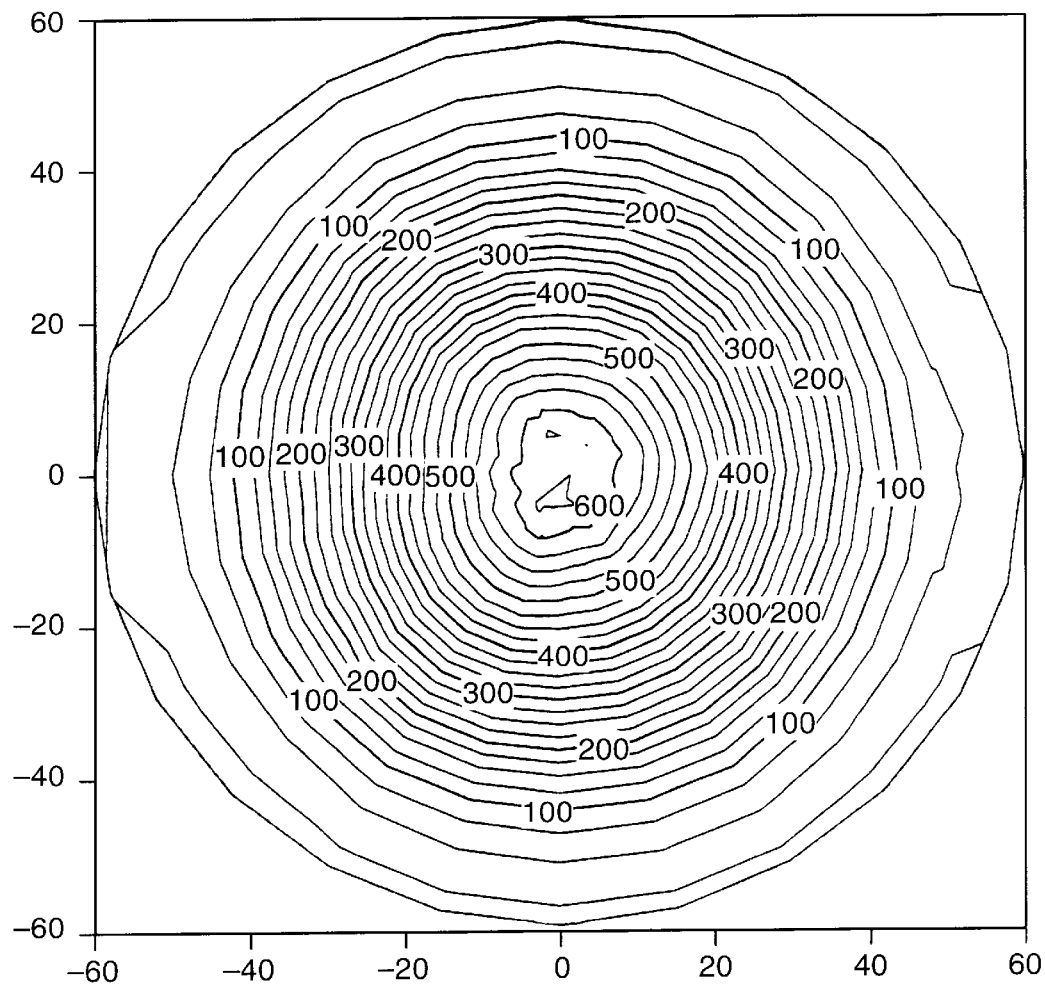
Figure 21:
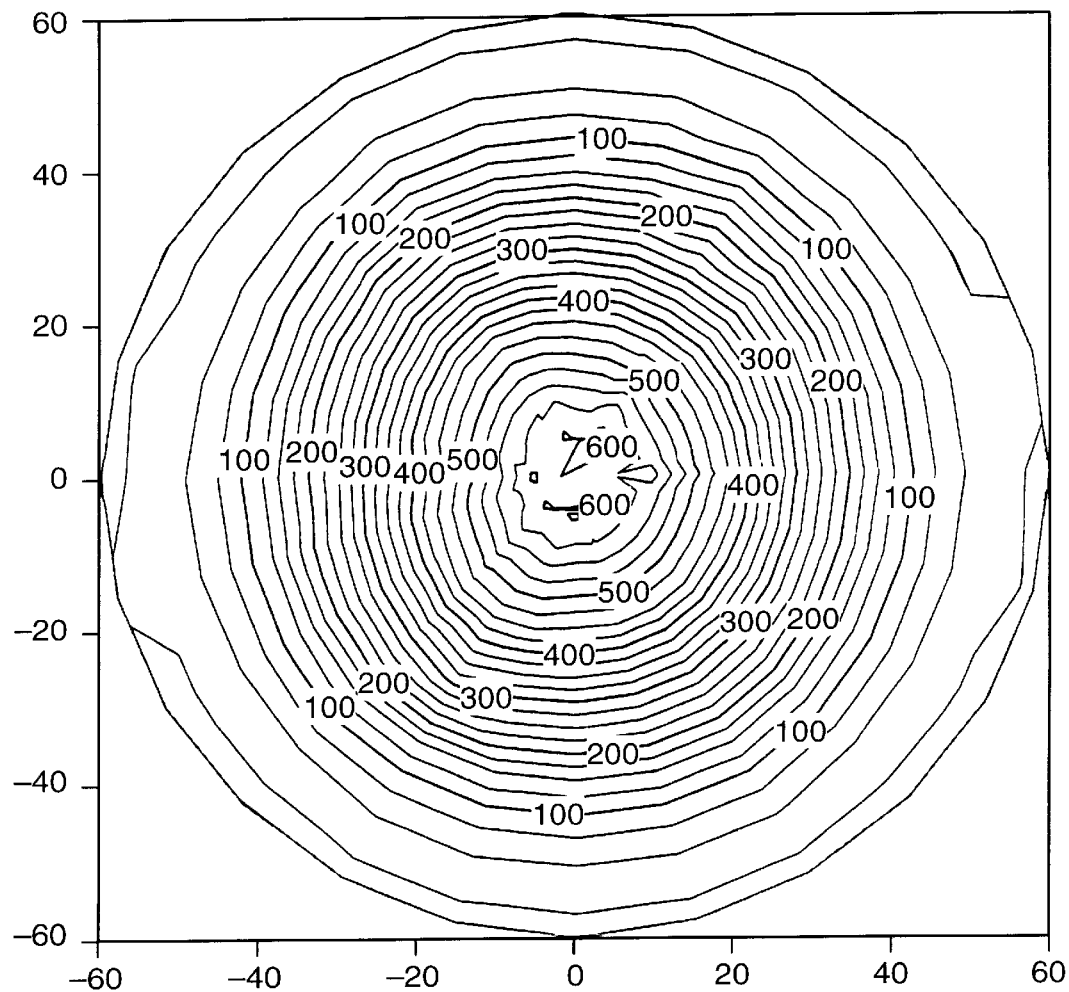
Figure 22A:
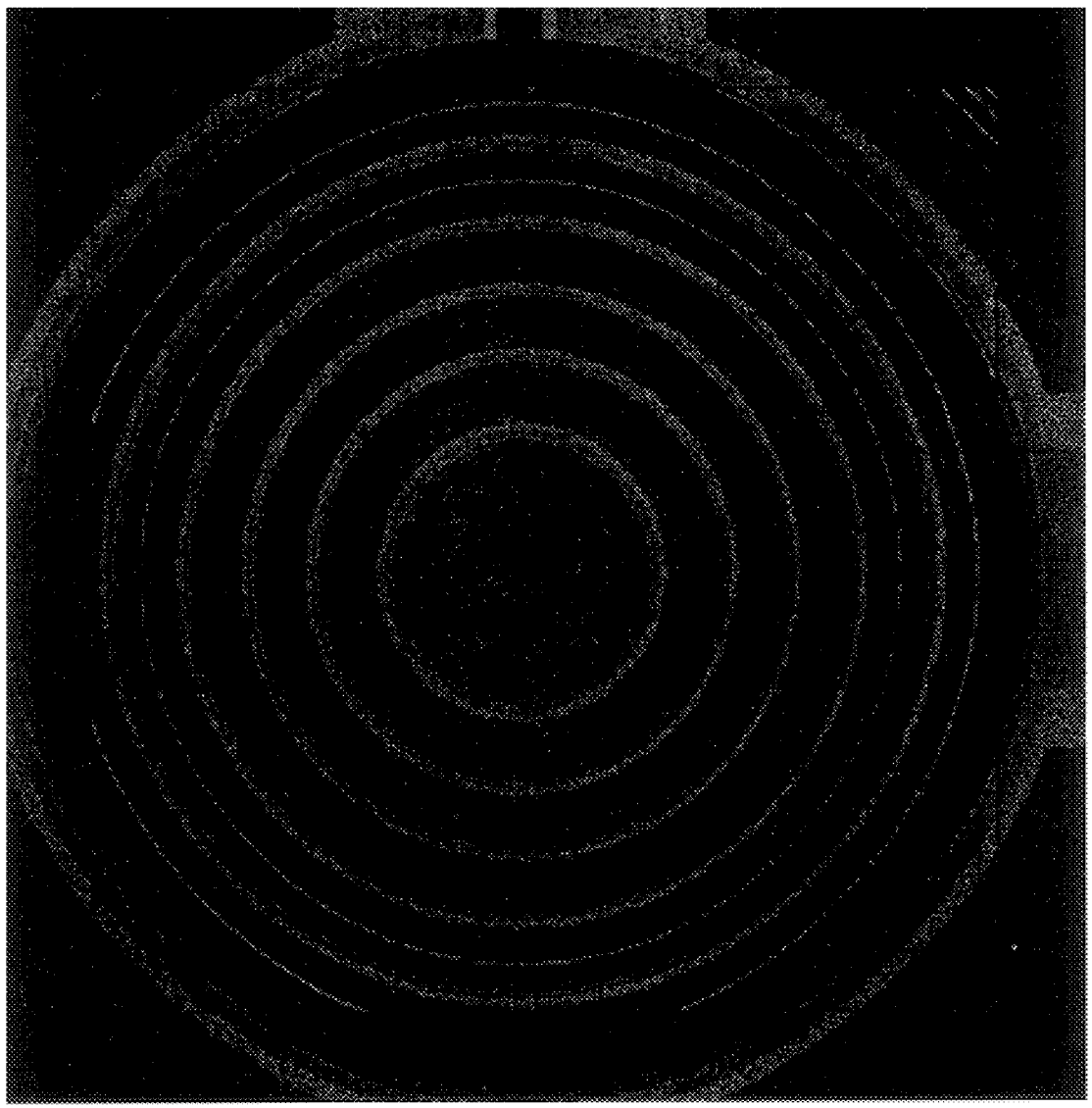
FIG. 22A is a computer-generated theoretical diffraction pattern plot of a metal backed 0.002 pitch prism array.
Figure 22B:
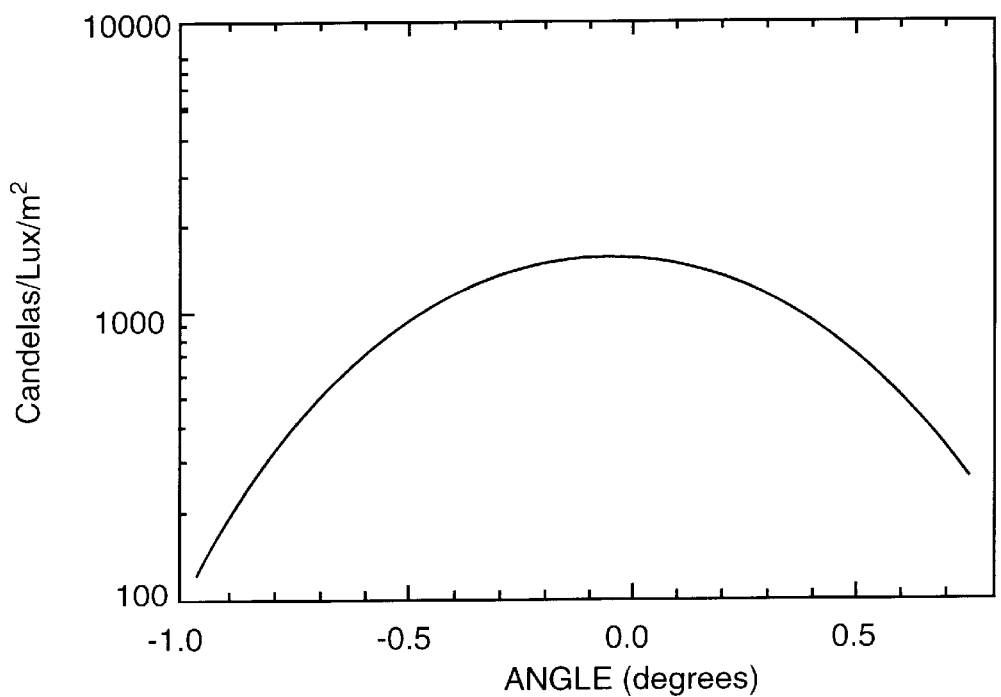
FIG. 22B is an intensity plot versus angle of observation for a metal backed 0.002 pitch prism array.
Figure 22C:
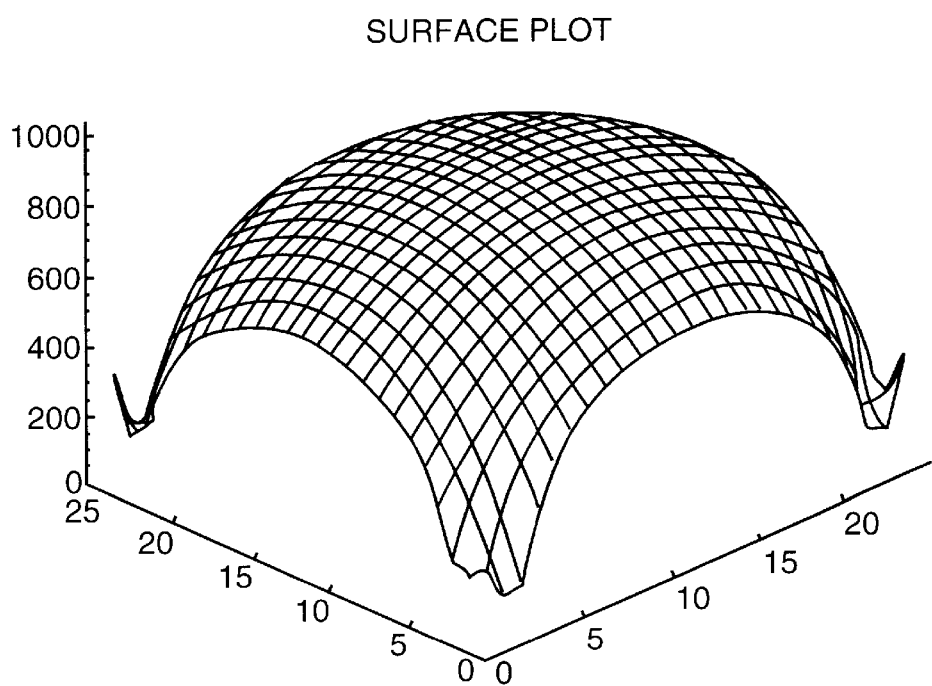
FIG. 22C is a computer-generated three-dimensional surface plot of a metal backed 0.002 pitch prism array.
Figure 23A:
FIG. 23A is a computer-generated theoretical diffraction pattern plot of a metal backed 0.006 pitch prism array.
Figure 23B:
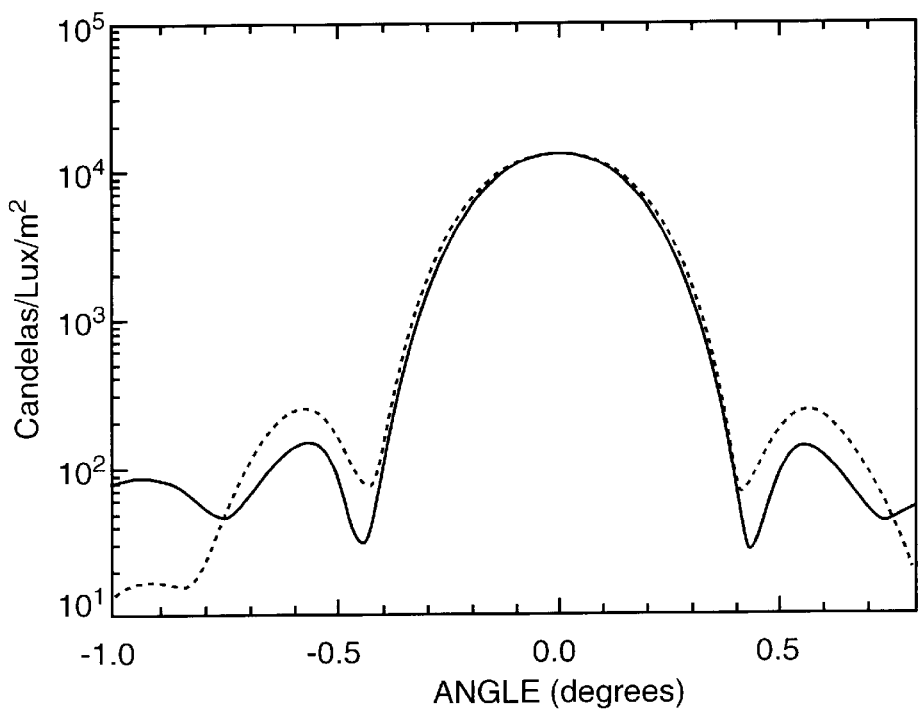
FIG. 23B is an intensity plot versus angle of observation for a metal backed 0.006 pitch prism array.
Figure 23C:
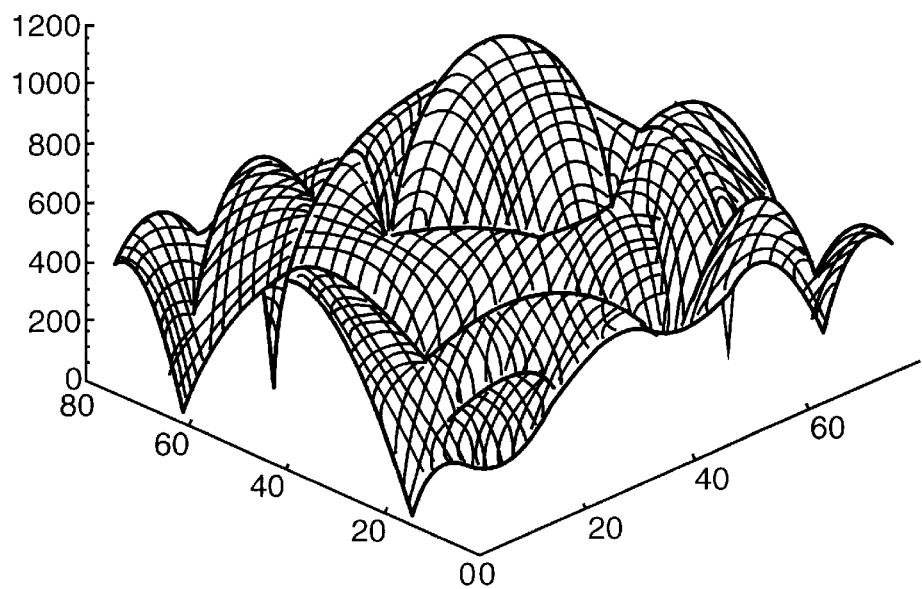
FIG. 23C is a computer-generated three-dimensional surface plot of a metal backed 0.006 pitch prism array.

The plots of FIGS. 19–21 are for a 0.002" pitch size, metal backed prism array at a 33° observation angle with dihedral angle changes in 1.5 minute increments.

Note how the brightness changes at the center of the 0.0055" pitch prism array charts (FIGS. 10–12) as the dihedral angle changes and how the brightness does not change at the center of the 0.002" pitch prism array charts (FIGS. 16–21) as the dihedral angle changes. The smaller prism retroreflected brightness is much less sensitive to changes in the dihedral angle because of the increased diffraction spreading of light that takes place. At the 0.33 observation angle (FIGS. 13–15) the shape of the 0.0055" pitch prism array pattern is also changing because the measurements at this angle are in an area near the edge of the diffracted beam central maxima. A larger prism will show an even greater change with dihedral angle.

FIGS. 22A–22C and FIGS. 23A–23C are computer plots of the theoretical reflected light intensity distribution of a metal backed 0.002" pitch prism array and a metal backed 0.006 pitch prism array, respectively. The A plots show the observation angle diffraction pattern for zero° to 360° orientation angles, the B plots show the intensity (candles per lux per m$^2$) versus observation angle, and the C plots are three-dimensional surface plots of observation angle α on the X and Y axis for zero° to 360° orientation angles ε.

These plots clearly show the much improved uniformity of the diffraction pattern in the smaller prism. The retroreflected light is very uniform out beyond the 1.0 degree observation angle.

Figure 24:
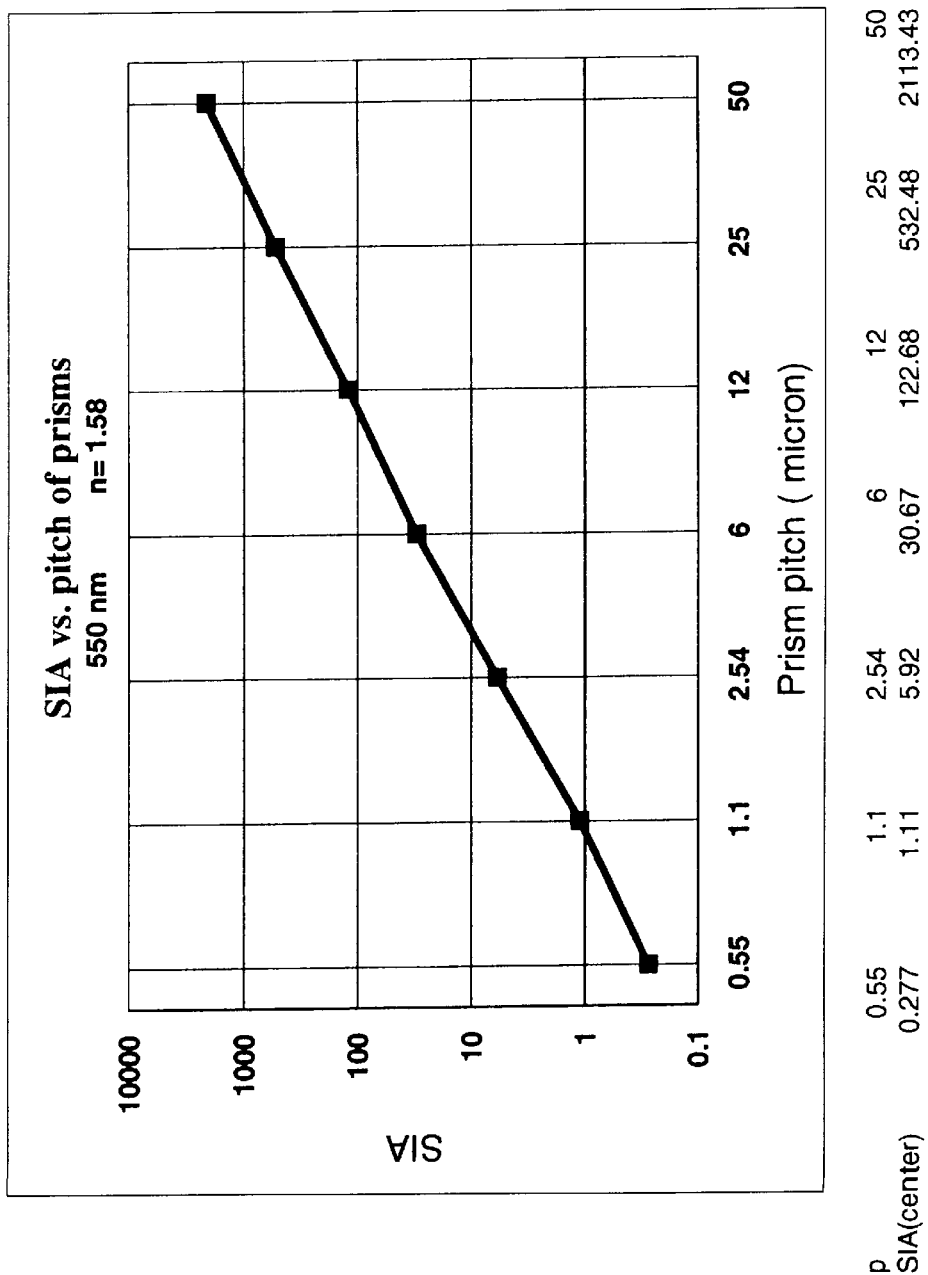
FIG. 24 is a plot of specific intensity per unit area (SIA) versus prism pitch size.
Figure 25A:
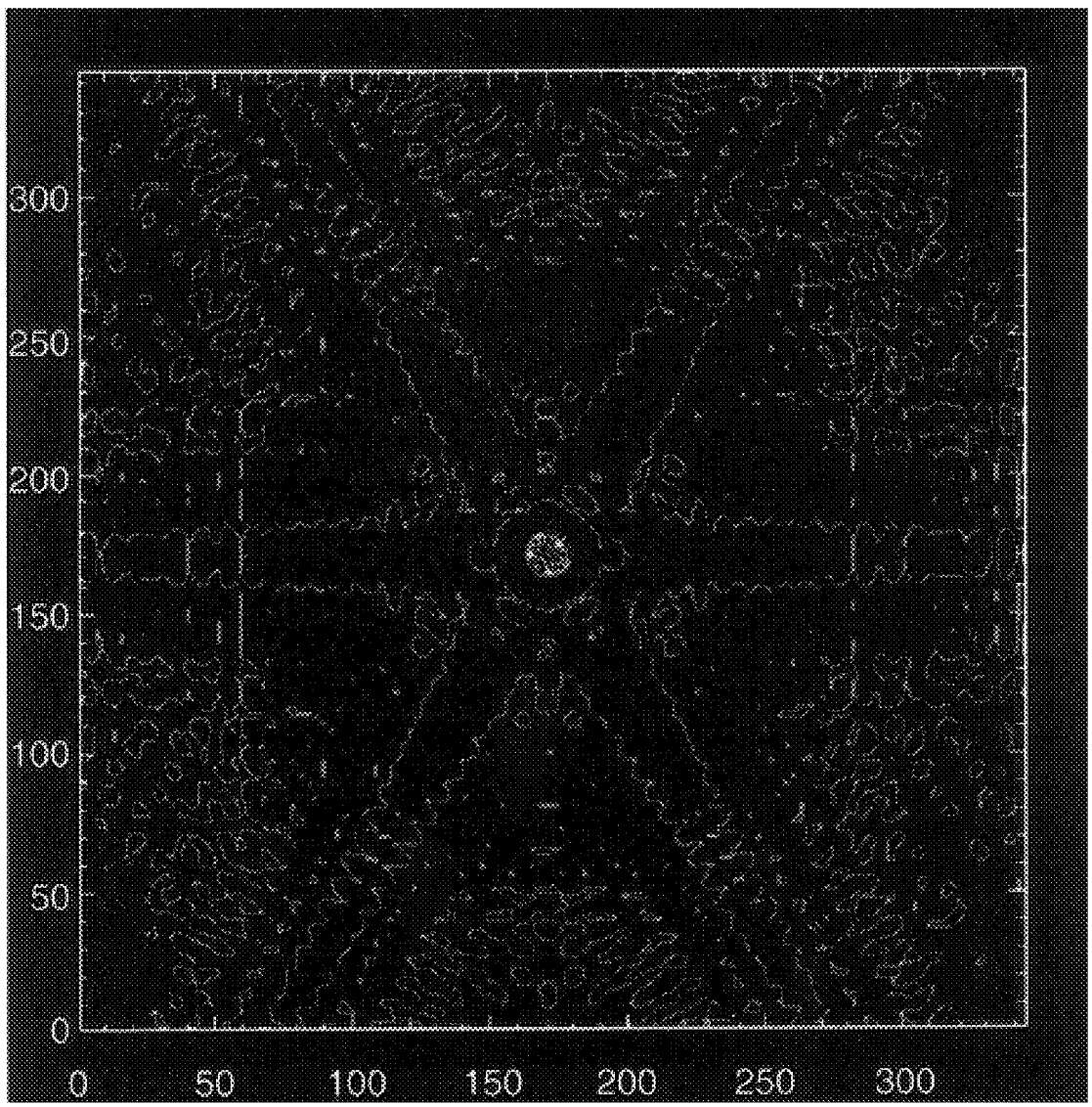
FIG. 25A is a two-dimensional isometric photograph of a graph of the retroreflected light distribution from a 2 mil. pitch metal backed prism array.
Figure 25B:
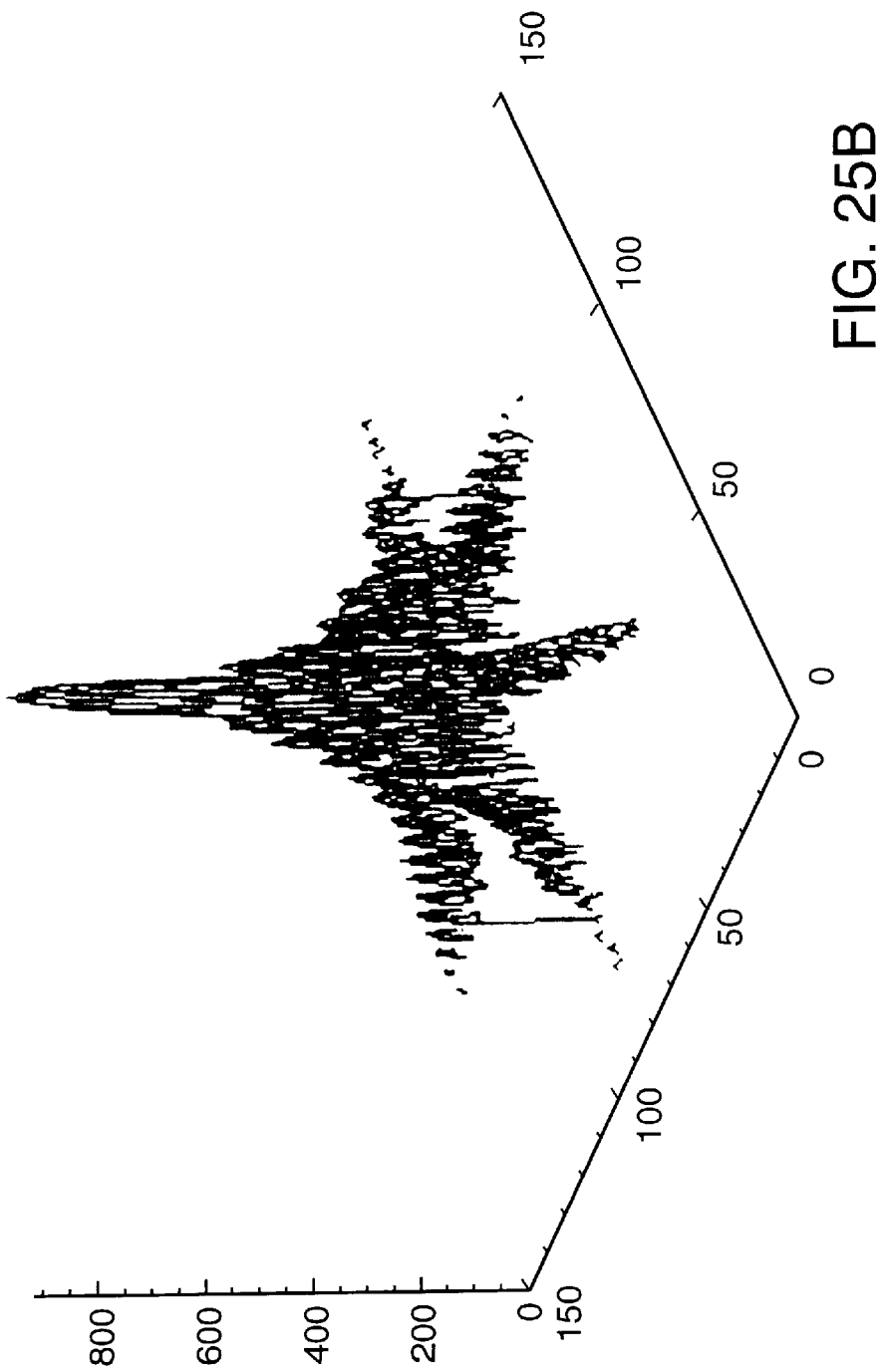
FIG. 25B is a three-dimensional plot of the retroreflected light from a 2 mil. pitch metal backed prism array.
Figure 25C:
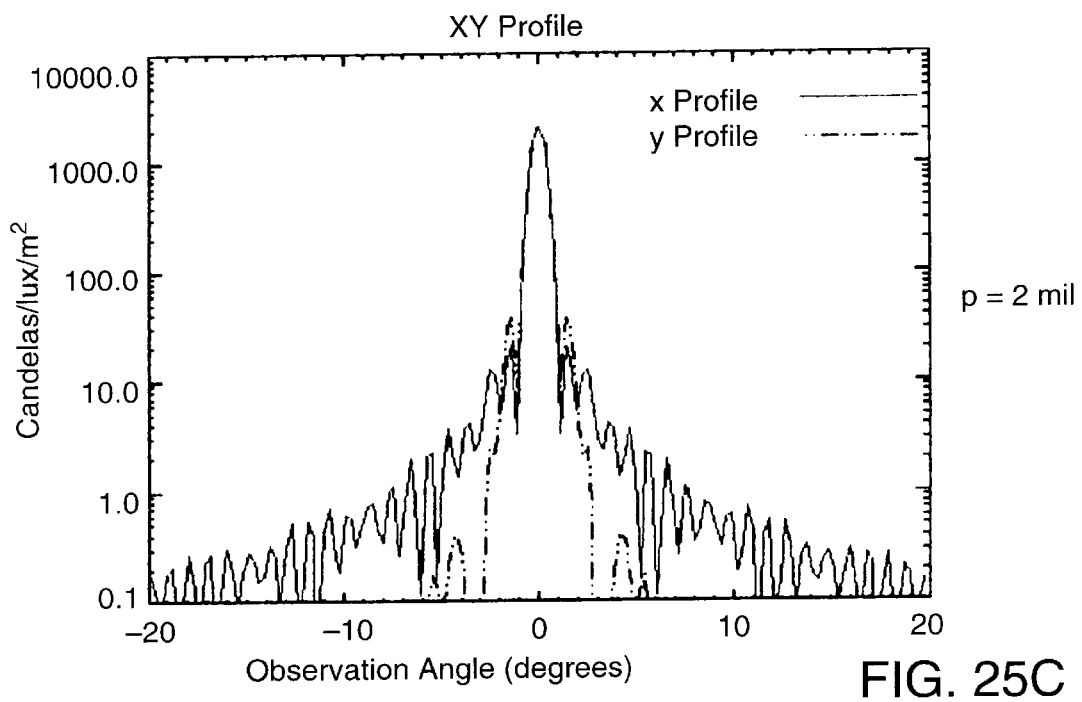
FIG. 25C is an X-Y profile of the retroreflected light distribution from a 2 mil. pitch metal backed prism array.
Figure 25D:
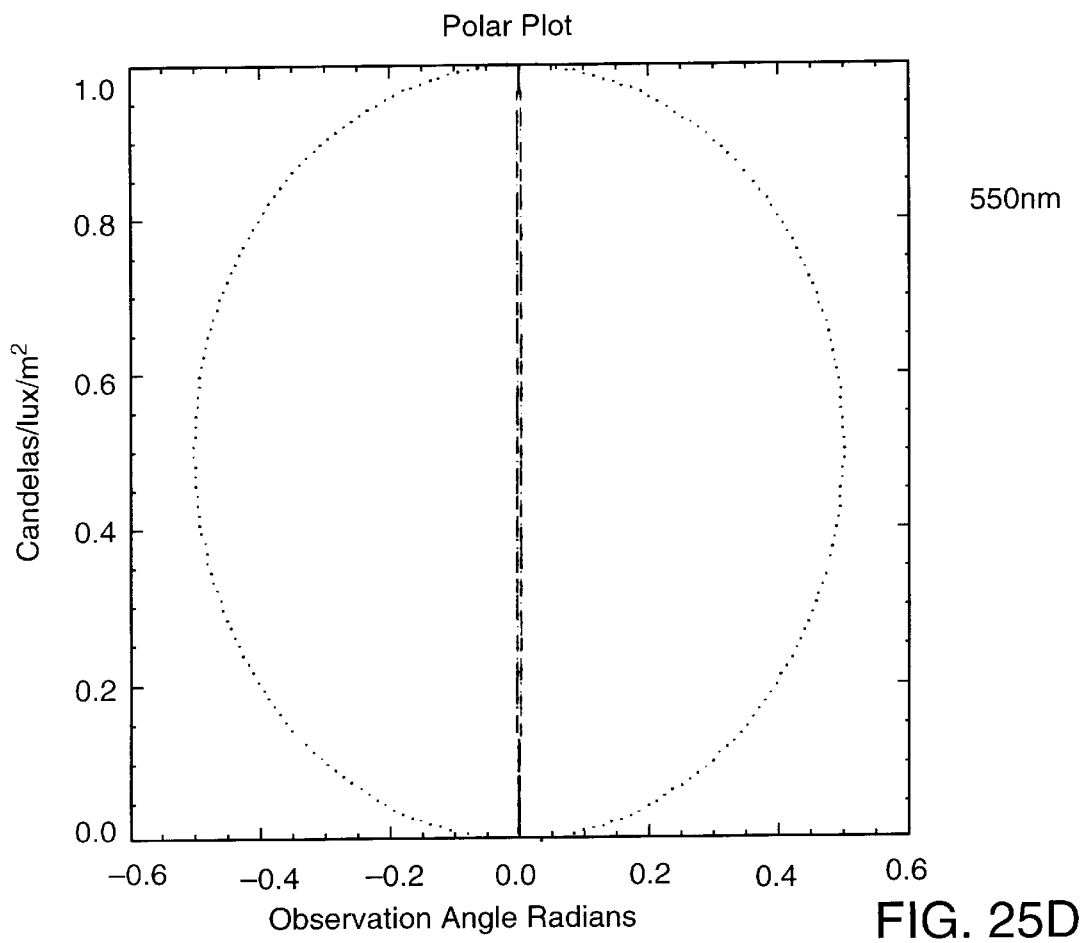
FIG. 25D is a polar plot of retroreflected light distribution in comparison to an ideal diffuser surface for a 2 mil. pitch metal backed prism array.
Figure 26A:
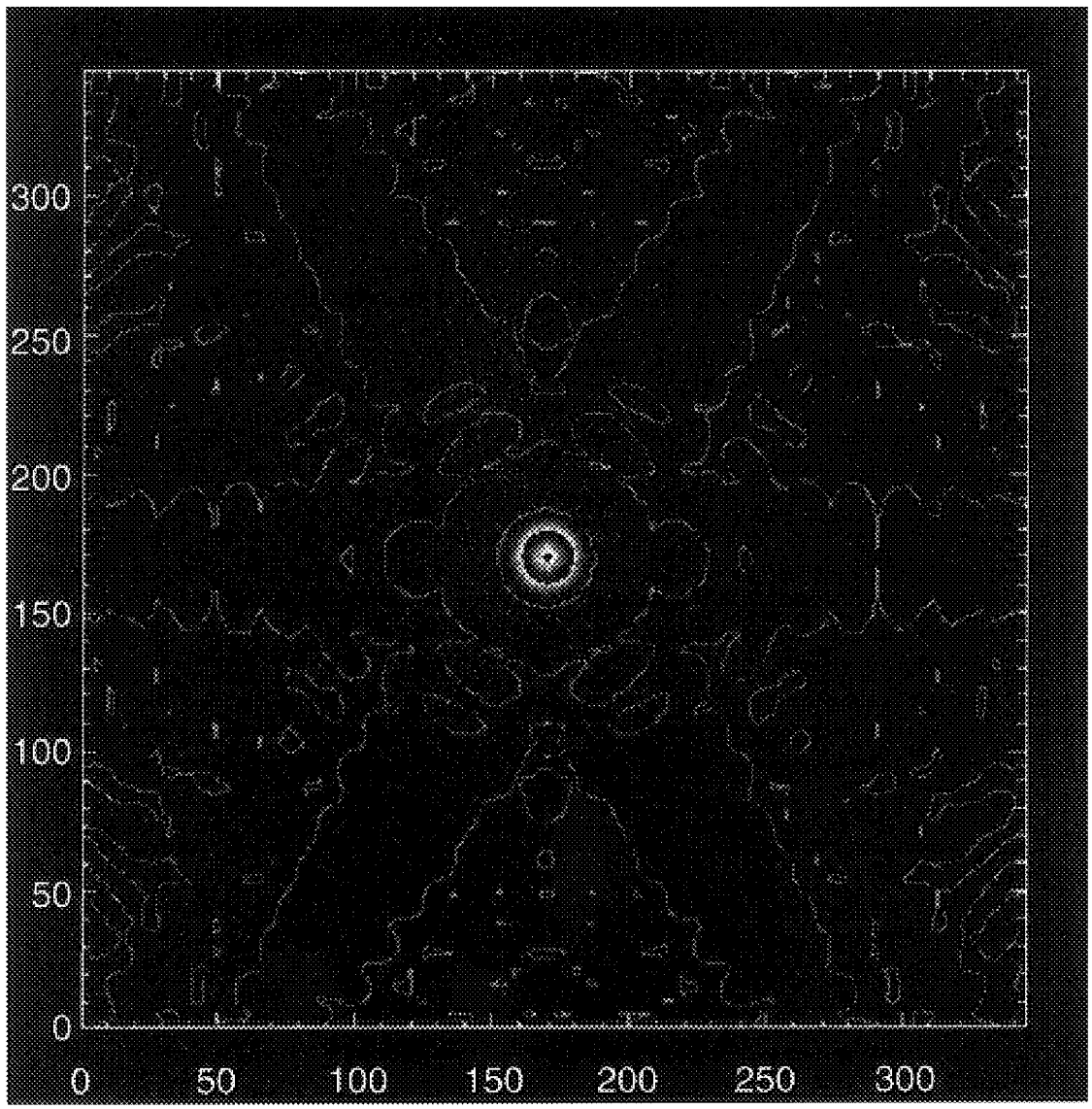
FIG. 26A is a two-dimensional colored isometric photograph of a graph of the retroreflected light distribution from a 1 mil. pitch metal backed prism array.
Figure 26B:
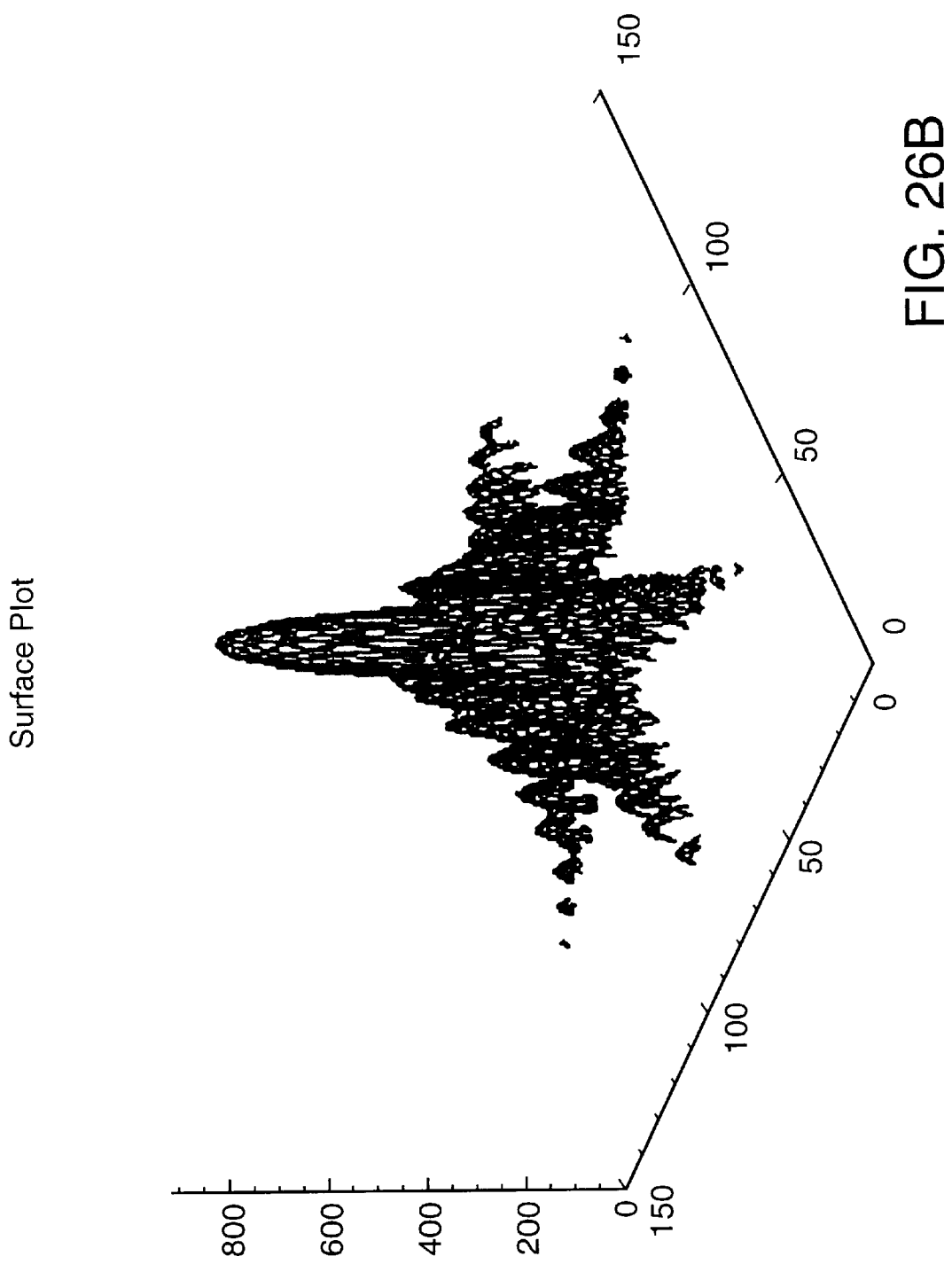
FIG. 26B is a three-dimensional plot of the retroreflected light from a 1 mil. pitch metal backed prism array.
Figure 26C:
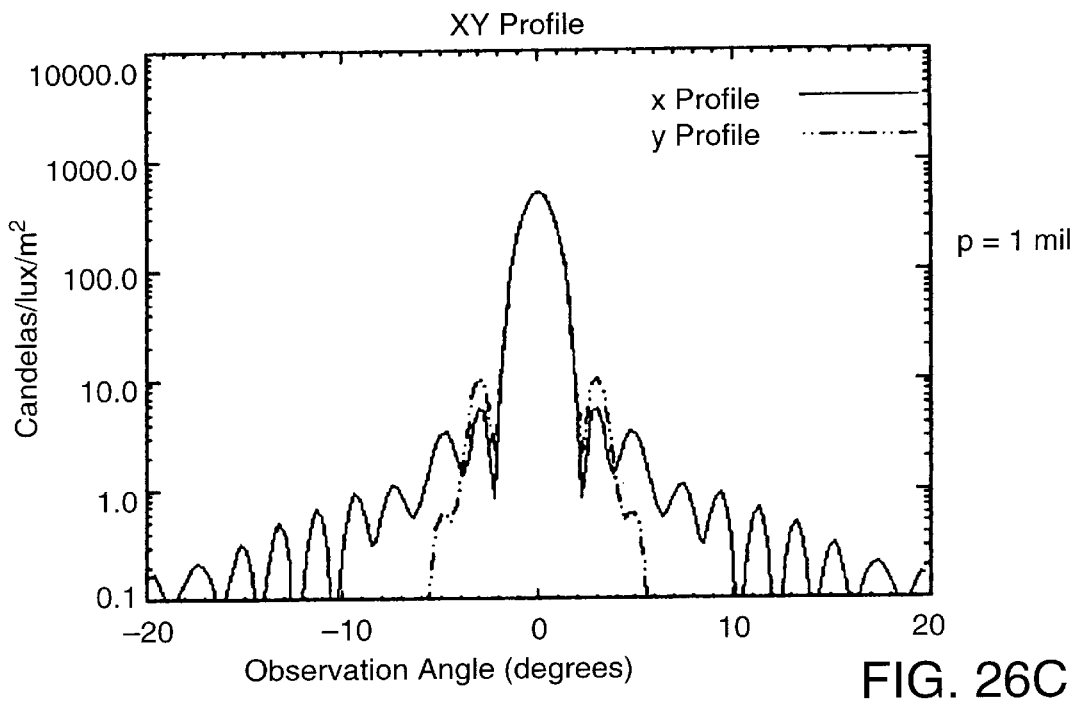
FIG. 26C is an X-Y profile of the retroreflected light distribution from a 1 mil. pitch metal backed prism array.
Figure 26D:
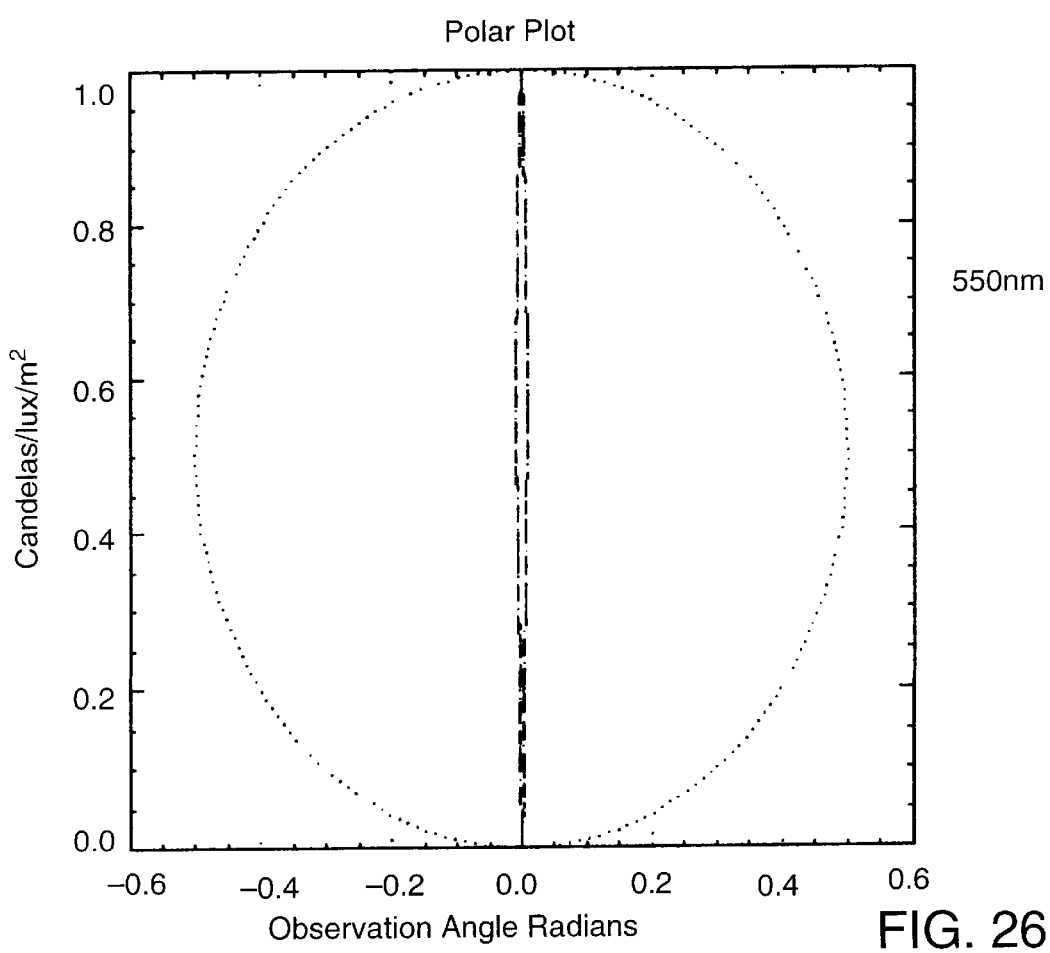
FIG. 26D is a polar plot of retroreflected light distribution in comparison to an ideal diffuser surface for a 1 mil. pitch metal backed prism array.
Figure 27A:
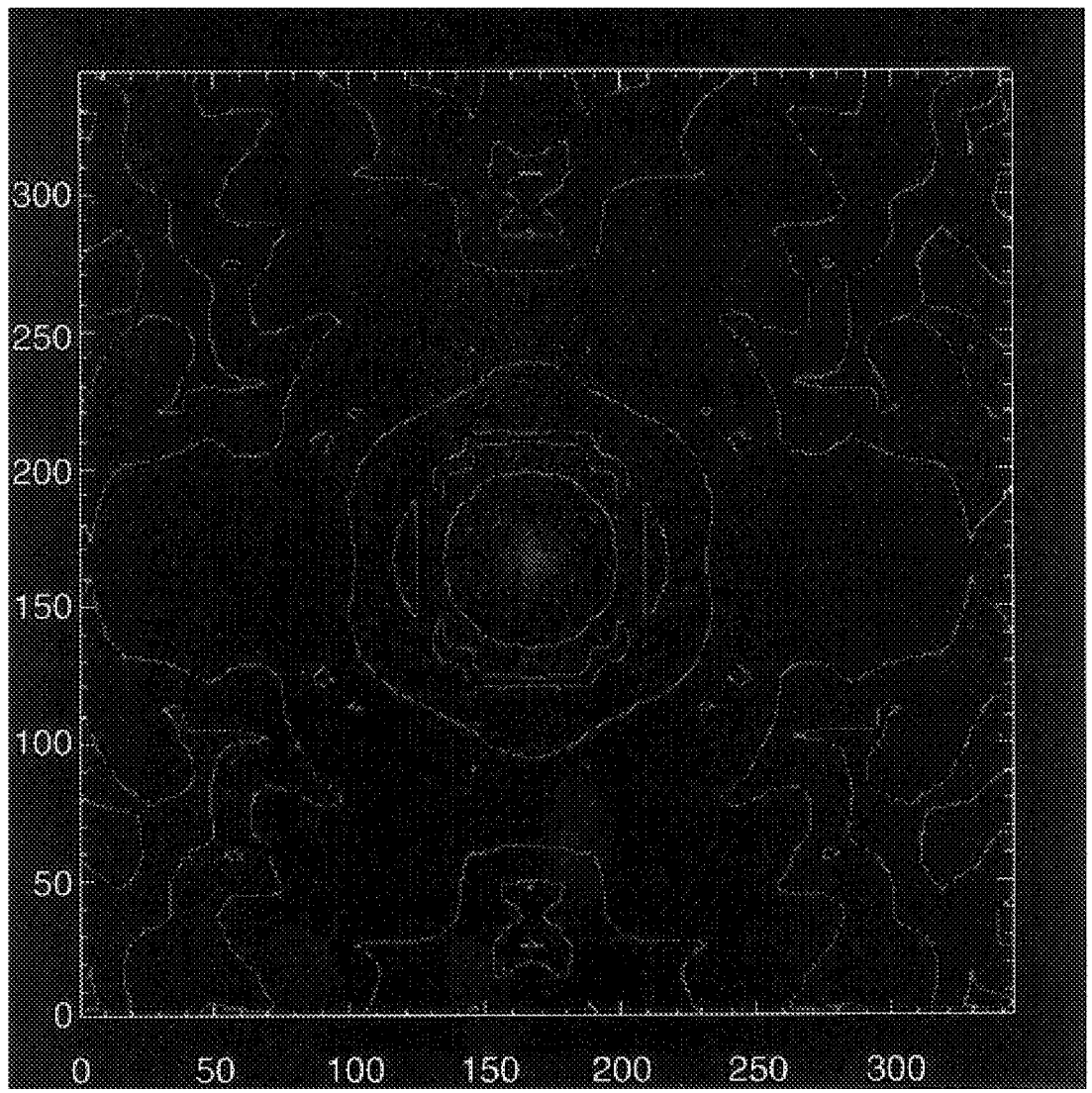
FIG. 27A is a two-dimensional isometric photograph of a graph of the retroreflected light distribution from a 0.5 mil. pitch metal backed prism array.
Figure 27B:
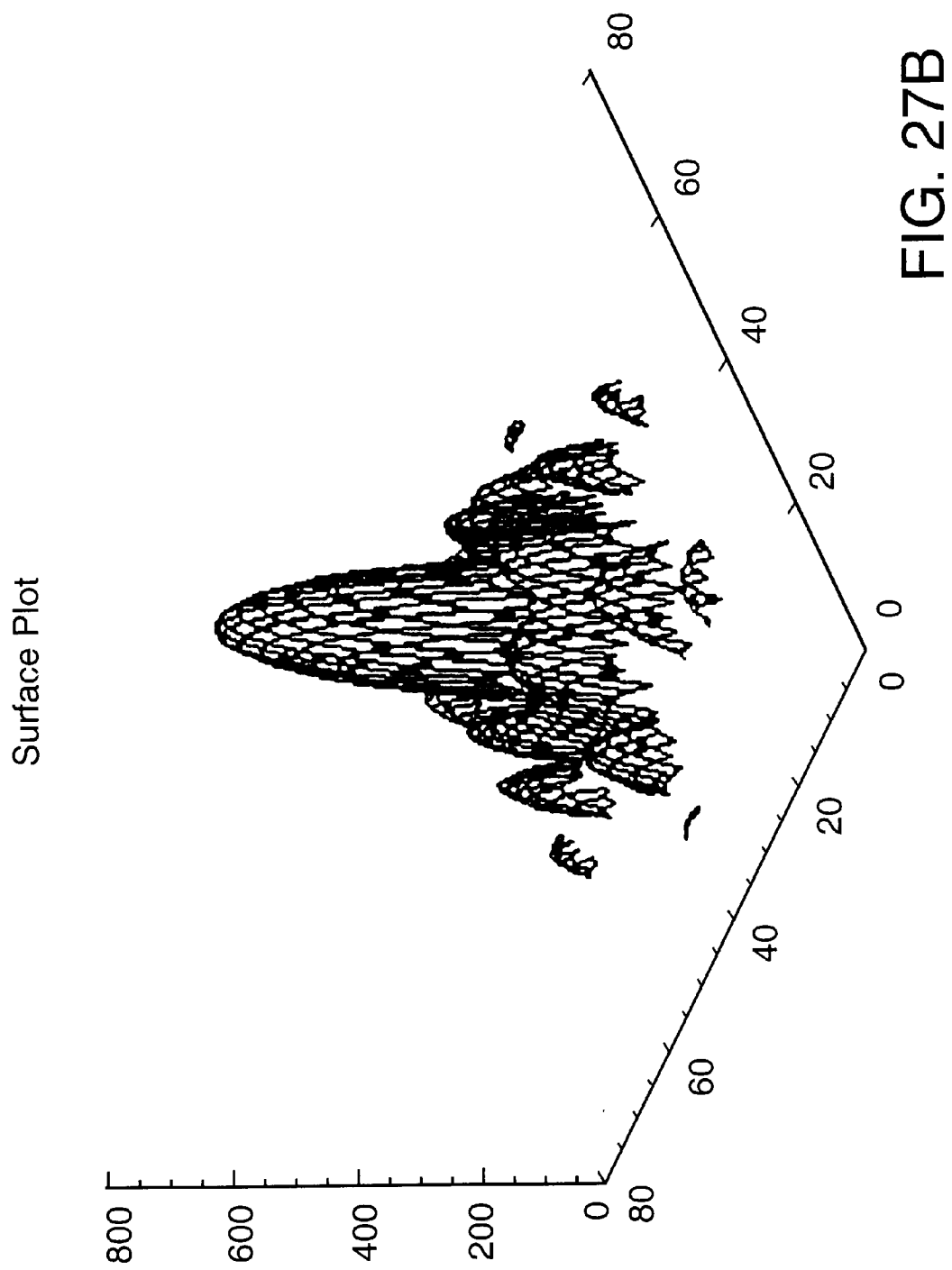
FIG. 27B is a three-dimensional plot of the retroreflected light from a 0.5 mil. pitch metal backed prism array.
Figure 27C:
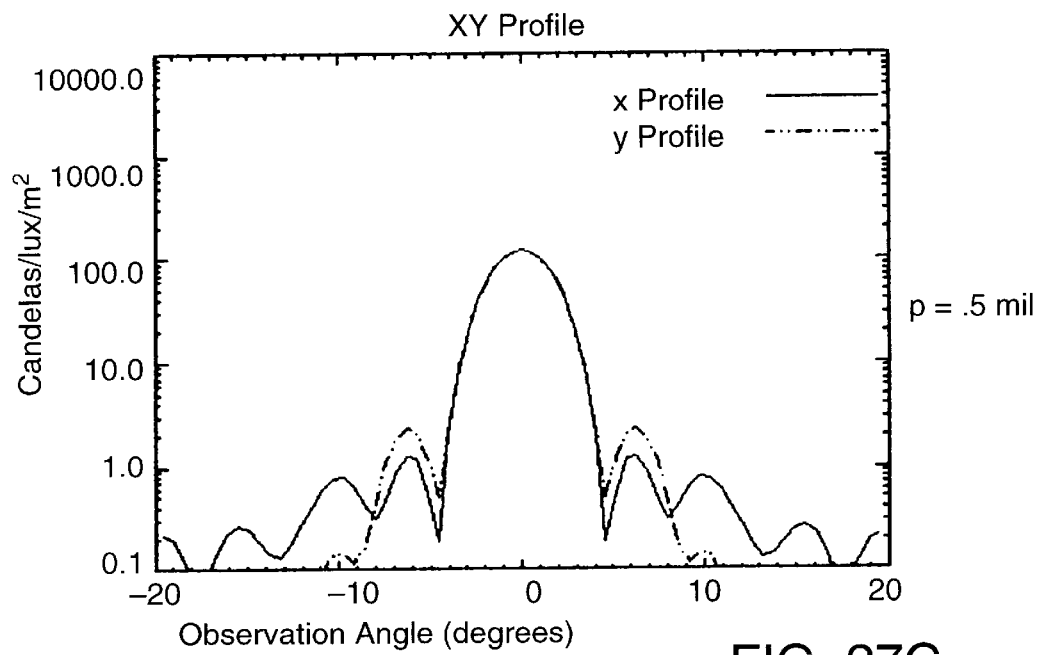
FIG. 27C is an X-Y profile of the retroreflected light distribution from a 0.5 mil. pitch metal backed prism array.
Figure 27D:
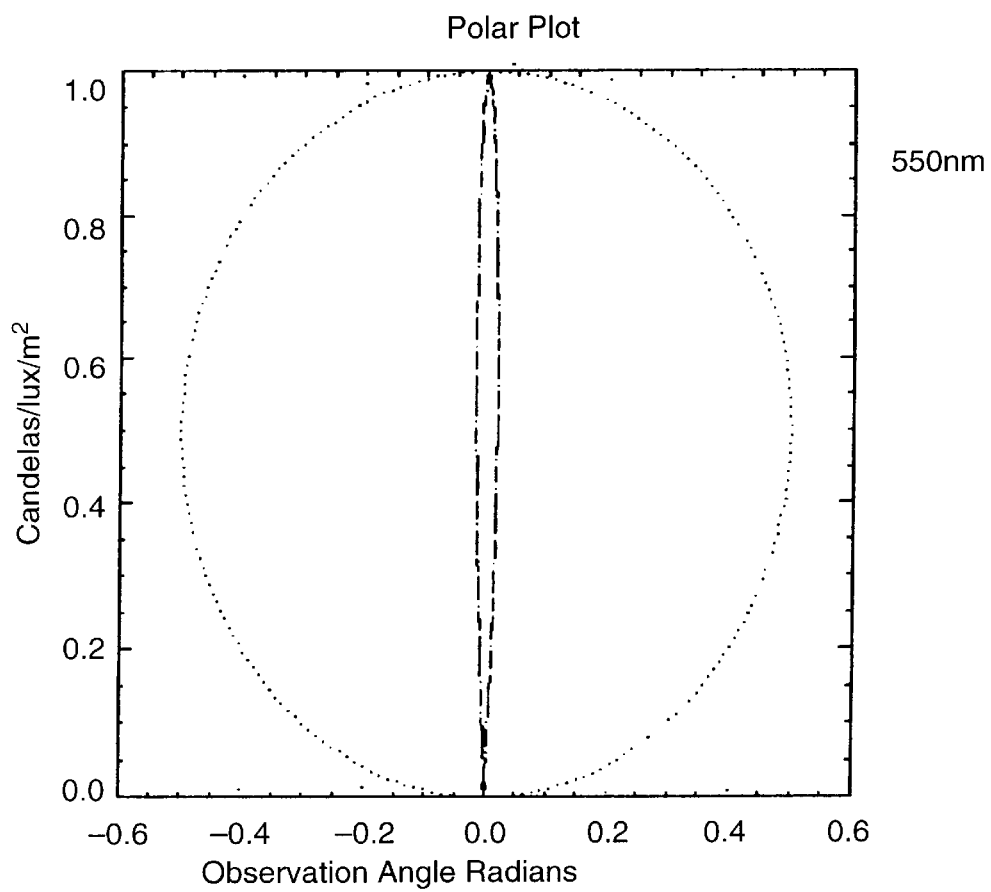
FIG. 27D is a polar plot of retroreflected light distribution in comparison to an ideal diffuser surface for a 0.5 mil. pitch metal backed prism array.
Figure 28A:
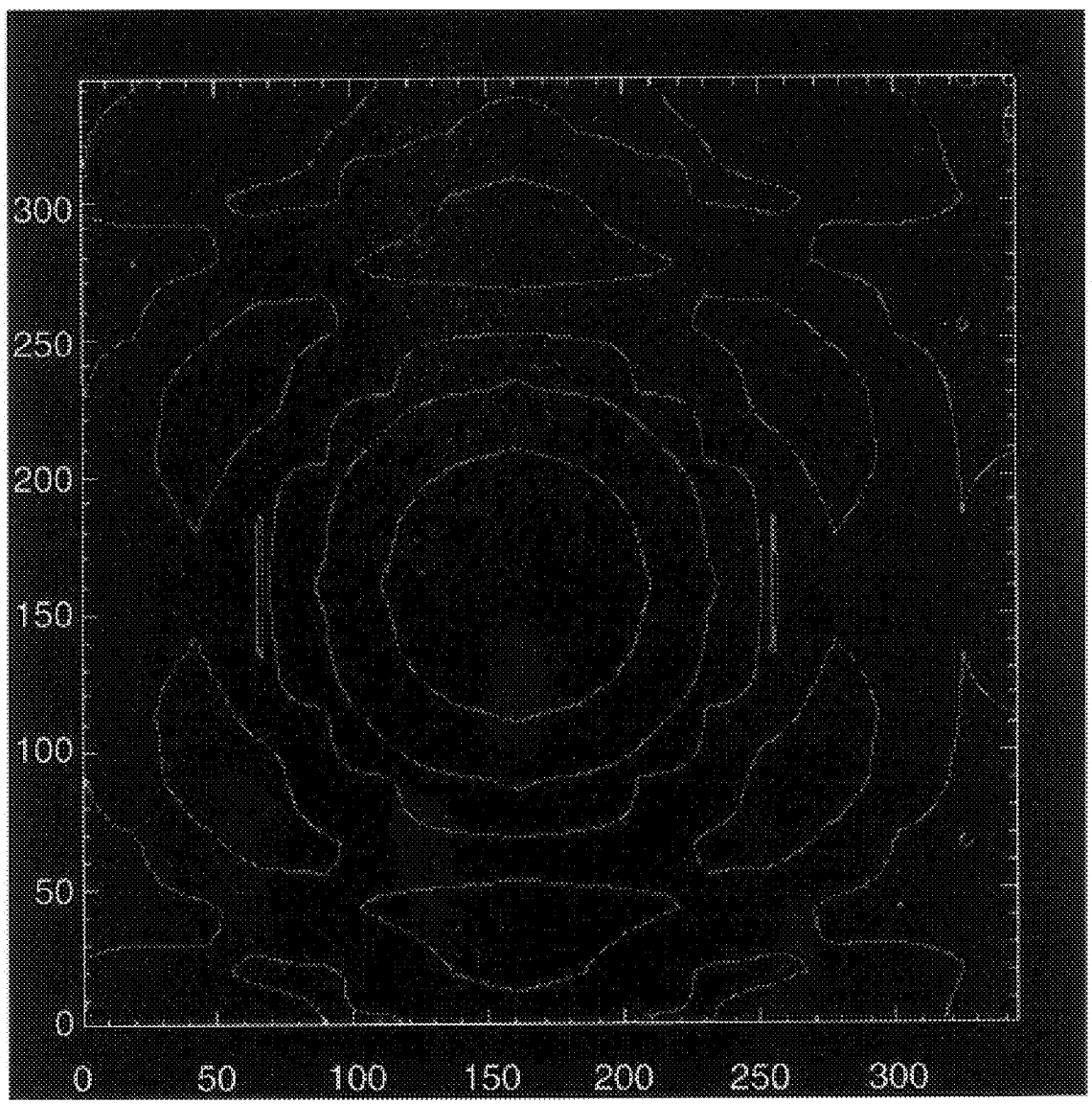
FIG. 28A is a two-dimensional isometric photograph of a graph of the retroreflected light distribution from a 0.24 mil. pitch metal backed prism array.
Figure 28B:
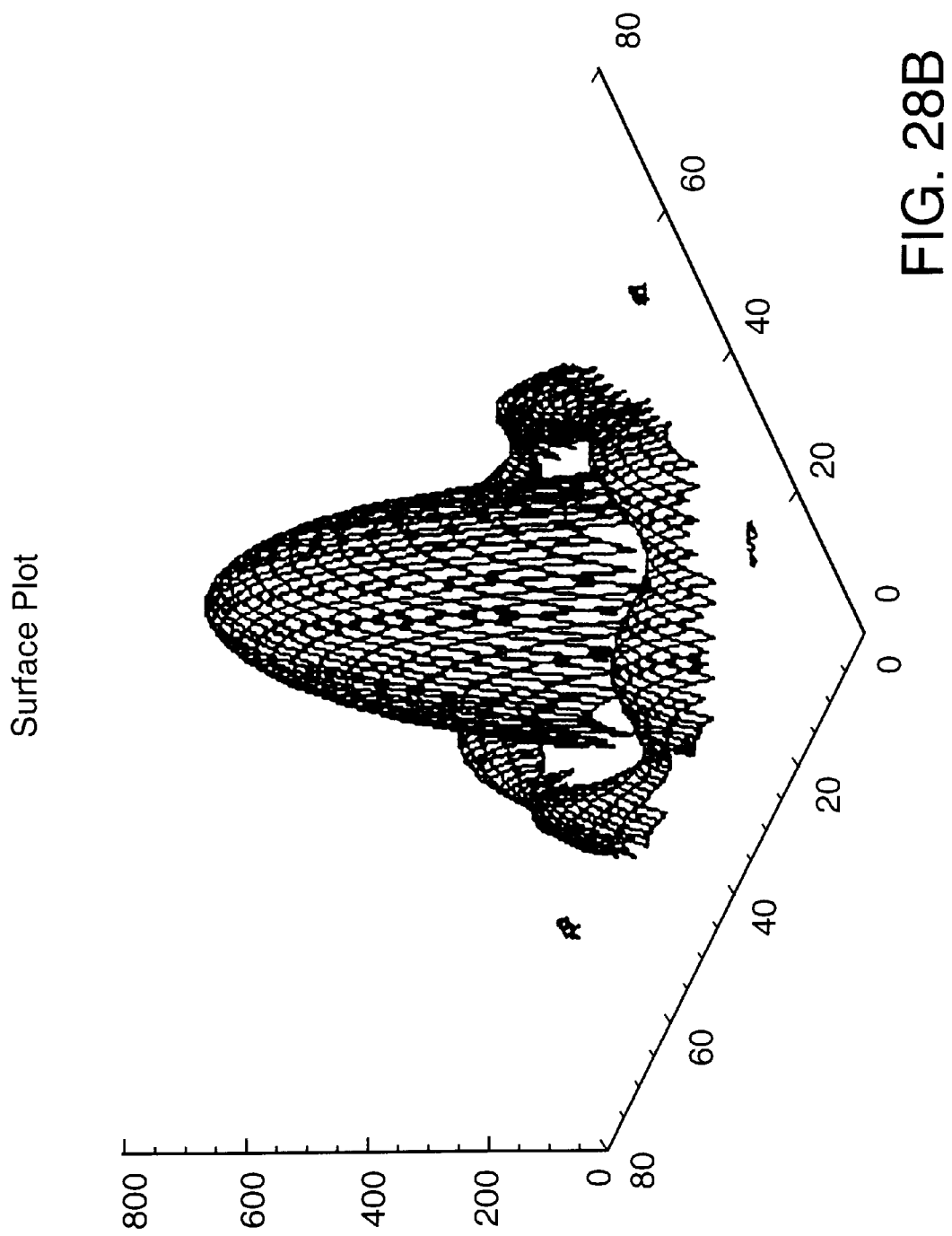
FIG. 28B is a three-dimensional plot of the retroreflected light from a 0.24 mil. pitch metal backed prism array.
Figure 28C:
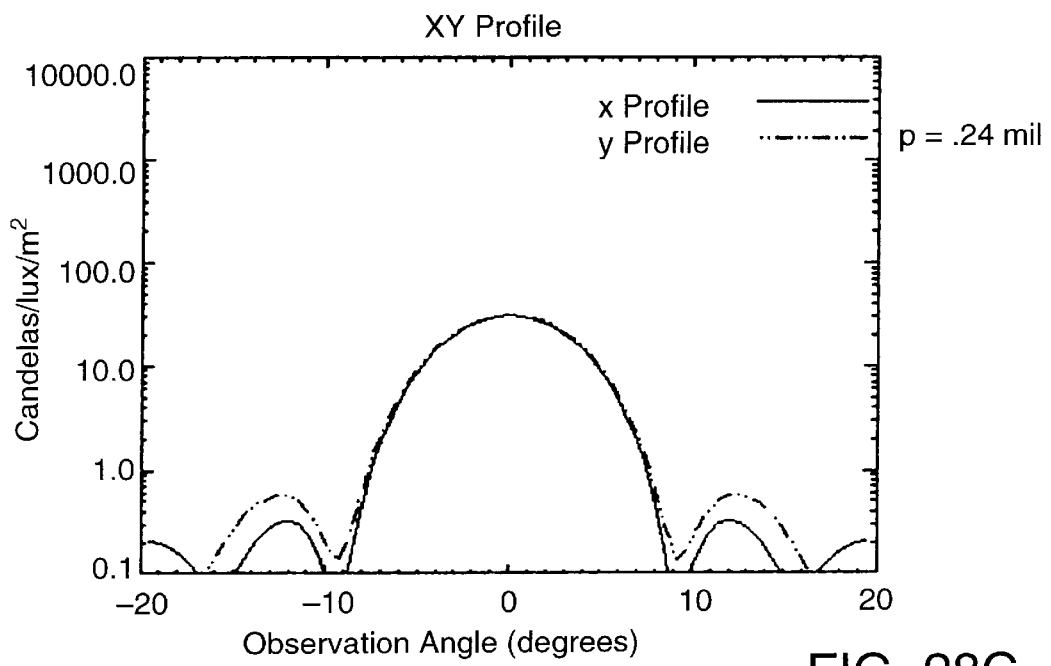
FIG. 28C is an X-Y profile of the retroreflected light distribution from a 0.24 mil. pitch metal backed prism array.
Figure 28D:
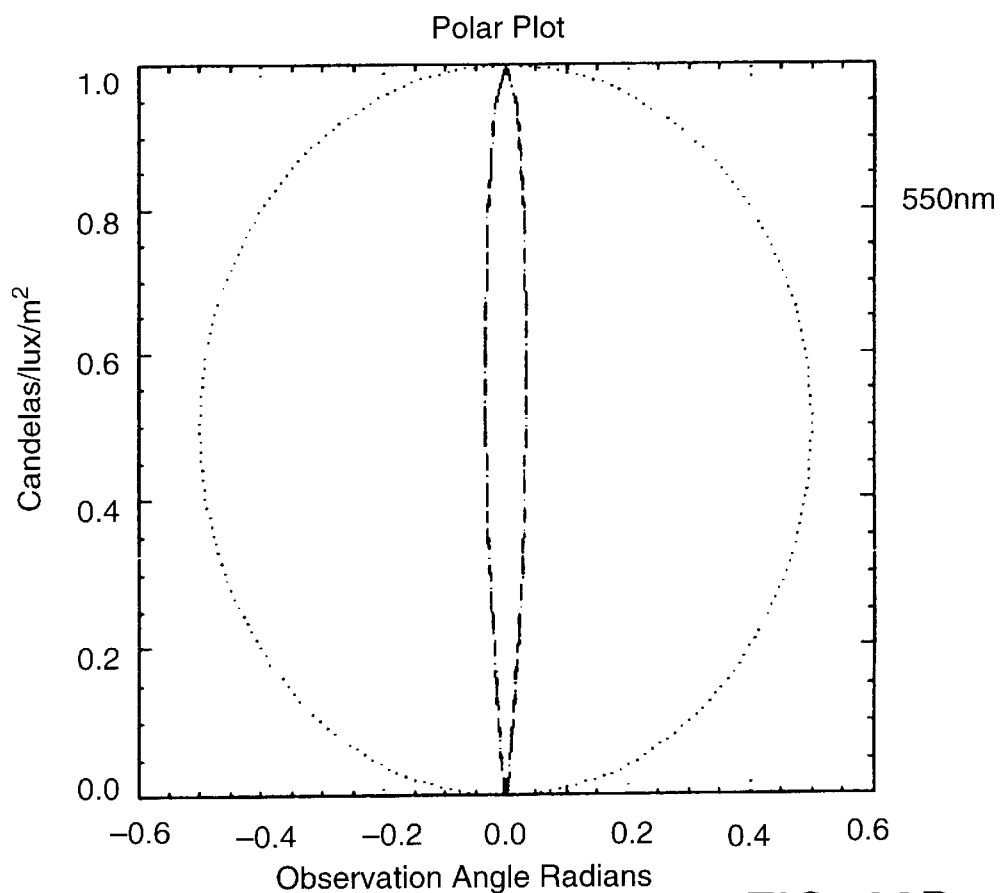
FIG. 28D is a polar plot of retroreflected light distribution in comparison to an ideal diffuser surface for a 0.24 mil. pitch metal backed prism array.
Figure 29A:
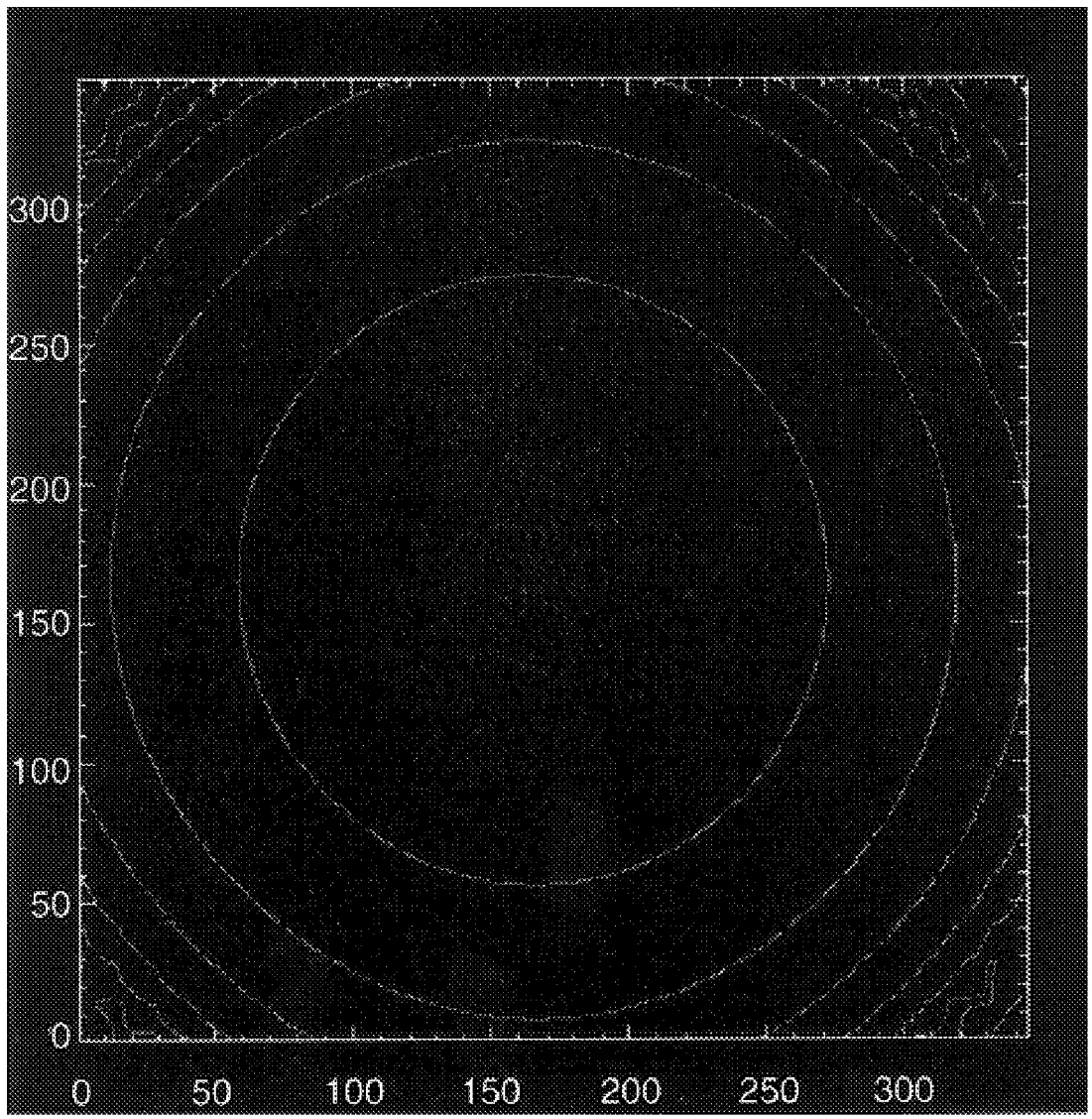
FIG. 29A is a two-dimensional isometric photograph of a graph of the retroreflected light distribution from a 0.1 mil. pitch metal backed prism array.
Figure 29B:
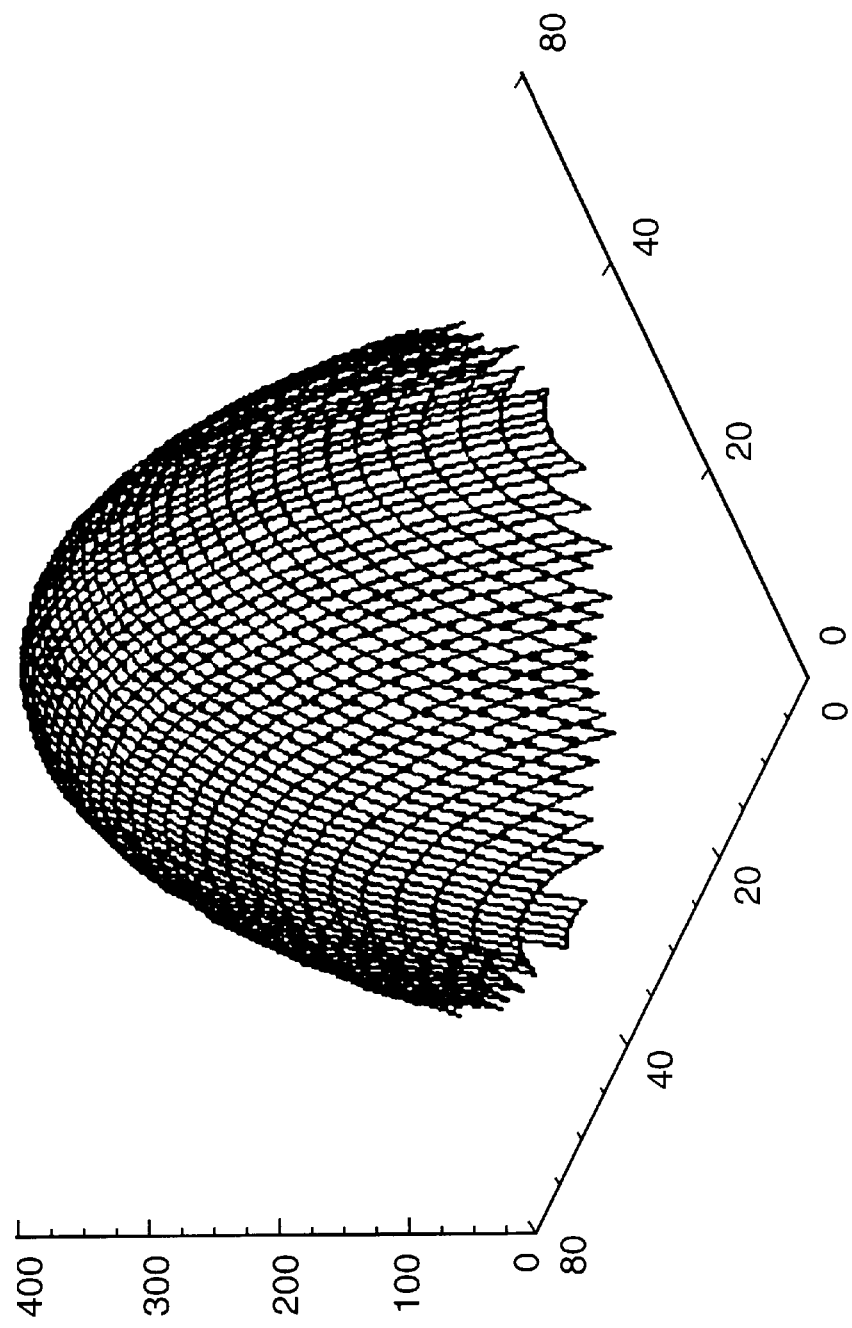
FIG. 29B is a three-dimensional plot of the retroreflected light from a 0.1 mil. pitch metal backed prism array.
Figure 29C:
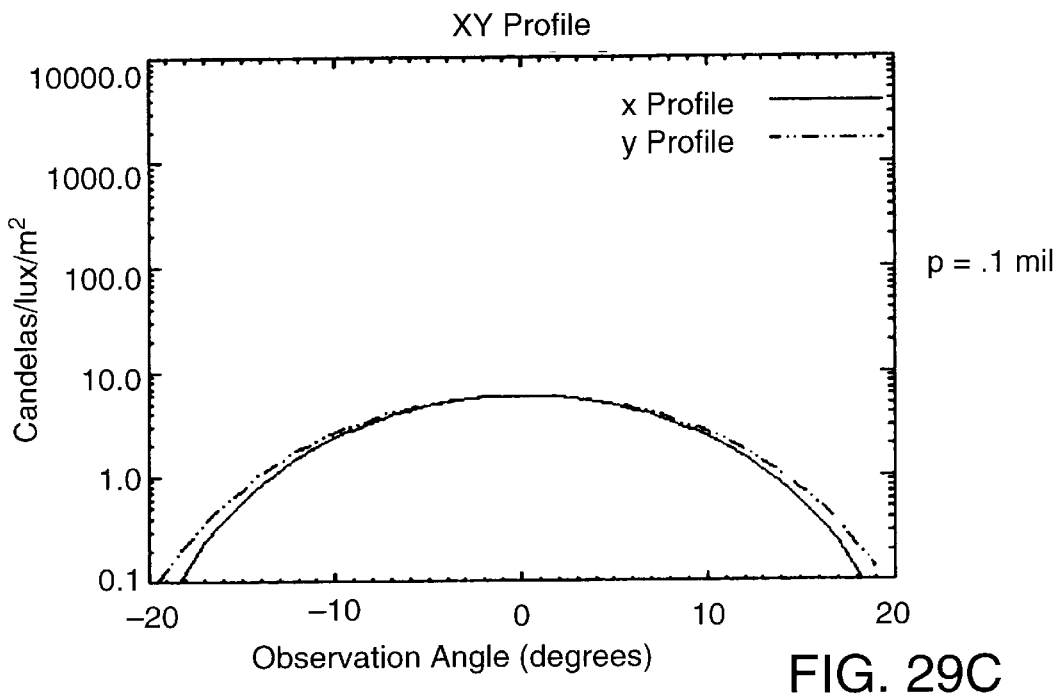
FIG. 29C is an X-Y profile of the retroreflected light distribution from a 0.1 mil. pitch metal backed prism array.
Figure 29D:
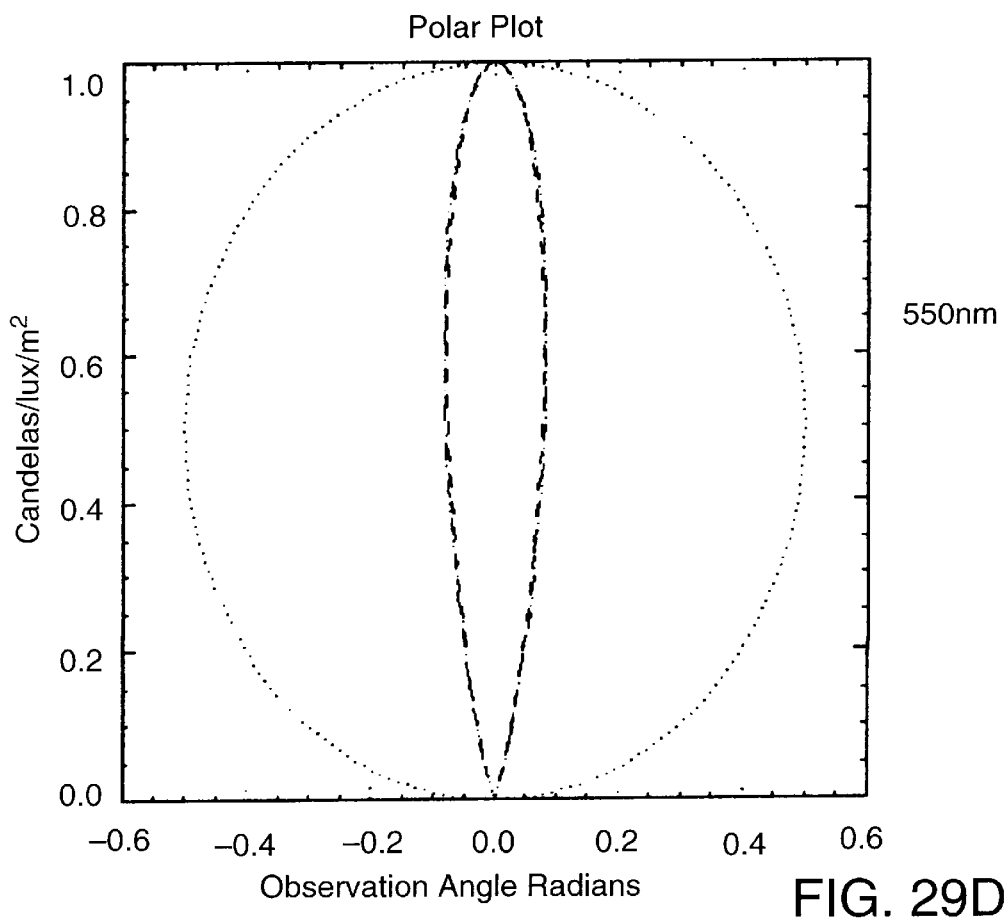
FIG. 29D is a polar plot of retroreflected light distribution in comparison to an ideal diffuser surface for a 0.1 mil. pitch metal backed prism array.
Figure 30A:
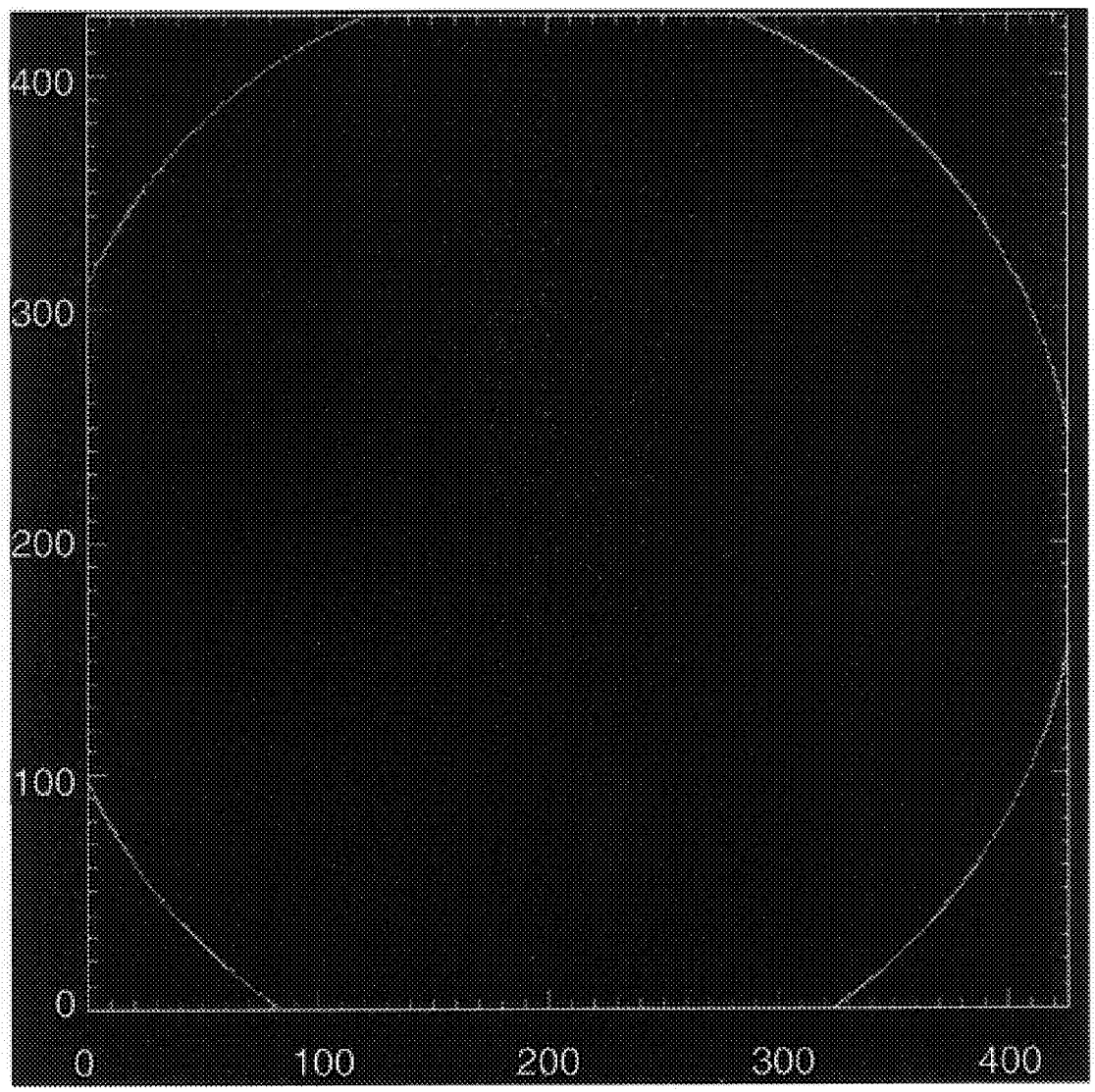
FIG. 30A is a two-dimensional isometric photograph of a graph of the retroreflected light distribution from a 2×550 nm. pitch metal backed prism array.
Figure 30B:
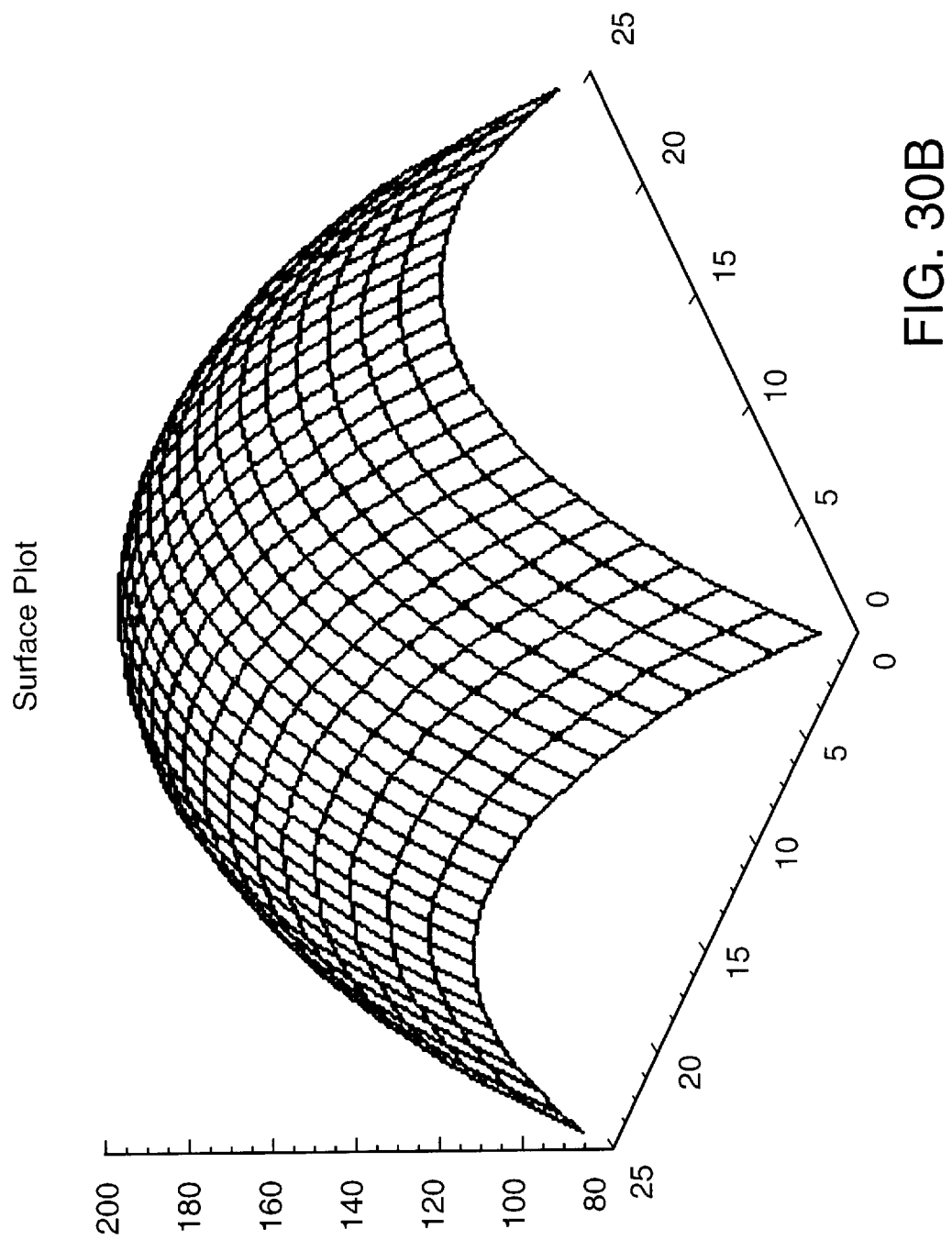
FIG. 30B is a three-dimensional plot of the retroreflected light from a 2×550 nm. pitch metal backed prism array.
Figure 30C:
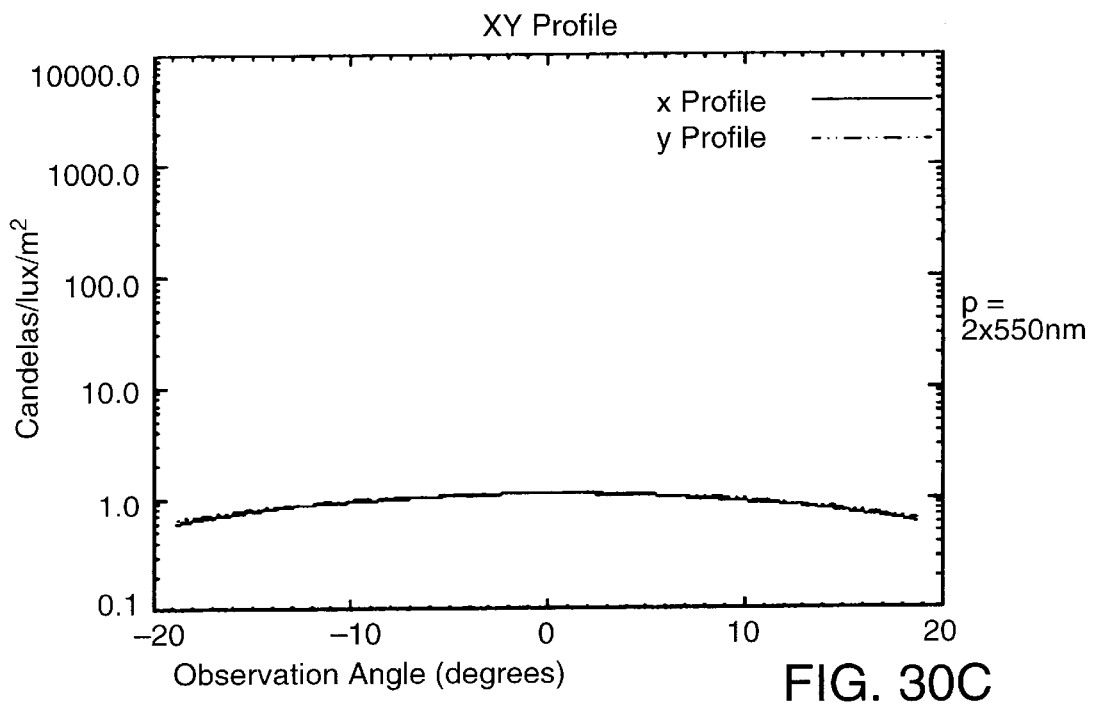
FIG. 30C is an X-Y profile of the retroreflected light distribution from a 2×550 nm. pitch metal backed prism array.
Figure 30D:
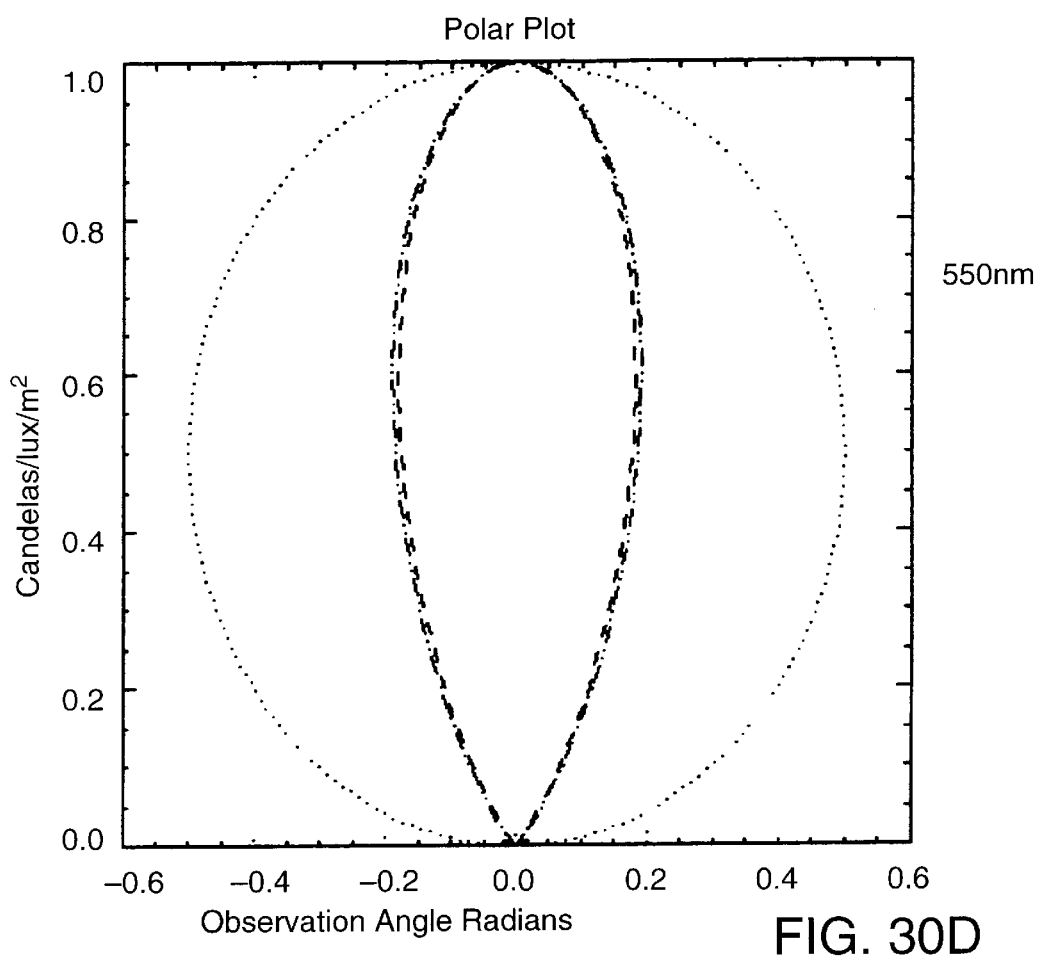
FIG. 30D is a polar plot of retroreflected light distribution in comparison to an ideal diffuser surface for a 2×550 nm. pitch metal backed prism array.
Figure 31A:
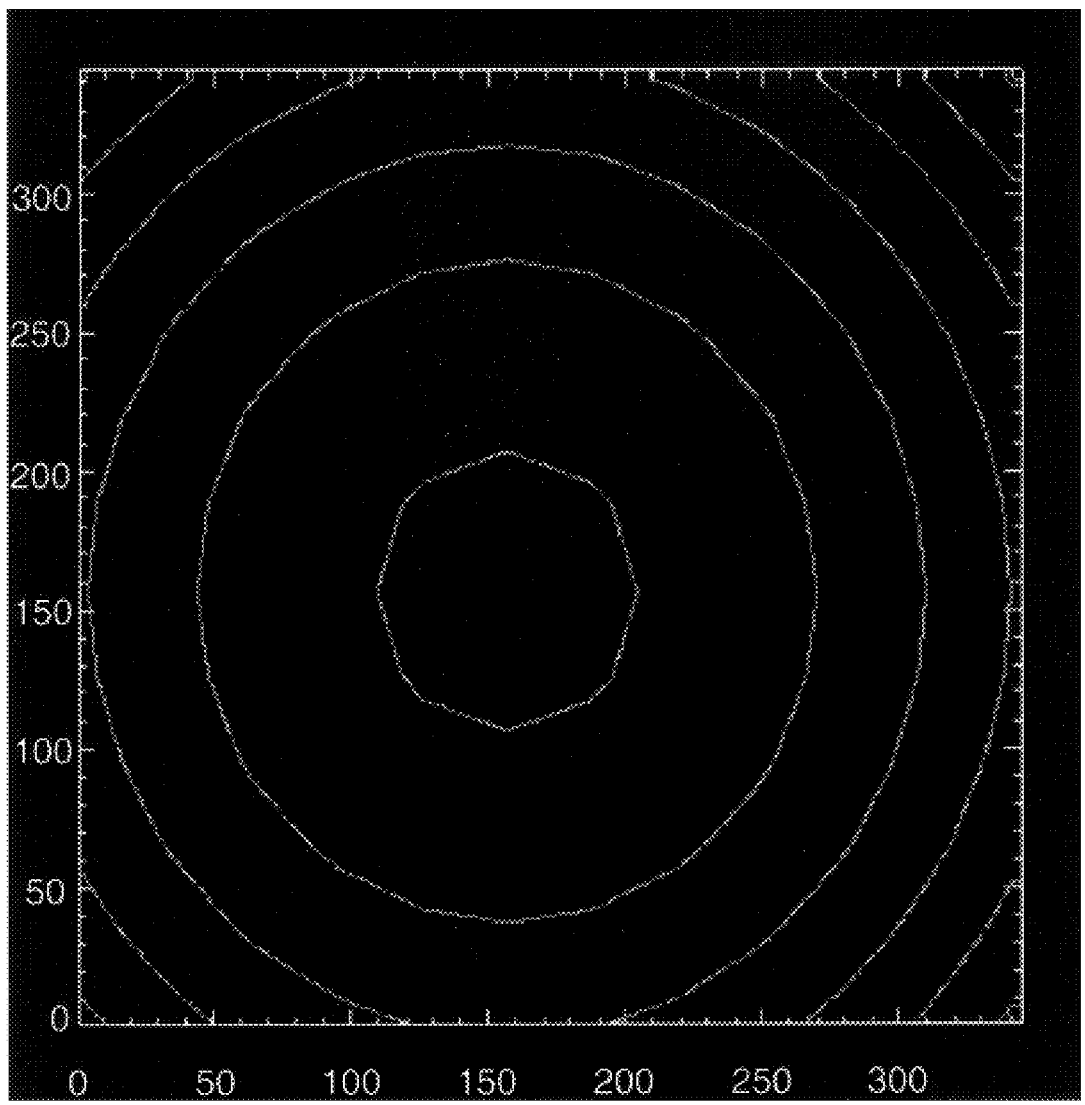
FIG. 31A is a two-dimensional isometric photograph of a graph of the retroreflected light distribution from a 550 nm. pitch metal backed prism array.
Figure 31B:
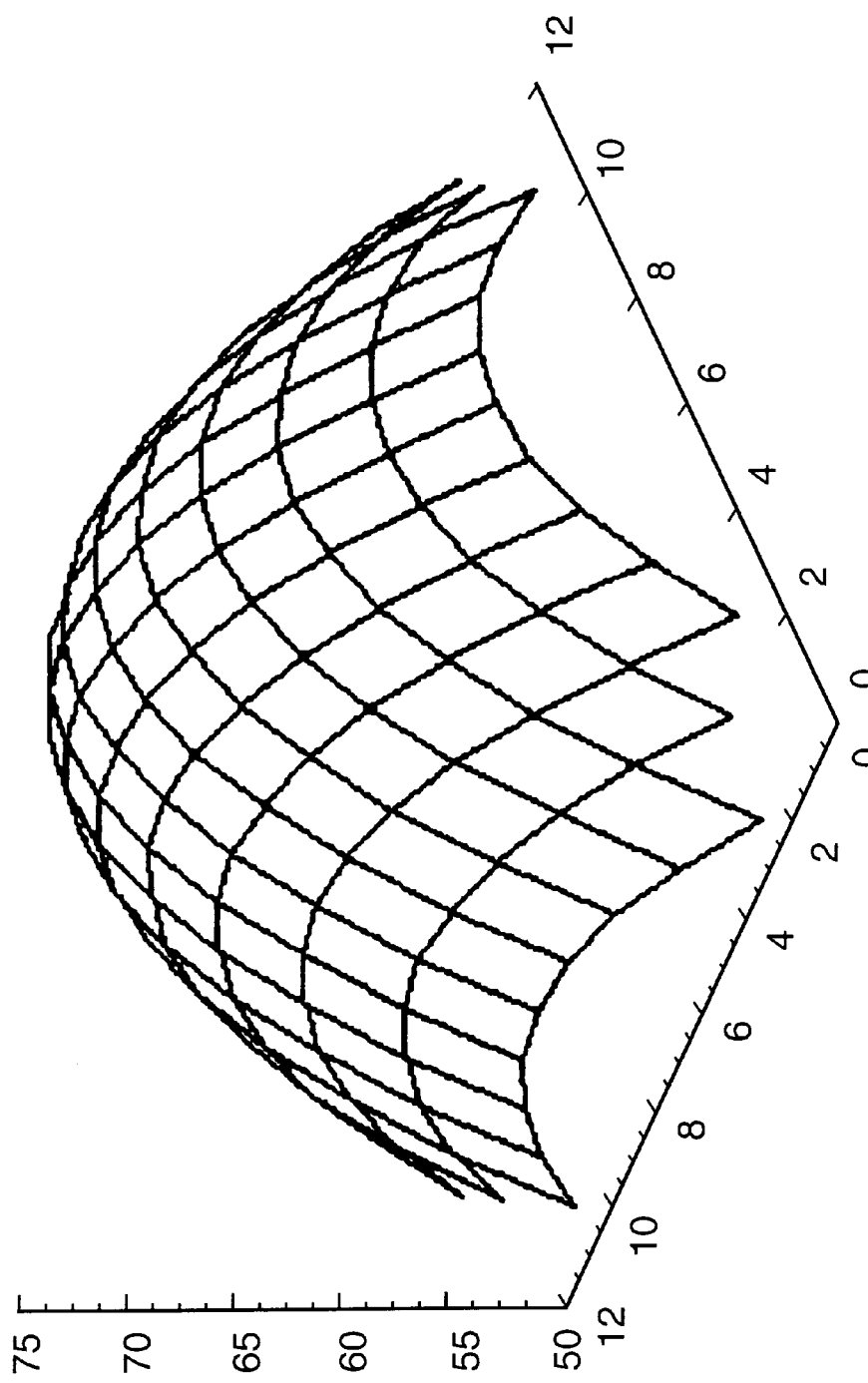
FIG. 31B is a three-dimensional plot of the retroreflected light from a 550 nm. pitch metal backed prism array
Figure 31C:
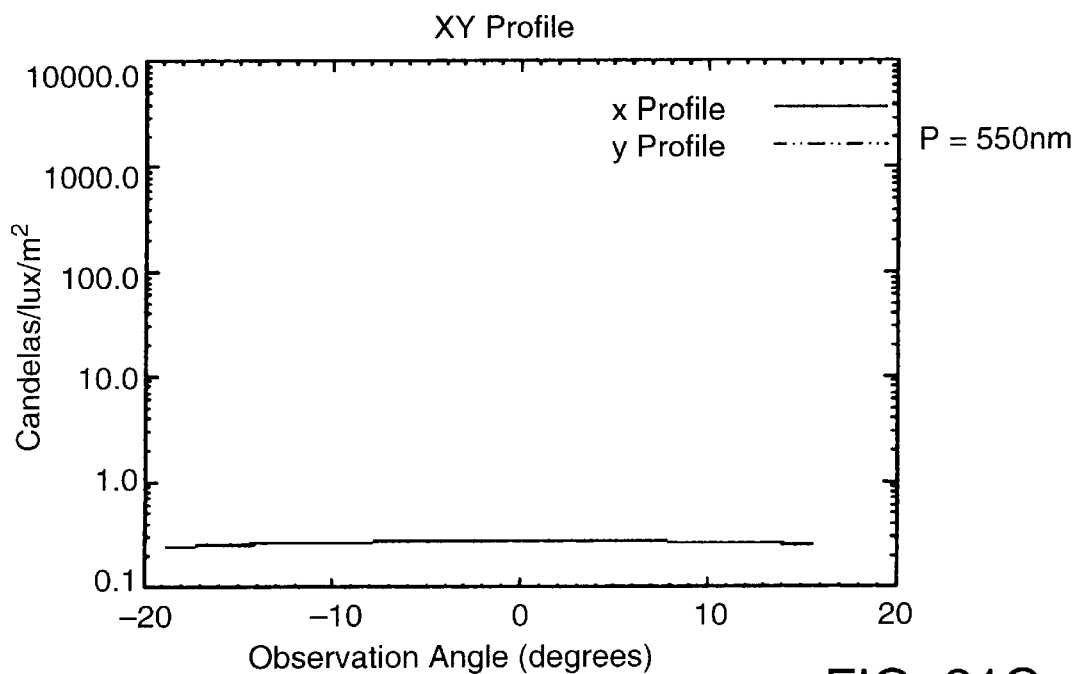
FIG. 31C is an X-Y profile of the retroreflected light distribution from a 550 nm. pitch metal backed prism array.
Figure 31D:
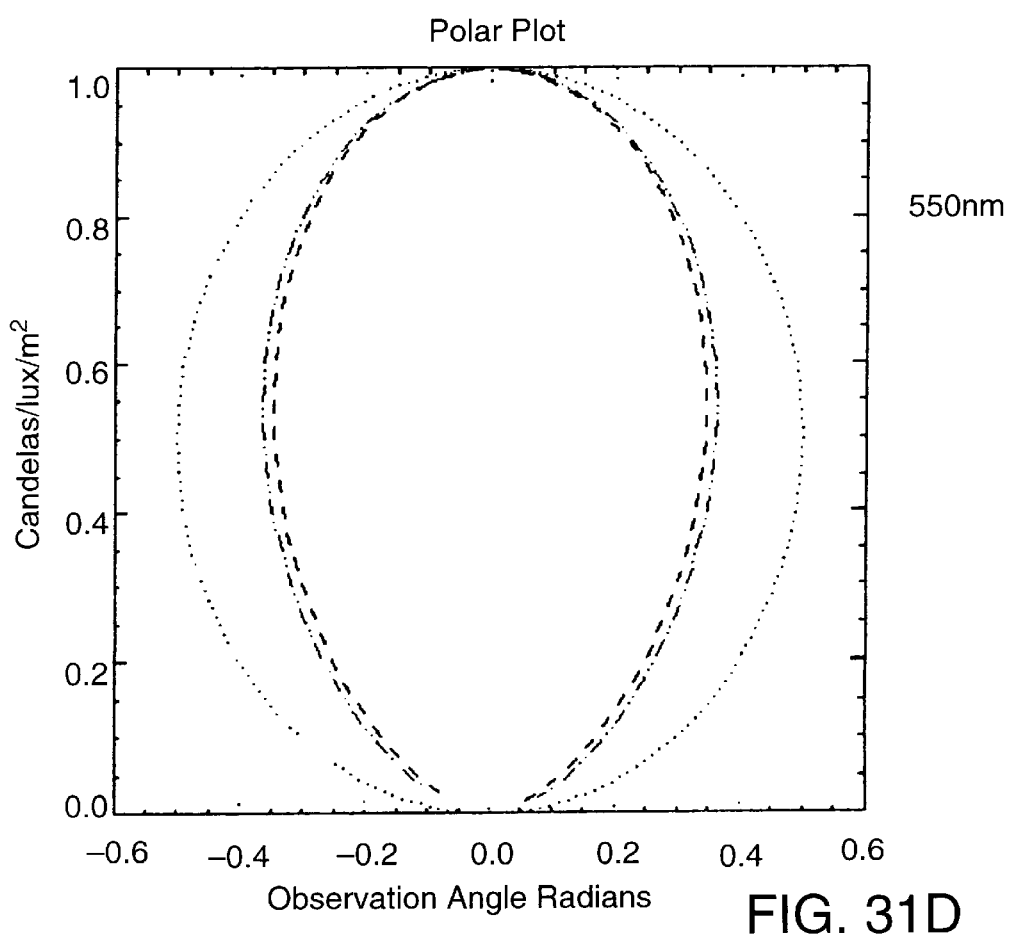
FIG. 31D is a polar plot of retroreflected light distribution in comparison to an ideal diffuser surface for a 550 nm. pitch metal backed prism array.
Figure 32:
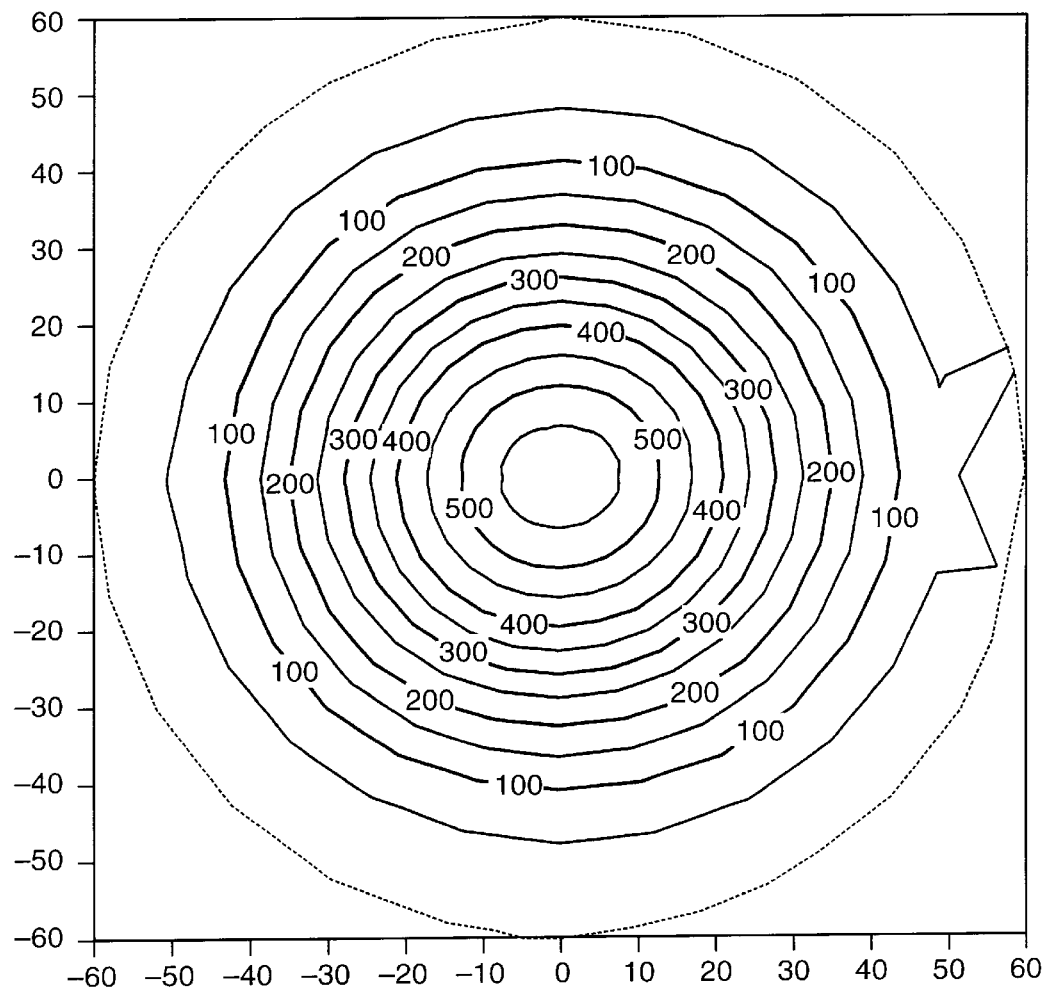
FIG. 32 is a polar plot of the retroreflected light intensity from a 0.0017" pitch metalized prism array at a 0.10° observation angle with a −1.04 DAD as averaged over three samples.
Figure 33:
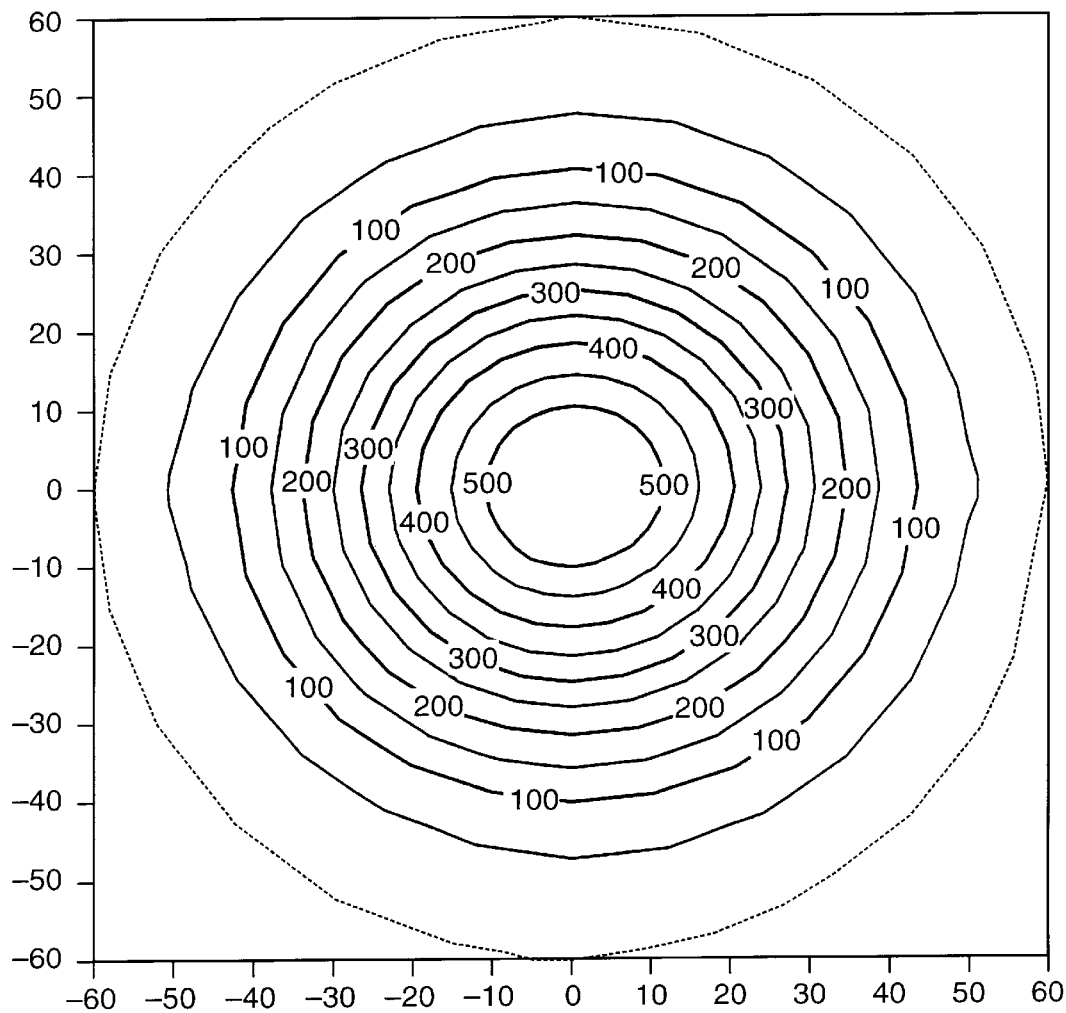
FIG. 33 is a plot as in FIG. 32 with a DAD of +1.55.
Figure 34:
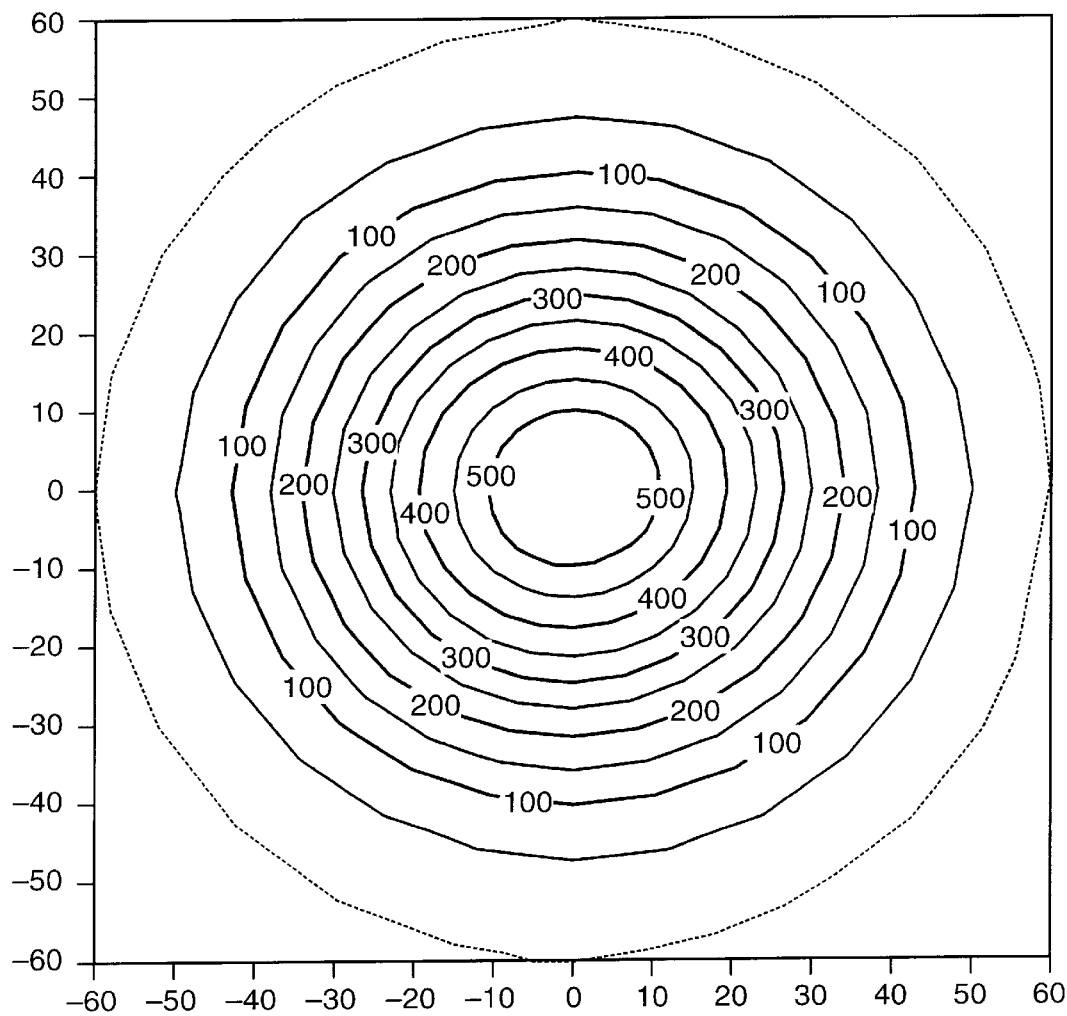
FIG. 34 is a plot as in FIGS. 32 and 33 with a DAD of +3.67.
Figure 35:
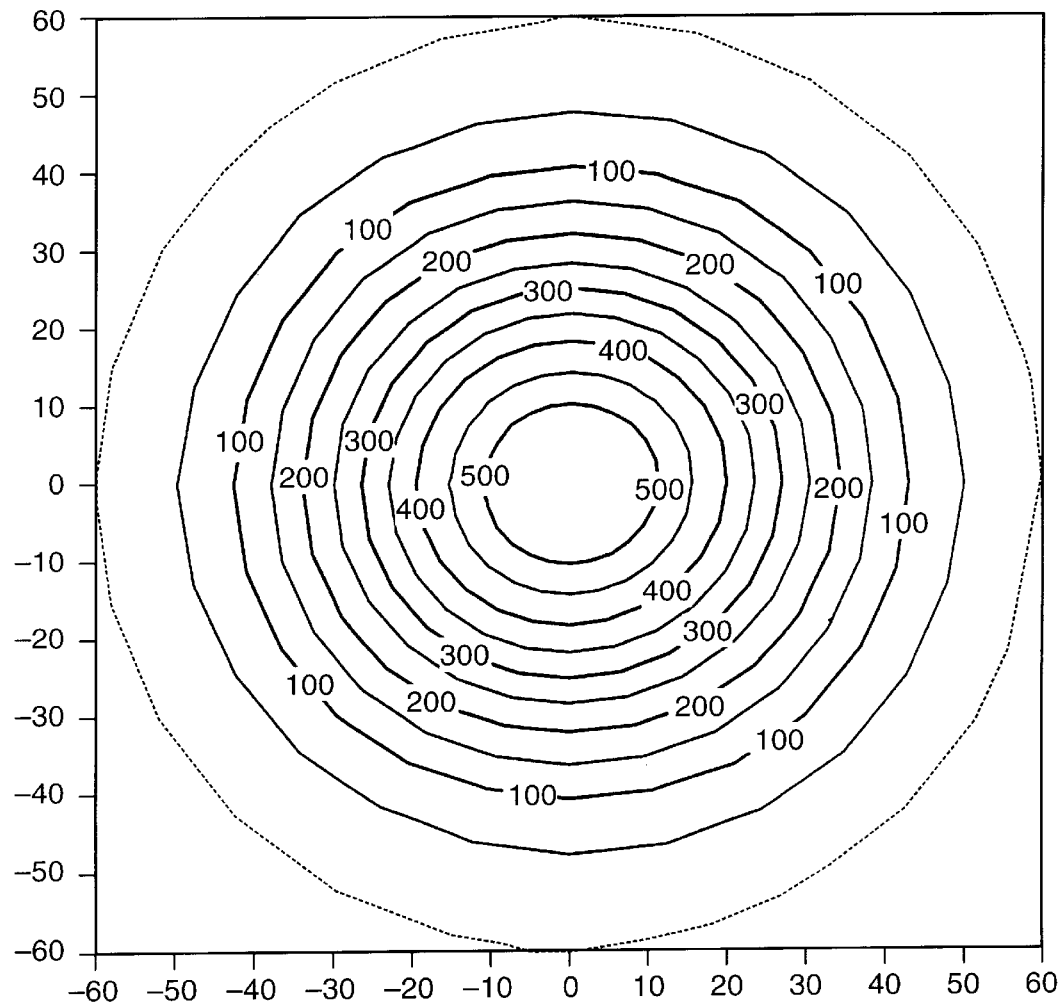
FIG. 35 is a plot as in FIGS. 32–34 with a DAD of +2.28.

FIG. 24 is a plot of SIA versus P taken at an incident wavelength of 550 nm of light for prisms having an index of refraction n of 1.58 which shows the rate of loss of retroreflected light as the pitch of the prism becomes very small. The smallest pitch shown is one wavelength in width. Below a pitch size of about 0.00024" (6μ), the retroreflected light values are very low and are not suitable for most retroreflective applications. At a size of 0.00048" (12μ) a graphics quality retroreflective product could be made. Allowing for features, such as machined in windows, steps or textured or printed patterns, to add whiteness (Cap Y) a 0.0010" (25μ) pitch prism is more suitable for graphics.

The numerical tables of Chart 1 (at the end of the text) show the actual SIA values at observation angles (2 to 20 degrees) and at orientation angles (0 to 180 degrees) for the various pitch prism sizes.

FIGS. 25A–25D through FIGS. 31A–31D show the actual retroreflected light distribution for the various size metal backed pitch prisms. The upper left graph or "A" plots are of a two-dimensional isometric photo plot of the retroreflected light distribution in which the orientation angle is the circular coordinate around the perimeter of the plot. The lower left graph, the "B" plots, are three dimensional plots of the retroreflected light distribution versus observation angle on the X and Y axis. The upper right (or "IC" plots) show the x and y profile of the retroreflected light distribution versus observation angle on the X axis. The lower right polar charts (or "D" plots) show the retroreflected light distribution in comparison to an ideal diffuser (scattering) surface. The large oval, dotted line plot within the "D" plots is that of an ideal scattering surface as calculated from the cosine law which is used to describe scattering surfaces.

One can see that when the prism pitch is on the order of one wavelength of light, the surface acts very much like an ideal diffuser across the entire plus or minus twenty degree range shown. Note that in the case of most interest, i.e., the 0.1 to 2.0 degree range, a prism pitch of 0.00024" (6μ) has a very flat retroreflected light distribution, and the magnitude of the retroreflected light is not sufficient to be useful in safety or graphics applications and can for all practical purposes be considered a scattering surface.

TABLE I

Material index n = 1.58    Incident wavelength 0.55μ

| | 0 | 30 | 60 | 90 | 120 | 150 | 180 |
|---|---|---|---|---|---|---|---|
| p = 0.55μ | | Diffraction pattern center | | 0.277094 | x_dim = 28 | num_e1 = 12 | |
| 2 | 0.276009 | 0.268360 | 0.267451 | 0.276112 | 0.267451 | 0.268360 | 0.276009 |
| 3 | 0.272773 | 0.272773 | 0.273183 | 0.273183 | 0.273183 | 0.272773 | 0.272773 |
| 5 | 0.263800 | 0.275019 | 0.275019 | 0.265045 | 0.275040 | 0.275040 | 0.263800 |
| 10 | 0.240213 | 0.227189 | 0.231435 | 0.243547 | 0.231310 | 0.227059 | 0.240213 |
| 15 | 0.192449 | 0.214612 | 0.217402 | 0.199442 | 0.217883 | 0.215108 | 0.192450 |
| 20 | 0.153400 | 0.106732 | 0.117616 | 0.162724 | 0.117479 | 0.106562 | 0.153400 |
| p = 1.1μ | | Diffraction pattern center | | 1.10921 | x_dim = 28 | num_e1 = 25 | |
| 2 | 1.09191 | 1.08934 | 1.08811 | 1.09355 | 1.08794 | 1.08917 | 1.09191 |
| 3 | 1.04138 | 1.03748 | 1.04339 | 1.04770 | 1.04371 | 1.03781 | 1.04138 |
| 5 | 0.937052 | 1.00770 | 1.01039 | 0.952433 | 1.01133 | 1.00864 | 0.937052 |
| 10 | 0.614060 | 0.529966 | 0.567030 | 0.651382 | 0.568781 | 0.532007 | 0.614061 |
| 15 | 0.244590 | 0.253804 | 0.276966 | 0.287903 | 0.280723 | 0.258252 | 0.244590 |
| 20 | 0.0447142 | 0.0187576 | 0.0331774 | 0.0684727 | 0.0334652 | 0.0196932 | 0.0447143 |
| p = 2.54μ | | Diffraction pattern center | | 5.91538 | x_dim = 28 | num_e1 = 58 | |
| 2 | 5.35856 | 5.53286 | 5.56440 | 5.40976 | 5.56610 | 5.53460 | 5.35856 |
| 3 | 4.27033 | 4.30684 | 4.38934 | 4.40861 | 4.40047 | 4.31847 | 4.27034 |
| 5 | 2.44668 | 2.67441 | 2.78656 | 2.67714 | 2.80657 | 2.69629 | 2.44668 |
| 10 | 0.03221 | 0.0221600 | 0.0465547 | 0.0861019 | 0.0485138 | 0.0255519 | 0.0322188 |
| 15 | 0.05372 | 0.102494 | 0.0596130 | 0.106152 | 0.0647632 | 0.101192 | 0.0537201 |
| 20 | 0.02329 | 0.00616553 | 0.0095105 | 0.0158121 | 0.00723417 | 0.00863740 | 0.0232964 |
| p = 6.0μ | | Diffraction pattern center | | 30.6670 | x_dim = 56 | num_e1 = 34 | |
| 2 | 17.6844 | 22.7109 | 22.7174 | 17.6940 | 22.7150 | 22.7089 | 17.6845 |
| 3 | 5.74838 | 4.07407 | 4.07466 | 5.73605 | 4.07915 | 4.07461 | 5.74841 |
| 5 | 0.093497 | 0.233042 | 0.230440 | 0.213802 | 0.231730 | 0.232854 | 0.093497 |
| 10 | 0.197556 | 0.0357433 | 0.163038 | 0.0353620 | 0.163220 | 0.0367408 | 0.197554 |
| 15 | 0.053959 | 0.0002405 | 0.0504714 | 0.0001631 | 0.0496691 | 0.0002982 | 0.053959 |
| 20 | 0.0543252 | 0.0004467 | 0.0106888 | 0.00269081 | 0.0106856 | 0.0004583 | 0.054325 |
| p = 12.00μ | | Diffraction pattern center | | 122.680 | x_dim = 112 | num_e1 = 69 | |
| 2 | 8.97002 | 16.2979 | 16.3003 | 8.91879 | 16.3183 | 16.3001 | 8.97018 |
| 3 | 1.28402 | 2.32242 | 1.44851 | 2.34774 | 1.44456 | 2.32920 | 1.28403 |
| 5 | 0.77322 | 0.0890128 | 0.928461 | 0.140298 | 0.928813 | 0.0924924 | 0.773214 |
| 10 | 0.217322 | 0.004792 | 0.0955855 | 0.0107643 | 0.0967986 | 0.00564159 | 0.217323 |
| 15 | 0.0156515 | 0.002203 | 0.0566172 | 0.000111476 | 0.0531123 | 0.00249192 | 0.0156516 |
| 20 | 0.0245323 | 0.000230 | 0.0421930 | 0.000562044 | 0.0437915 | 0.00117474 | 0.0245322 |
| p = 25.0μ | | Diffraction pattern center | | 532.480 | x_dim = 112 | num_e1 = 145 | |
| 2 | 1.35084 | 0.473851 | 3.13965 | 1.99163 | 3.12382 | 0.476578 | 1.35084 |
| 3 | 0.611894 | 0.0439605 | 1.58550 | 0.0148991 | 1.57822 | 0.0419281 | 0.611891 |
| 5 | 0.219538 | 0.0250036 | 0.461071 | 0.0196173 | 0.448551 | 0.0235029 | 0.219547 |
| 10 | 0.159382 | 0.0015656 | 0.0252273 | 0.00264892 | 0.0334400 | 0.00249989 | 0.159384 |
| 15 | 0.077203 | 2.95e-005 | 0.0118687 | 0.000189794 | 0.0119416 | 0.000480 | 0.0772034 |
| 20 | 0.049299 | 0.000261 | 0.00529208 | 0.000438401 | 0.00584164 | 0.0004874 | 0.0492996 |
| p = 50.0μ | | Diffraction pattern center | | 2113.43 | x_dim = 224 | num_e1 = 145 | |
| 2 | 3.77091 | 0.0661667 | 1.53038 | 0.193074 | 1.59519 | 0.0601697 | 3.77101 |
| 3 | 1.98520 | 0.0451807 | 0.827603 | 0.0335625 | 0.880270 | 0.0444823 | 1.98519 |
| 5 | 0.404825 | 0.009065 | 0.373326 | 0.0110170 | 0.433263 | 0.00836996 | 0.404839 |
| 10 | 0.174884 | 0.000798 | 0.0353489 | 0.00113079 | 0.0310147 | 0.0003498 | 0.174883 |
| 15 | 0.0610804 | 0.0008053 | 0.0002712 | 9.524e-005 | 7.899e-005 | 0.0002379 | 0.061078 |
| 20 | 0.0058884 | 0.0003731 | 0.0003102 | 5.685e-005 | 0.001329 | 3.97e-005 | 0.005888 |

The following Tables 2A and 2B and FIGS. 32–35 illustrate that the DAD (dihedral angle deviation) has a much smaller influence on the brightness of small pitch prisms relative to large pitch prisms.

The tables are for a 0.0017" and a 0.002" metal backed pitch prism, respectively, and the FIGS. 32–35 are for a 0.0017" metal backed pitch prism array and show that a DAD range from −1.04 minutes to 3.67 minutes causes virtually no change in the retroreflected brightness of the samples. The same dihedral angle variation in larger pitch prisms (0.0060" pitch) would cause a very large change (on the order of 50%) in the retroreflected brightness.

The advantage of the small prism is the very uniform retroreflected brightness at all important entrance, orientation and observation angles and the additional manufacturing process latitude that will be present for manufacturing tooling (molds) and the product replicated from the molds. This result combined with the thinner prism will allow running at much higher manufacturing speeds.

TABLE 2A

.0017" Pitch

| Observation Angle | Dihedral Angle<br>Entrance Angle (B1) | 1st Generation | | 3rd Generation | | 5th Generation | | 7th Generation | |
|---|---|---|---|---|---|---|---|---|---|
| | | −1.04<br>−180 | −1.04<br>−90 | 1.55<br>−180 | 1.55<br>−90 | 3.67<br>−180 | 3.67<br>−90 | 2.28<br>−180 | 2.28<br>−90 |
| 0.10 | 5 | 567.93 | 563.27 | 544.17 | 542.63 | 545.40 | 538.10 | 546.70 | 538.57 |
| | 10 | 532.63 | 526.47 | 511.67 | 506.53 | 508.00 | 503.27 | 513.57 | 505.37 |
| | 20 | 416.20 | 399.70 | 404.07 | 382.73 | 390.37 | 378.93 | 396.93 | 382.53 |
| | 30 | 268.23 | 238.50 | 253.87 | 227.40 | 246.17 | 224.93 | 253.20 | 228.90 |
| | 40 | 135.33 | 111.47 | 128.57 | 105.77 | 123.53 | 104.97 | 124.53 | 107.23 |
| | 45 | 84.82 | 68.90 | 81.32 | 65.12 | 76.75 | 64.83 | 78.10 | 66.71 |
| | 50 | 53.63 | 39.83 | 51.98 | 37.35 | 48.15 | 37.41 | 47.55 | 38.72 |
| | 60 | 21.21 | 9.63 | 19.00 | 8.78 | 16.14 | 9.14 | 15.97 | 9.76 |
| 0.20 | 5 | 541.67 | 522.97 | 520.93 | 504.37 | 516.23 | 502.10 | 518.47 | 502.43 |
| | 10 | 510.43 | 490.80 | 493.17 | 473.13 | 482.87 | 469.20 | 487.93 | 471.20 |
| | 20 | 399.90 | 377.60 | 386.67 | 360.87 | 374.93 | 357.67 | 379.03 | 361.33 |
| | 30 | 256.63 | 229.33 | 246.33 | 219.20 | 235.97 | 216.77 | 244.67 | 220.07 |
| | 40 | 129.67 | 109.20 | 123.37 | 103.83 | 118.37 | 102.97 | 120.97 | 105.20 |
| | 45 | 82.65 | 67.92 | 78.17 | 64.18 | 75.47 | 64.06 | 76.57 | 65.87 |
| | 50 | 52.15 | 39.43 | 50.99 | 37.01 | 47.44 | 37.06 | 46.79 | 38.41 |
| | 60 | 20.51 | 9.64 | 19.12 | 8.78 | 16.36 | 9.15 | 15.89 | 9.78 |
| 0.33 | 5 | 481.50 | 442.00 | 464.93 | 427.30 | 461.00 | 425.03 | 463.13 | 425.50 |
| | 10 | 456.17 | 418.73 | 441.10 | 403.93 | 436.43 | 400.00 | 437.87 | 402.03 |
| | 20 | 361.03 | 329.67 | 349.67 | 316.67 | 338.57 | 313.70 | 342.33 | 315.67 |
| | 30 | 235.00 | 209.10 | 225.47 | 200.17 | 217.10 | 197.90 | 222.57 | 200.53 |
| | 40 | 120.20 | 104.00 | 114.10 | 99.05 | 110.33 | 98.02 | 111.93 | 100.02 |
| | 45 | 76.82 | 65.70 | 72.53 | 62.09 | 70.50 | 62.01 | 71.60 | 63.61 |
| | 50 | 49.69 | 38.70 | 47.98 | 36.34 | 44.47 | 36.37 | 44.27 | 37.67 |
| | 60 | 19.62 | 9.63 | 18.99 | 8.79 | 16.15 | 9.13 | 15.64 | 9.76 |
| 0.50 | 5 | 377.87 | 312.27 | 367.73 | 301.77 | 363.40 | 299.77 | 364.43 | 299.60 |
| | 10 | 362.03 | 299.27 | 351.97 | 290.37 | 347.73 | 287.43 | 348.53 | 287.17 |
| | 20 | 292.13 | 248.60 | 285.27 | 240.80 | 275.80 | 237.93 | 278.43 | 238.50 |
| | 30 | 194.53 | 172.43 | 188.67 | 167.30 | 181.20 | 165.13 | 186.03 | 165.63 |
| | 40 | 103.23 | 93.70 | 97.63 | 89.56 | 93.26 | 88.46 | 95.71 | 89.90 |
| | 45 | 66.59 | 61.26 | 63.26 | 58.01 | 60.67 | 57.81 | 62.22 | 59.08 |
| | 50 | 43.88 | 37.06 | 43.21 | 34.76 | 39.30 | 34.78 | 39.35 | 35.93 |
| | 60 | 17.39 | 9.56 | 18.51 | 8.68 | 15.37 | 9.00 | 14.74 | 9.64 |
| 1.00 | 5 | 88.88 | 32.83 | 97.84 | 33.50 | 90.02 | 31.84 | 86.34 | 30.20 |
| | 10 | 96.42 | 34.99 | 97.91 | 36.40 | 96.48 | 34.69 | 94.03 | 32.91 |
| | 20 | 108.73 | 45.07 | 106.73 | 47.23 | 102.90 | 45.79 | 103.73 | 43.24 |
| | 30 | 92.80 | 57.12 | 88.70 | 58.42 | 83.61 | 57.05 | 88.46 | 54.82 |
| | 40 | 53.57 | 51.61 | 50.48 | 50.93 | 46.36 | 49.81 | 49.48 | 49.35 |
| | 45 | 35.06 | 40.25 | 33.41 | 39.09 | 30.66 | 38.53 | 32.38 | 38.75 |
| | 50 | 24.44 | 27.99 | 24.65 | 26.72 | 21.59 | 26.53 | 21.51 | 27.07 |
| | 60 | 15.08 | 8.72 | 14.30 | 7.95 | 11.22 | 8.21 | 10.77 | 8.74 |
| 1.50 | 5 | 5.93 | 17.31 | 8.35 | 16.34 | 6.69 | 14.40 | 5.20 | 14.57 |
| | 10 | 9.19 | 13.59 | 11.36 | 12.96 | 10.64 | 11.01 | 9.03 | 11.60 |
| | 20 | 30.51 | 5.59 | 30.10 | 5.55 | 29.20 | 4.12 | 29.36 | 4.29 |
| | 30 | 49.76 | 7.12 | 46.37 | 8.68 | 43.41 | 7.53 | 47.78 | 6.50 |
| | 40 | 34.69 | 17.36 | 31.36 | 18.72 | 27.82 | 17.65 | 32.07 | 16.48 |
| | 45 | 20.37 | 18.71 | 18.40 | 19.26 | 15.83 | 18.58 | 18.56 | 18.01 |
| | 50 | 12.32 | 16.69 | 11.59 | 16.61 | 9.56 | 16.24 | 10.12 | 16.14 |
| | 60 | 10.01 | 7.15 | 9.58 | 6.62 | 6.77 | 6.80 | 6.56 | 7.16 |
| 2.00 | 5 | 14.32 | 16.94 | 12.46 | 15.10 | 11.05 | 14.79 | 11.52 | 16.17 |
| | 10 | 9.88 | 14.16 | 9.64 | 13.07 | 8.79 | 12.91 | 8.86 | 14.56 |
| | 20 | 4.84 | 7.83 | 5.51 | 6.72 | 5.36 | 6.83 | 4.71 | 8.29 |
| | 30 | 22.65 | 2.69 | 21.94 | 2.35 | 20.43 | 1.93 | 22.35 | 2.61 |
| | 40 | 27.30 | 3.62 | 24.82 | 4.57 | 21.94 | 3.86 | 25.75 | 3.28 |
| | 45 | 17.12 | 5.79 | 15.05 | 6.80 | 12.74 | 6.23 | 15.87 | 5.61 |
| | 50 | 8.92 | 7.65 | 7.37 | 8.25 | 5.96 | 7.85 | 7.17 | 7.42 |
| | 60 | 8.79 | 5.25 | 6.63 | 5.01 | 4.43 | 5.07 | 4.35 | 5.25 |

TABLE 2B

.0020" Pitch

| Observation Angle | Dihedral Angle<br>Entrance Angle (B1) | 3rd Generation | | 5th Generation | | 7th Generation | |
|---|---|---|---|---|---|---|---|
| | | 3.89/−1.3<br>−180 | 3.89/−1.3<br>−90 | −1.13/−0.1<br>−180 | −1.13/0.1<br>−90 | 10.59<br>−180 | 10.59<br>−90 |
| 0.10 | 5 | 827.00 | 790.50 | 821.80 | 815.30 | 764.30 | 789.50 |
| | 10 | 757.30 | 748.70 | 770.60 | 765.70 | 788.70 | 745.80 |
| | 20 | 561.50 | 569.00 | 580.20 | 583.40 | 580.40 | 564.90 |

TABLE 2B-continued

| | | .0020" Pitch | | | | | |
|---|---|---|---|---|---|---|---|
| | | 3rd Generation | | 5th Generation | | 7th Generation | |
| Observation Angle | Dihedral Angle Entrance Angle (B1) | 3.89/−1.3 −180 | 3.89/−1.3 −90 | −1.13/−0.1 −180 | −1.13/0.1 −90 | 10.59 −180 | 10.59 −90 |
| | 30 | 355.40 | 367.60 | 354.70 | 362.30 | 339.60 | 350.30 |
| | 40 | 156.40 | 170.70 | 159.80 | 167.80 | 153.70 | 158.10 |
| | 45 | 95.03 | 103.80 | 97.87 | 102.90 | 91.85 | 96.39 |
| | 50 | 58.76 | 59.73 | 59.56 | 57.99 | 52.14 | 53.97 |
| | 60 | 18.25 | 14.11 | 27.80 | 13.49 | 16.06 | 12.34 |
| 0.20 | 5 | 735.40 | 727.70 | 751.50 | 755.90 | 696.00 | 720.30 |
| | 10 | 693.00 | 692.60 | 704.30 | 711.70 | 706.50 | 687.60 |
| | 20 | 522.60 | 538.40 | 544.20 | 545.20 | 530.80 | 529.70 |
| | 30 | 333.50 | 349.80 | 340.90 | 345.10 | 318.30 | 333.50 |
| | 40 | 148.90 | 165.70 | 157.60 | 161.70 | 146.50 | 153.50 |
| | 45 | 91.81 | 101.70 | 96.78 | 99.50 | 88.49 | 94.34 |
| | 50 | 56.83 | 58.74 | 57.72 | 56.92 | 50.74 | 53.08 |
| | 60 | 18.07 | 14.11 | 26.99 | 13.24 | 15.97 | 12.31 |
| 0.33 | 5 | 602.50 | 604.00 | 610.70 | 623.90 | 575.90 | 596.00 |
| | 10 | 568.60 | 573.00 | 585.50 | 587.30 | 583.60 | 567.40 |
| | 20 | 436.90 | 457.40 | 467.80 | 464.00 | 448.50 | 450.70 |
| | 30 | 284.90 | 299.80 | 295.90 | 299.50 | 274.40 | 291.30 |
| | 40 | 134.80 | 154.30 | 142.40 | 150.10 | 133.00 | 143.10 |
| | 45 | 84.51 | 96.65 | 88.91 | 93.98 | 81.44 | 89.65 |
| | 50 | 52.25 | 56.71 | 54.24 | 54.01 | 47.39 | 51.27 |
| | 60 | 17.48 | 13.95 | 25.03 | 12.55 | 15.27 | 12.17 |
| 0.50 | 5 | 394.50 | 400.70 | 409.40 | 418.40 | 378.10 | 399.40 |
| | 10 | 380.20 | 381.20 | 397.10 | 396.60 | 389.50 | 383.20 |
| | 20 | 308.80 | 321.60 | 336.10 | 333.70 | 320.90 | 321.90 |
| | 30 | 216.90 | 227.90 | 226.20 | 233.20 | 210.50 | 226.30 |
| | 40 | 110.40 | 131.10 | 117.40 | 127.90 | 109.30 | 123.40 |
| | 45 | 70.76 | 86.11 | 74.29 | 83.43 | 68.59 | 80.19 |
| | 50 | 45.24 | 52.11 | 47.26 | 49.62 | 41.10 | 47.59 |
| | 60 | 16.22 | 13.47 | 23.95 | 12.20 | 14.29 | 11.84 |
| 1.00 | 5 | 22.09 | 24.13 | 29.31 | 28.47 | 22.58 | 25.71 |
| | 10 | 33.06 | 25.99 | 38.16 | 31.38 | 35.12 | 28.26 |
| | 20 | 66.55 | 35.41 | 75.43 | 42.85 | 71.10 | 39.20 |
| | 30 | 82.76 | 47.29 | 88.76 | 55.94 | 82.82 | 51.77 |
| | 40 | 51.52 | 52.38 | 55.11 | 55.42 | 52.05 | 51.97 |
| | 45 | 32.08 | 43.49 | 35.06 | 45.44 | 32.26 | 42.76 |
| | 50 | 21.18 | 32.00 | 23.13 | 32.26 | 19.70 | 30.35 |
| | 60 | 10.58 | 10.86 | 19.89 | 10.17 | 9.26 | 9.80 |
| 1.50 | 5 | 18.05 | 28.18 | 16.78 | 23.94 | 17.16 | 27.02 |
| | 10 | 13.62 | 23.26 | 12.16 | 18.82 | 13.49 | 22.31 |
| | 20 | 8.43 | 10.06 | 9.50 | 7.34 | 8.60 | 9.83 |
| | 30 | 32.35 | 4.10 | 34.41 | 4.62 | 33.33 | 4.87 |
| | 40 | 33.75 | 9.62 | 34.81 | 12.01 | 34.77 | 10.25 |
| | 45 | 19.66 | 12.34 | 21.03 | 14.95 | 20.06 | 13.22 |
| | 50 | 9.84 | 13.17 | 10.99 | 14.77 | 9.21 | 13.22 |
| | 60 | 5.36 | 7.27 | 16.02 | 7.23 | 4.37 | 6.80 |
| 2.00 | 5 | 6.85 | 14.75 | 8.39 | 12.89 | 7.54 | 14.49 |
| | 10 | 10.80 | 13.06 | 11.18 | 10.86 | 11.91 | 13.11 |
| | 20 | 8.84 | 7.51 | 9.98 | 6.11 | 9.42 | 8.00 |
| | 30 | 6.61 | 3.33 | 8.51 | 2.51 | 7.12 | 3.64 |
| | 40 | 22.63 | 1.52 | 23.38 | 1.65 | 24.14 | 1.63 |
| | 45 | 16.67 | 2.09 | 17.34 | 2.91 | 17.37 | 2.38 |
| | 50 | 8.13 | 3.53 | 8.72 | 4.61 | 7.81 | 3.63 |
| | 60 | 3.25 | 3.94 | 14.97 | 4.30 | 1.95 | 3.83 |

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

We claim:

1. A retroreflective structure comprising an array of transparent prisms having a three-sided base and three facets extending therefrom to a common apex, the base of the prisms lying in a common plane, each side of the base having a length of between 0.0005 and 0.003 inches, the prisms including a reflective coating adhered to the facets and wherein the retroreflected light includes a 0.33 degree angle of observation, uniform orientation-free cone of light.

2. The structure of claim 1, wherein a flat surface is provided between the base of prisms to reflect light.

3. The structure of claim 1, which includes several arrays seamed together.

4. The structure of claim 1, wherein the prisms are cube-corner prisms.

5. The structure of claim 1, wherein adjacent prisms form prism pairs in which the tips of the apices of the prism pairs are tilted with respect to one another.

6. The structure of claim 1, wherein the prisms are orientation free.

7. The structure of claim 1, wherein the light retroreflected from the structures encompasses a 0.5 degree angle of observation, uniform orientation-free cone.

8. A retroreflective structure comprising an array of transparent faceted cube corner prisms having a three-sided base and three facets extending therefrom to a common apex, the base of the prisms lying in a common plane, each side of the base having a length of about 0.002 inches, the prisms including a reflective coating adhered to the facets.

9. A retroreflective structure comprising an array of transparent prisms having a three-sided base and three facets extending therefrom to a common apex, the base of the prisms lying in a common plane, each side of the base having a length of between 0.0005 and 0.003 inches, the prisms including a reflective coating adhered to the facets, wherein the light retroreflected from the structures encompasses a 0.5 degree angle of observation, uniform orientation-free cone.

10. The structure of claim 9, wherein the structure retroreflects light at a substantially uniform brightness across a dihedral angle deviation of each prism in a range of about −1.04 to 3.67 minutes.

11. A retroreflective structure comprising an array of cube corner prisms which diffracts essentially all incoming light, wherein the retroreflected light includes a 0.33 degree angle of observation, uniform orientation-free cone of light.

12. The structure of claim 11, wherein the structure retroreflects light at a substantially uniform brightness across a dihedral angle deviation of each prism in a range of about −1.04 minutes to 3.67 minutes.

13. The structure of claim 11, wherein the cube-corner prisms include a three-sided base and three facets extending therefrom to a common apex, each side of the base having a length between 0.0005 and 0.003 inches, the prisms including a reflective coating adhered to the facets.

14. A retroreflective structure comprising an array of transparent faceted cube corner prisms having a three-sided base and three facets extending therefrom to a common apex, the base of the prisms lying in a common plane, each side of the base having a length of between about 0.0005 and 0.002 inches, the prisms including a reflective coating adhered to the facets.

* * * * *

UNITED STATES PATENT AND TRADEMARK OFFICE
CERTIFICATE OF CORRECTION

| | | |
|---|---|---|
| PATENT NO. | : 6,206,525 B1 | Page 1 of 1 |
| APPLICATION NO. | : 08/980885 | |
| DATED | : March 27, 2001 | |
| INVENTOR(S) | : William P. Rowland and Robert B. Nilsen | |

It is certified that error appears in the above-identified patent and that said Letters Patent is hereby corrected as shown below:

On the Title page, in the Related U.S. Application Data Field:

"Continuation-in-part of application No. 07/717,597, filed on Sep. 23, 1996, now Pat. No. 5,780,140, and a continuation of application No. 08/702,245, filed on Aug. 28, 1996, now Pat. No. 5,840,406, which is a division of application No. 08/314,487, filed on Sep. 28, 1994, now Pat. No. 5,565,151." should read
-- Continuation-in-part of application No. 08/717,597, filed on Sep. 23, 1996, now Pat. No. 5,780,140, and a continuation of application No. 08/702,245, filed on Aug. 28, 1996, now Pat. No. 5,840,406, which is a division of application No. 08/314,487, filed on Sep. 28, 1994, now Pat. No. 5,565,151. --

Signed and Sealed this

Twenty-fourth Day of February, 2009

JOHN DOLL
*Acting Director of the United States Patent and Trademark Office*